United States Patent
Mirkin et al.

(10) Patent No.: US 11,591,449 B2
(45) Date of Patent: Feb. 28, 2023

(54) POLYELEMENTAL HETEROSTRUCTURE NANOPARTICLES AND METHODS OF MAKING THE SAME

(71) Applicant: NORTHWESTERN UNIVERSITY, Evanston, IL (US)

(72) Inventors: Chad A. Mirkin, Wilmette, IL (US); PengCheng Chen, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 52 days.

(21) Appl. No.: 17/268,027

(22) PCT Filed: Aug. 16, 2019

(86) PCT No.: PCT/US2019/046885
§ 371 (c)(1),
(2) Date: Feb. 11, 2021

(87) PCT Pub. No.: WO2020/037245
PCT Pub. Date: Feb. 20, 2020

(65) Prior Publication Data
US 2021/0163707 A1    Jun. 3, 2021

Related U.S. Application Data

(60) Provisional application No. 62/764,882, filed on Aug. 16, 2018.

(51) Int. Cl.
C08K 3/08        (2006.01)
C08K 3/11        (2018.01)

(52) U.S. Cl.
CPC ............... *C08K 3/08* (2013.01); *C08K 3/11* (2018.01); *C08K 2003/085* (2013.01); *C08K 2003/0806* (2013.01); *C08K 2003/0831* (2013.01); *C08K 2003/0843* (2013.01); *C08K 2003/0862* (2013.01); *C08K 2201/014* (2013.01)

(58) Field of Classification Search
CPC ............... C08K 3/08; C08K 3/10; C08K 3/11
See application file for complete search history.

(56) References Cited

U.S. PATENT DOCUMENTS

| | | |
|---|---|---|
| 7,811,635 B2 | 10/2010 | Mirkin et al. |
| 10,259,046 B2 | 4/2019 | Kovalenko et al. |
| 2010/0056366 A1 | 3/2010 | Lee |
| 2010/0133489 A1 | 6/2010 | Mirkin et al. |
| 2013/0199673 A1 | 8/2013 | Yanson et al. |
| 2014/0273337 A1 | 9/2014 | Gresty et al. |

FOREIGN PATENT DOCUMENTS

| | | |
|---|---|---|
| CN | 101415508 A | 4/2009 |
| CN | 103097588 A | 5/2013 |
| CN | 105928993 A | 9/2016 |
| CN | 106410172 A | 2/2017 |
| JP | H09299803 A | 11/1997 |
| WO | WO-2014/039821 A1 | 3/2014 |

OTHER PUBLICATIONS

Du et al., Windowless observation of evaporation-induced coarsening of Au-Pt nanoparticles in polymer nanoreactors, ARXIV. ORG, Cornell University Library, Ithaca, NY (Jun. 1, 2018).
European Patent Application No. 19849118.5, Extended European Search Report, dated Jan. 4, 2022.
Geraldes et al., Binary and ternary palladium based electrocatalysts for alkaline direct glycerol fuel cell, J. Power Sources, 293:823-30 (2015).
Zu et al., General approach for fabricating nanoparticle arrays via patterned block copolymer nanoreactors, J. Nanopart. Res., 13(1):1-13 (2010 online).
Aidhy et al., Prediction of a Ca(BH4)(NH2) quaternary hydrogen storage compound from first-principles calculations. Phys. Rev. B 84, 134103, (2011).
Akbarzadeh et al., First-principles determination of multicomponent hydride phase diagrams: application to the Li—Mg—N—H system. Adv. Mater. 19, 3233-3239, (2007).
Balluffi et al., CSL/DSC lattice model for general crystal-crystal boundaries and their line defects. Acta Metall. 30, 1453-1470, (1982).
Buck et al., A total-synthesis framework for the construction of high-order colloidal hybrid nanoparticles. Nat. Chem. 4, 37-44, (2012).
Campbell, Catalyst-support interactions: Electronic perturbations. Nat. Chem. 4, 597-598, (2012).
Casavola et al. Exchange-Coupled Bimagnetic Cobalt/Iron Oxide Branched Nanocrystal Heterostructures. Nano Lett. 9, 366-376, (2009).
Chen et al., Polyelemental nanoparticle libraries, Science, 352(6293):1565-9 (2016).

(Continued)

*Primary Examiner* — Wenwen Cai
(74) *Attorney, Agent, or Firm* — Marshall, Gerstein & Borun LLP

(57) ABSTRACT

Disclosed herein are method and design rules for making polyelemental systems with specific heterostructures, including tetra-phase nanopartides with as many as six junctions. In accordance with an embodiment, a method of making a tetra-phase polyelemental nanoparticle using tri-phase nanoparticle architectures can include selecting two or more triphase nanoparticle architectures, wherein the two or more tri-phase nanoparticle architectures are one or more striped tri-phase architectures, one or more pie-shaped tri-phase architectures, or combinations thereof; identifying from the selected two or more tri-phase nanoparticle architectures groups of metals for generating each of the two or more tri-phase nanoparticle architectures; contacting a tip coated with an ink to a substrate to form a nanoreactor, the ink comprising block copolymer and the metals from the groups of metals identified for generating each of the two or more tri-phase nanoparticle architectures; and annealing the nanoreactors under conditions sufficient to synthesize a tetra-phase polyelemental nanoparticle.

20 Claims, 55 Drawing Sheets

(56) References Cited

OTHER PUBLICATIONS

Chen et al., Structural Evolution of Three-Component Nanoparticles in Polymer Nanoreactors, J. Am. Chem. Soc. 2017, 139, 9876.
Chen et al., Tip-Directed Synthesis of Multimetallic Nanoparticles, J. Am. Chem. Soc., 137: 9167-9173 (2015).
Cortie et al., Synthesis and Optical Properties of Hybrid and Alloy Plasmonic Nanoparticles. Chem. Rev. 111, 3713-3735, (2011).
Costi et al., Colloidal Hybrid Nanostructures: A New Type of Functional Materials. Angew. Chem. Int. Ed. 49, 4878-4897, (2010).
Fenton et al., Tunable intraparticle frameworks for creating complex heterostructured nanoparticle libraries. Science 360, 513-517, (2018).
Fu et al., Interaction of nanostructured metal overlayers with oxide surfaces. Surf. Sci. Rep. 62, 431-498, (2007).
Ge et al. A Tandem Catalyst with Multiple Metal Oxide Interfaces Produced by Atomic Layer Deposition. Angew. Chem. Int. Ed. 55, 7081-7085, (2016).
George et al. CO Oxidation on Colloidal $Au_{0.80}Pd_{0.20}$-$FeO_x$ Dumbbell Nanocrystals. Nano Lett. 13, 752-757, (2013).
Green et al., Spectroscopic Observation of Dual Catalytic Sites During Oxidation of CO on a $Au/TiO_2$ Catalyst. Science 333, 736-739, (2011).
Hodges et al., Controlling Configurational Isomerism in Three-Component Colloidal Hybrid Nanoparticles. Acc. Chem. Res. 50, 1433-1440, (2017).
Hodges et al., Microscopic Investigation of Chemoselectivity in Ag—Pt—$Fe_3O_4$ Heterotrimer Formation: Mechanistic Insights and Implications for Controlling High-Order Hybrid Nanoparticle Morphology. J. Am. Chem. Soc. 137, 15493-15500, (2015).
Hong et al., Metal-Semiconductor Heteronanocrystals with Desired Configurations for Plasmonic Photocatalysis. J. Am. Chem. Soc. 138, 15766-15773, (2016).
International Application No. PCT/US2019/046885, International Search Report and Written Opinion, dated Oct. 25, 2019.
Kamat, Manipulation of Charge Transfer Across Semiconductor Interface. A Criterion That Cannot Be Ignored in Photocatalyst Design. J. Phys. Chem. Lett. 3, 663-672, (2012).
Kattel et al., Active sites for $CO_2$ hydrogenation to methanol on Cu/ZnO catalysts. Science 355, 1296-1299, (2017).
Kattel et al., Tuning Selectivity of $CO_2$ Hydrogenation Reactions at the Metal/Oxide Interface. J. Am. Chem. Soc. 139, 9739-9754, (2017).
Kirklin et al., High-Throughput Computational Screening of New Li-Ion Battery Anode Materials. Adv. Energy Mater. 3, 252-262, (2013).
Kirklin et al., The open quantum materials database (OQMD): assessing the accuracy of DFT formation energies, *npj Comput. Mater.* 1, 15010 (2015).
Kresse et al., Efficiency of ab-initio total energy calculations for metals and semiconductors using a plane-wave basis set, Comput. Mater. Sci., 6:15-50 (1996).
Kresse et al., Efficient iterative schemes for ab initio total-energy calculations using a plane-wave basis set. Phys. Rev. B 54, 11169-11186, (1996).
Kresse et al., From ultrasoft pseudopotentials to the projector augmented-wave method, Phys. Rev. B, 59:1758-1775 (1999).
Li et al. Pd—$Cu_2O$ and Ag—$Cu_2O$ Hybrid Concave Nanomaterials for an Effective Synergistic Catalyst. Angew. Chem. Int. Ed. 52, 11049-11053, (2013).
Li et al., Electroreduction of carbon monoxide to liquid fuel on oxide-derived nanocrystalline copper. Nature 508, 504-507, (2014).
Li et al., Reactive AgAuS and $Ag_3AuS_2$ Synthons Enable the Sequential Transformation of Spherical Nanocrystals into Asymmetric Multicomponent Hybrid Nanoparticles. Chem. Mater. 29, 4153-4160, (2017).
Lin et al., Transformative Heterointerface Evolution and Plasmonic Tuning of Anisotropic Trimetallic Nanoparticles. J. Am. Chem. Soc. 139, 10180-10183, (2017).
Liu et al. Inkjet Printing Assisted Synthesis of Multicomponent Mesoporous Metal Oxides for Ultrafast Catalyst Exploration. Nano Lett. 12, 5733-5739, (2012).
Liu et al., Delineating the pathways for the site-directed synthesis of individual nanoparticles on surfaces, Proc. Natl. Acad. Sci. USA, 110(3):887-91 (2013).
Lu, Stabilizing nanostructures in metals using grain and twin boundary architectures. Nat. Rev. Mater. 1: 16019, (2016).
Ma et al. Computational investigation of half-Heusler compounds for spintronics applications. Phys. Rev. B 95, 024411, (2017).
Mariano et al., Selective increase in $CO_2$ electroreduction activity at grain-boundary surface terminations. Science 358, 1187-1191, (2017).
Min et al., Nonstoichiometric Nucleation and Growth of Multicomponent Nanocrystals in Solution. Acc. Chem. Res. 47, 2887-2893, (2014).
Oh et al., Double-heterojunction nanorod light-responsive LEDs for display applications. Science 355, 616-619, (2017).
Peng et al., Plasmonic/Magnetic Bifunctional Nanoparticles. Angew. Chem. Int. Ed. 50, 3158-3163, (2011).
Read et al., Colloidal Hybrid Nanoparticle Insertion Reaction for Transforming Heterodimers into Heterotrimers. J. Am. Chem. Soc. 137, 12514-12517, (2015).
Rodriguez-Fernandez et al., Hybrid Au—$SiO_2$ Core-Satellite Colloids as Switchable SERS Tags. Chem. Mater. 27, 2540-2545, (2015).
Saal et al., Materials Design and Discovery with High-Throughput Density Functional Theory: The Open Quantum Materials Database (OQMD), JOM 65, 1501-1509, (2013).
Saavedra et al., The critical role of water at the gold-titania interface in catalytic CO oxidation. Science 345, 1599-1602, (2014).
Schick et al. Multifunctional Two-Photon Active Silica-Coated Au@MnO Janus Particles for Selective Dual Functionalization and Imaging. J. Am. Chem. Soc. 136, 2473-2483, (2014).
Villars et al., Eds., ASM Alloy Phase Diagrams Database, http://www1.asminternational.org/AsmEnterprise/APD (ASM International, Materials Park, OH, 2006).
Wang et al. Direct and continuous strain control of catalysts with tunable battery electrode materials. Science 354, 1031-1036, (2016).
Wang et al., A General Approach to Noble Metal-Metal Oxide Dumbbell Nanoparticles and Their Catalytic Application for CO Oxidation. Chem. Mater. 22, 3277-3282, (2010).
Weng et al., Hierarchical synthesis of non-centrosymmetric hybrid nanostructures and enabled plasmon-driven photocatalysis. Nat. Commun. 5: 4792, (2014).
Wu et al. Formation of Heterodimer Nanocrystals: $UO_2/In_2O_3$ and $FePt/In_2O_3$. J. Am. Chem. Soc. 133, 14327-14337, (2011).
Xie et al. Tandem Catalysis for $CO_2$ Hydrogenation to C2-C4 Hydrocarbons. Nano Lett. 17, 3798-3802, (2017).
Xu et al., Dumbbell-like Au—$Fe_3O_4$ Nanoparticles for Target-Specific Platin Delivery. J. Am. Chem. Soc. 131, 4216-4217 (2009).
Yamada et al. Nanocrystal bilayer for tandem catalysis. Nat. Chem. 3, 372-376, (2011).
Yao et al. Carbothermal shock synthesis of high-entropy-alloy nanoparticles. Science 359, 1489-1494, (2018).
Ye et al. Seeded Growth of Metal-Doped Plasmonic Oxide Heterodimer Nanocrystals and Their Chemical Transformation. J. Am. Chem. Soc. 136, 5106-5115, (2014).
Zhang et al., Engineering Inorganic Hybrid Nanoparticles: Tuning Combination Fashions of Gold, Platinum, and Iron Oxide. Langmuir 24, 13197-13202, (2008).
Zhang et al., Engineering nanointerfaces for nanocatalysis. Chem. Soc. Rev. 43, 7870-7886, (2014).
Zhang et al., Gold, an alternative to platinum group metals in automobile catalytic converters. Gold Bull. 44, 145-153, (2011).
Zhao et al. Metal-organic frameworks as selectivity regulators for hydrogenation reactions. Nature 539, 76-80, (2016).
Chinese Patent Application No. 201980066788.7, Office Action, dated Dec. 27, 2022.

| Interfacial energy | $\gamma (eV/Å^2)$ | Surface energy | $\gamma (eV/Å^2)$ |
|---|---|---|---|
| Au-Co | 0.032 | Au | 0.046 |
| Co-Pd$_3$Sn | 0.048 | Co | 0.118 |
| Au-Pd$_3$Sn | 0.001 | Pd$_3$Sn | 0.083 |
FIGURE 3B
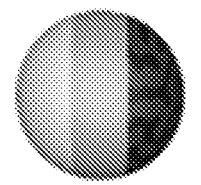
$1.201 \times 10^4$ eV
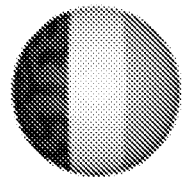
$1.206 \times 10^4$ eV
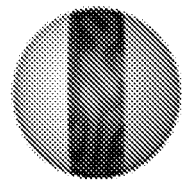
$1.179 \times 10^4$ eV
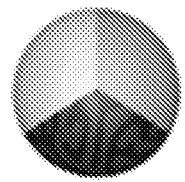
$1.162 \times 10^4$ eV
FIGURE 3C (a)

(b)

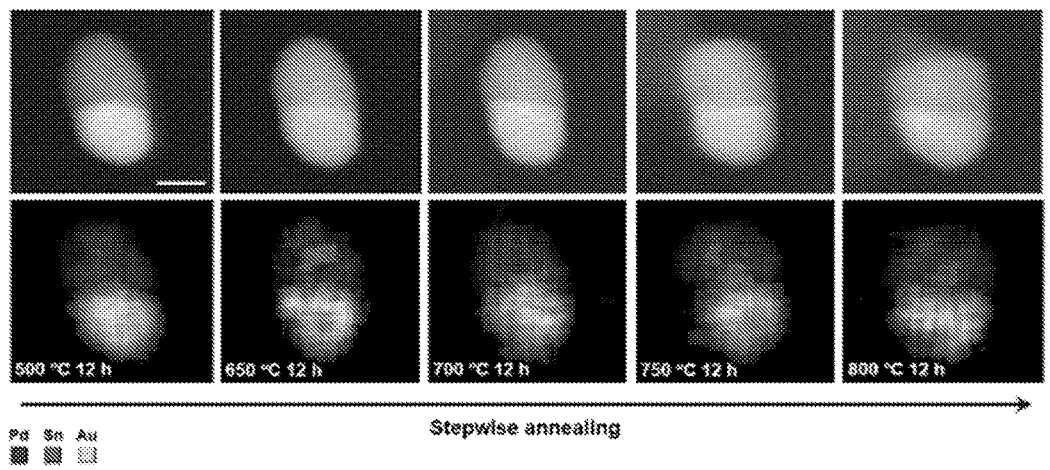
FIGURE 10
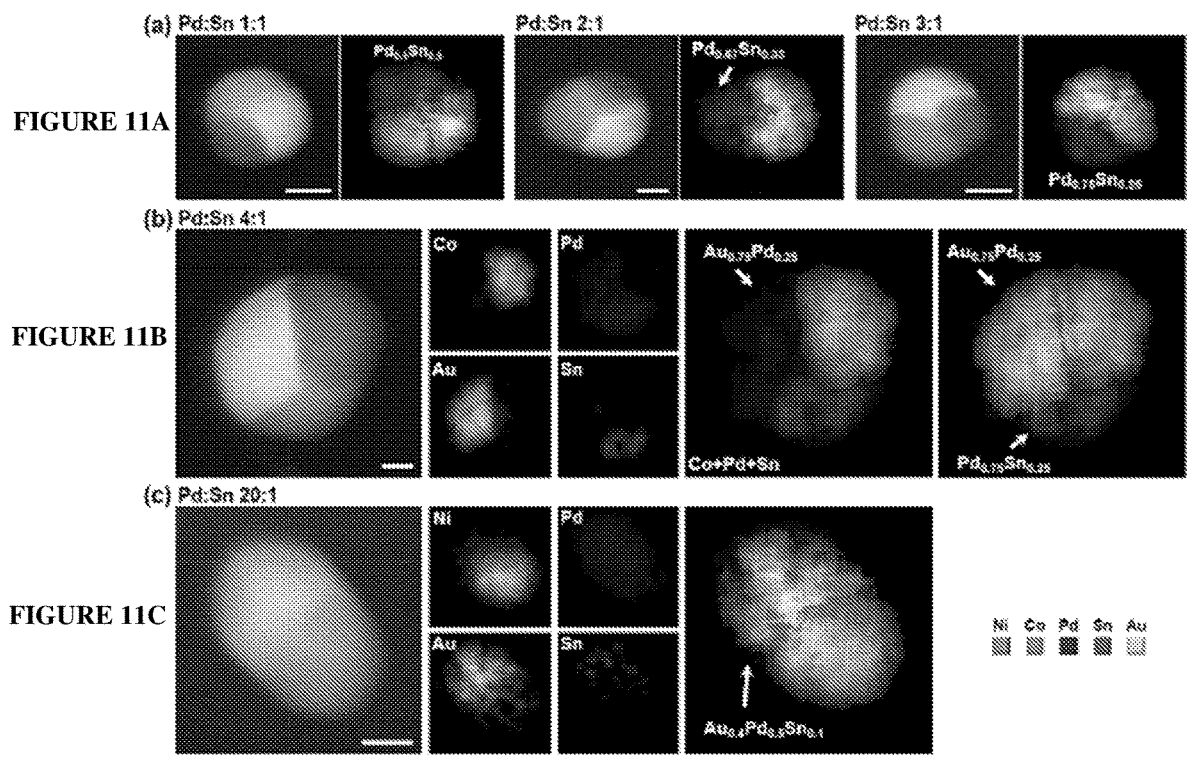
FIGURE 11A
FIGURE 11B
FIGURE 11C

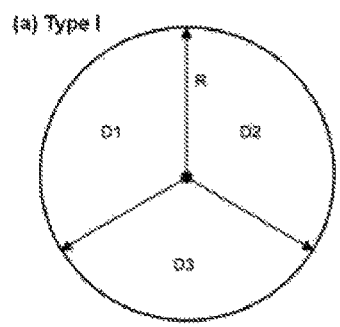
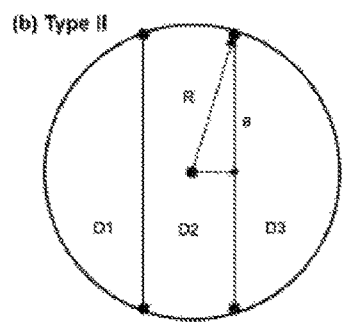
FIGURE 21A          FIGURE 21B
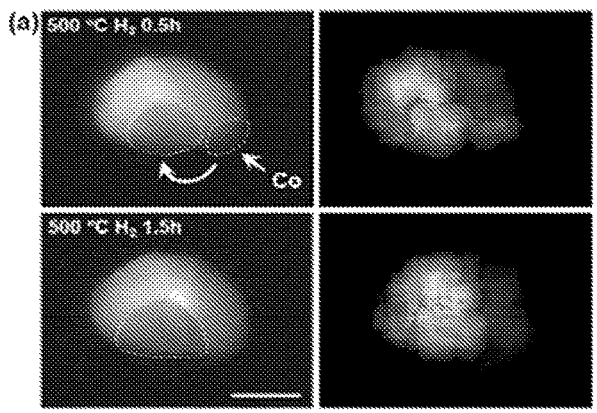
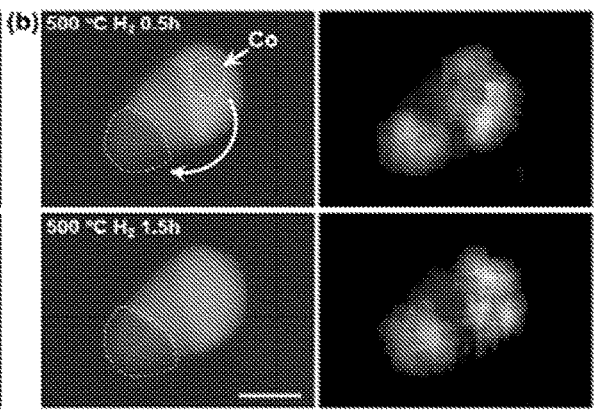
FIGURE 22A          FIGURE 22B

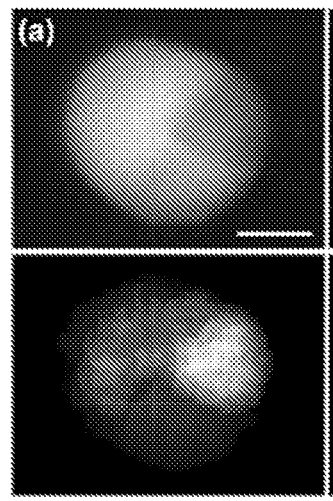
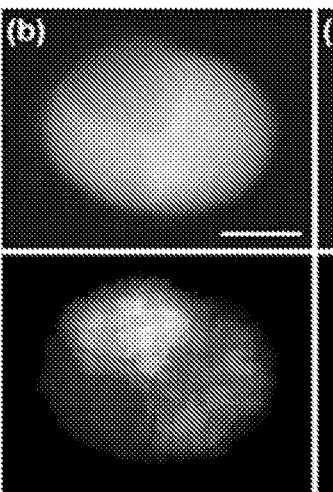
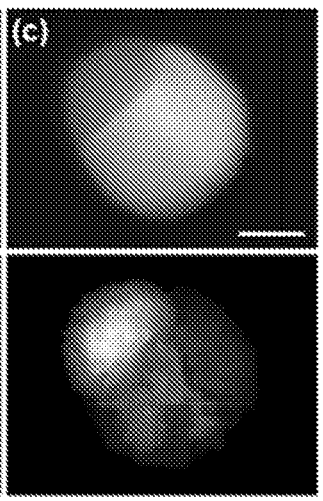
FIGURE 24A  FIGURE 24B  FIGURE 24C
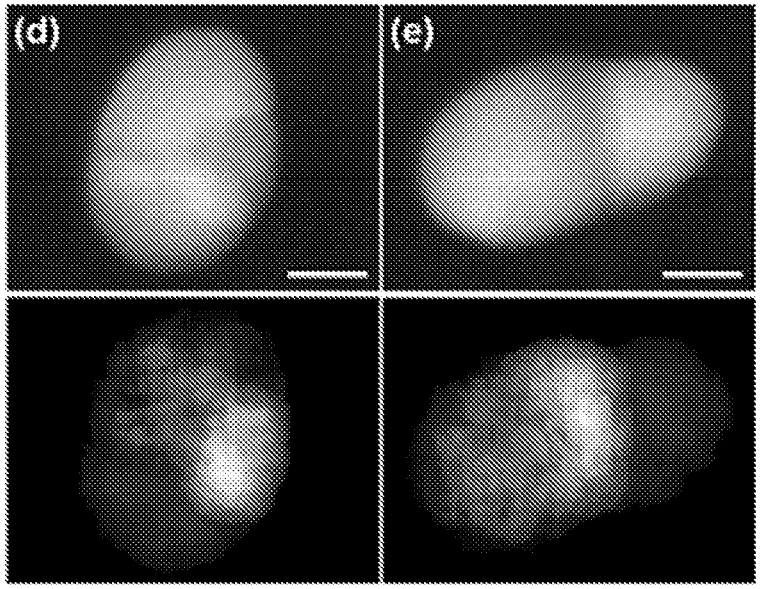
FIGURE 24D  FIGURE 24E

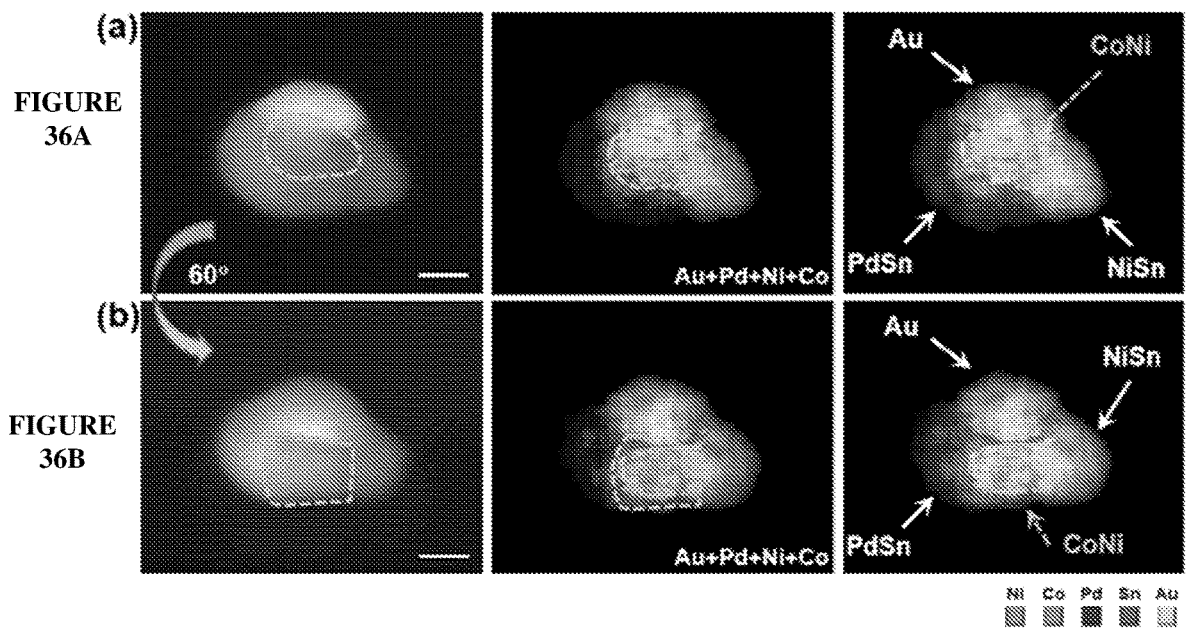
FIGURE 36A
FIGURE 36B
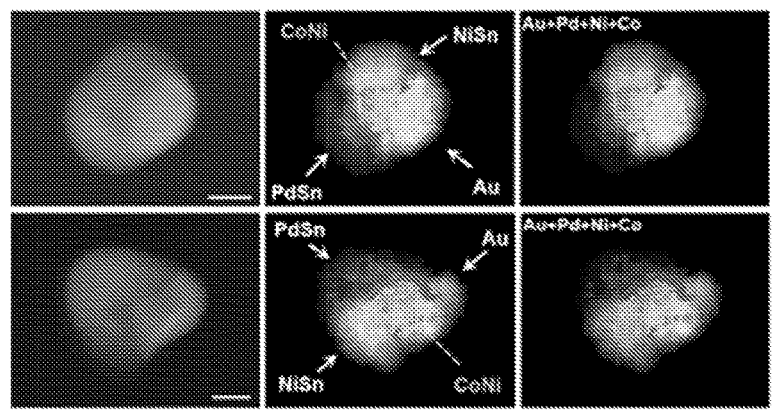
FIGURE 37A
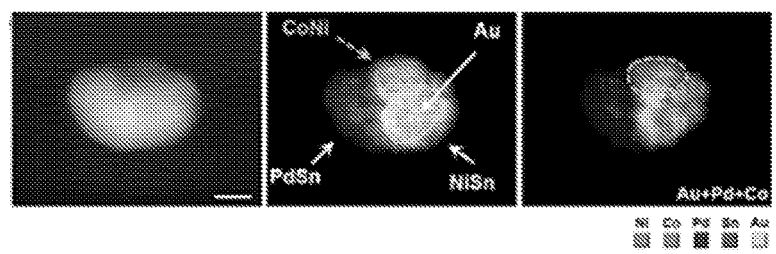
FIGURE 37B

FIGURE 46A
FIGURE 46B
FIGURE 46C
FIGURE 46D
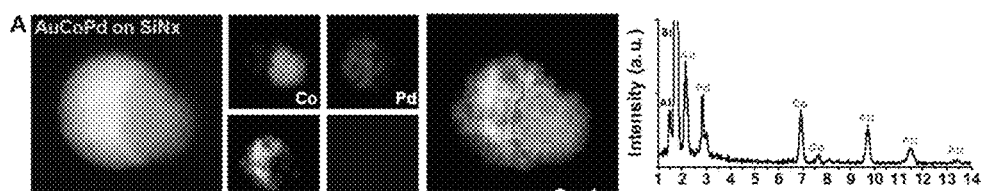
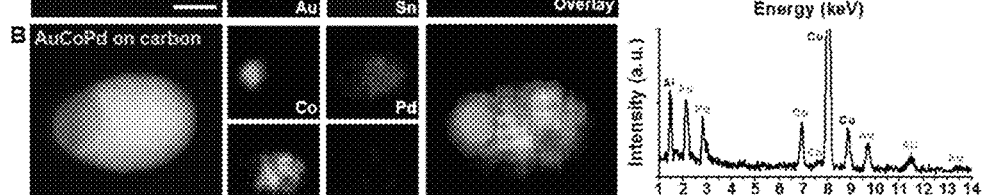
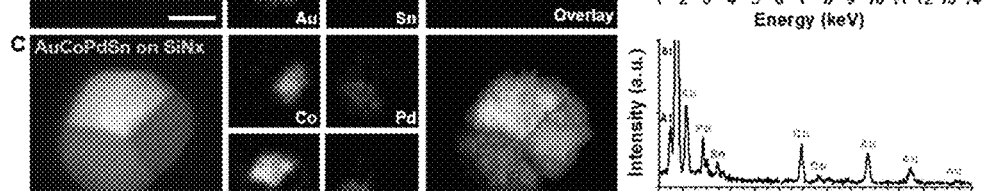
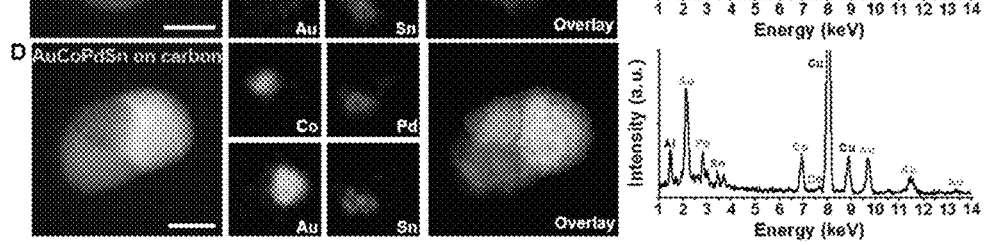

POLYELEMENTAL HETEROSTRUCTURE NANOPARTICLES AND METHODS OF MAKING THE SAME

CROSS-REFERENCE TO RELATED APPLICATIONS

This application is a U.S. National Stage of International Patent Application No. PCT/US2019/046885 filed Aug. 16, 2019, which in turn claims the benefit of U.S. Provisional Application 62/764,882 filed on Aug. 16, 2018, the disclosure of which are each hereby incorporated by reference in their entireties.

STATEMENT OF GOVERNMENT SUPPORT

This invention was made with government support under grant IIP-1621773, awarded by the National Science Foundation. The government has certain rights in the invention.

BACKGROUND

Field of the Disclosure

The disclosure relates to polyelemental nanomaterials and methods of making the same.

Brief Description of Related Technology

Phase boundaries, or interfaces, are important structural features in polyelemental nanomaterials (1-3). The interfaces in multi-phase nanoparticles (NPs) not only structurally define them (4,5), but also introduce structural discontinuity into such materials,(8,9) while at the same time, facilitate electronic interactions between adjacent domains (6,7). These characteristics make multi-phase NPs useful for applications spanning catalysis (2,3,10-12, plasmonics (13-15), electronic devices (4), targeted drug delivery (16), and bio-imaging (5,17). For example, in the case of plasmonic and catalytic NPs, the charge transfer occurring across an interface can be utilized to tune the properties of one material domain with a neighboring one (13,18, and 19). In addition, strain engineering provides a way to modulate the electronic structure of materials when the nearby phases are epitaxial (20). Such synergistic effects (21-23) are also observed in catalysis where the interface between two domains may be rich in high-energy defects (3,24, and 25). Finally, a single NP with multiple interfaces can exhibit collective properties that are not observed in particles comprised of the individual components (both composition and number and types of interface) (26-28). As the field of multi-phase polyelemental NPs continues to progress towards higher compositional diversity and structural complexity (1,2,29-32), understanding how specific classes of interfaces can be established in one particle is crucial for designing novel and functional nanostructures. To date, NPs have been synthesized and characterized with up to four phases,(1,2,33-38) and while such studies identify unique architectures, there is limited general understanding for why specific ones form, and the role of surface/interfacial energy in controlling the architecture of NPs with more than two phases is not fully understood. Indeed, the interfacial energy in multi-phase NPs will be highly dependent on the composition of the domains, the electronic interactions between the domains, the coherence of the interfacial lattice structure, and the influence of defects such as dislocations, all of which may vary dramatically among different systems (1,2, 9, 33-41).

SUMMARY

For polyelemental materials, many interesting properties derive from the interfaces between two or more phases. With nanostructures, one can now synthesize materials with unprecedented combinations of elements, yet there is still a poor understanding of how phases form in such structures and how specific classes of interfaces can be designed and synthesized. In accordance with embodiments, scanning probe block copolymer lithography can be used to explore how PdSn alloys form mixed composition phases with metals with known but complex miscibilities. Every particle synthesized via this technique, including one with as many as seven elements, represents a new composition of matter, and many form unique tri-phase heterostructures with pie-shaped or striped architectures. Density functional theory simulation and experimental work have been used to determine the balance between surface and interfacial energy of the observed phases. From these observations, in accordance with embodiments, methods of making polyelemental systems with specific heterostructures, including tetra-phase nanoparticles with as many as six junctions, are provided. Given the importance of heterostructures in catalysis, plasmonics, and electronics, this work stands to impact the development of both materials and devices spanning many fields.

In accordance with an embodiment, a method of making a tetra-phase polyelemental nanoparticle using tri-phase nanoparticle architectures can include selecting two or more tri-phase nanoparticle architectures, wherein the two or more tri-phase nanoparticle architectures are one or more striped tri-phase architectures, one or more pie-shaped tri-phase architectures, or combinations thereof; identifying from the selected two or more tri-phase nanoparticle architectures groups of metals for generating each of the two or more tri-phase nanoparticle architectures; contacting a tip coated with an ink to a substrate to form a nanoreactor, the ink comprising block copolymer and the metals from the groups of metals identified for generating each of the two or more tri-phase nanoparticle architectures; and annealing the nanoreactors under conditions sufficient to synthesize a tetra-phase polyelemental nanoparticle.

BRIEF DESCRIPTION OF THE DRAWINGS

FIG. 3B is a table listing the surface energies of Au, Co, and $Pd_3Sn$ (111) planes and interfacial surface energies between Au, Co, and $Pd_3Sn$ (111) planes;

FIG. 3C is a schematic illustration of the calculated total surface and interfacial energies of the Au—Co—$Pd_3Sn$ nanoparticles with equal volume of each phase (diameter 20 nm);

FIGS. 9A and 9C show schematic illustration, ADF-STEM images, and EDS mapping of a typical Au—PdSn and a typical Co—PdSn nanoparticle after each annealing step. Scale bars, 20 nm. FIGS. 9B and 9D show the composition variation of each domain in Au—PdSn heterodimers and in Co—PdSn heterodimers after thermal treatment. The results are calculated based on composition tracking of 15 particles for each type of heterodimers;

FIG. 10 is ADF-STEM images and corresponding EDS elemental mapping of an Au—PdSn heterodimer thermally annealed at increasing temperatures (scale bar, 20 nm);

FIGS. 11A and 11B are ADF-STEM images and corresponding EDS characterization of AuCoPdSn nanoparticles with different molar ratios between Pd and Sn (Pd:Sn=1:1, $Au_{0.24}Co_{0.27}Pd_{0.24}Sn_{0.25}$; Pd:Sn=2:1, $Au_{0.30}Co_{0.26}Pd_{0.30}Sn_{0.14}$; Pd:Sn=3:1, $Au_{0.29}Co_{0.29}Pd_{0.30}Sn_{0.11}$; and Pd:Sn=4:1, $Au_{0.38}Co_{0.33}Pd_{0.23}Sn_{0.06}$). The Pd:Sn ratios of each particle are noted above the STEM images (scale bar, 20 nm);

FIG. 11C is an ADF-STEM image and EDS mapping of an AuNiPdSn with Pd:Sn=20:1 ($Au_{0.18}Ni_{0.38}Pd_{0.42}Sn_{0.02}$) (scale bars, 20 nm);

FIG. 13A is $Au_{0.57}Co_{0.17}Pd_{0.16}Sn_{0.10}$, Au—PdSn and Co—PdSn interfaces are perpendicular to the image plane while Au—Co interface is inclined/parallel with the image plane. Scheme depicts the proposed structure of this particle. FIG. 13B is $Au_{0.33}Co_{0.34}Pd_{0.18}Sn_{0.15}$, Au—PdSn interface is perpendicular to the image plane while Co—PdSn and Au—Co interfaces are inclined with the image plane. Scheme depicts the proposed structure of this particle;

In FIG. 14A, Au is oriented along [011] zone axis. Co is along [411] zone axis. The Moiré pattern (D=1.02 nm) at the interface is attributed to the periodical lattice matching between Co {220} and Au {220} planes. In FIG. 14B, Au and Co are epitaxial, both oriented along [111] zone axis. The two phases share {220} planes at the interface. In FIG. 14C Au is oriented along [111] zone axis while Co only shows lattice fringes in one direction that corresponds to one set of {220} planes. In FIG. 14D Au and Co are epitaxial, both oriented along [111] zone axis. The two phases share {422} and {220} planes at the interface;

In FIG. 15A, the FFT of Co domain shows three pairs of reflections, indicating that Co is on [200] zone axis. The FFT of $Pd_3Sn$ domain only show one pair of reflections corresponding to $Pd_3Sn$ (210) planes. In FIG. 15B, Co is oriented along [111] zone axis while no lattice plane is observable at the same direction in the $Pd_3Sn$ domain. In FIG. 15C, Co and $Pd_3Sn$ are on [411] zone axis. The two phases share {311} planes at the interface;

In FIG. 16A, Au is oriented along [111] zone axis. $Pd_3Sn$ shows lattice fringes that can be attributed to {220} planes. The two phases share {220} planes at the interface. In FIG. 16B, Au and $Pd_3Sn$ share {111} planes at the interface. In FIG. 16C, Au and $Pd_3Sn$ share {111} planes at part of the interface. Stacking faults are present in the Au domain;

In FIG. 17A, the FFT of Co is indicative of Co [411] zone axis. The FFT of Au and $Pd_3Sn$ show reflections in the same direction that correspond to {220} planes. In FIG. 17B, Au and Co are both oriented along [411] zone axis. The two phases share {311} planes at the interface. $Pd_3Sn$ domain only shows (224) crystallographic planes. In FIG. 17C, Au is along [310] zone axis. $Pd_3Sn$ is along {110} zone axis. Meanwhile, no lattice plane is observed in the Co domain. Despite the same domains (Au, Co, and $Pd_3Sn$) constituting the nanoparticles in FIGS. 17A-17C, the interfacial lattice structure differs between each individual nanoparticle. Despite this observation, the HRTEM images of all the Au—Co—$Pd_3Sn$ nanoparticles confirm the formation of three solid-state interfaces in one particle;

FIGS. 21A and 21B are two-dimension of spherical nanoparticle models with either (FIG. 21A) three or (FIG. 21B) two interfaces. Both sphere models consist of three different domains (denoted as D1, D2, and D3). The three domains in Type I nanoparticles are interconnected and have identical shape and size. The three domains in Type II nanoparticles form two interfaces where D1 and D3 are not connected. The volume of the three domains in each model are equal, i.e., V(D1)=V(D2)=V(D3);

FIGS. 22A and 22B are ADF-STEM images and EDS mapping of representative Au—Co—PdSn kinetic structures synthesized in polymer nanoreactors. Dashed circles in the ADF-STEM images outline the position of Co phase as guides for the eye. Scale bars, 20 nm. During the last annealing step of particle synthesis (500° C., H$_2$), kinetic particles were trapped at 0.5 h time points, which results in particles containing more than three metal domains. In FIG. 22A the particle is $Au_{0.32}Co_{0.31}Pd_{0.24}Sn_{0.14}$ and in FIG. 22B the particle is $Au_{0.27}Co_{0.34}Pd_{0.27}Sn_{0.12}$, Co phases are not fully aggregated to form one integral metal domain. Continuous annealing for another 1 h effectively triggers intraparticle coarsening between the discrete Co domains;

In FIG. 23A, heterodimers can be synthesized by combining PdSn with any of the other five metals, which lead to Au—PdSn, Ag—PdSn, $Cu_{0.92}Pd_{0.08}$—$Cu_{0.2}(PdSn)_{0.8}$, Co—PdSn, and $Ni_{0.6}Sn_{0.4}$—$Ni_{0.08}(PdSn)_{0.92}$. In FIG. 23B, AuAg—PdSn, AuCu—PdSn, and CoNi—PdSn are heterodimers. Au—Co—PdSn, Au—NiSn—PdSn, Au—Cu—PdSn, Ag—Cu—PdSn, Ag—NiSn—PdSn, and Ag—Co—PdSn are heterotrimers with three interconnected interfaces. Co—Cu—PdSn is a heterotrimer with two disconnected interfaces. In FIG. 23C, AuAg—AuCu—PdSn, AuCu—CuNi—PdSn, AuAg—Co—PdSn, AuAg—NiSn—PdSn, AuCu—Co—PdSn, Au—CoNi—PdSn, Ag—CuNi—PdSn, Ag—CoNi—PdSn are heterotrimers with three interconnected interfaces. CoNi—CuNi—PdSn is a heterotrimer with two disconnected interfaces. Ag—Cu—Co—PdSn is a heterotetramer with four interfaces. In FIG. 23D, AuAg—CoNi—PdSn and AuCu—CuNi—PdSn are heterotrimers with three interfaces. AuAg—AuCu—NiSn—PdSn and AuAg—AuCu—Co—PdSn are heterotetramers with five interfaces. Ag—Cu—CoNi—PdSn is a heterotetramer with four interfaces. In FIG. 23E, AuAgCu—CoNi—PdSn is a heterotrimer with three interfaces. The number of phases in one particle is highly dependent on particle composition. Here one specific composition for each combination of metals is shown. Detailed information about the nanoparticles shown in this figure can be found in FIG. 25-28;

FIGS. 24A-24E are ADF-STEM images and EDS elemental mapping of Ag—Cu—PdSn tri-phase heterostructured nanoparticles showing the dominant architecture of Ag—Cu—PdSn tri-phase nanoparticles;

In FIG. 25A the nanoparticle is $Au_{0.57}Pd_{0.27}Sn_{0.16}$, in FIG. 25B the nanoparticle is $Ag_{0.55}Pd_{0.26}Sn_{0.19}$, in FIG. 25C the nanoparticle is $Cu_{0.46}Pd_{0.39}Sn_{0.15}$, in FIG. 25D the nanoparticle is $Co_{0.50}Pd_{0.32}Sn_{0.18}$, in FIG. 25E the nanoparticle is $Ni_{0.32}Pd_{0.37}Sn_{0.31}$. Scale bars, 15 nm;

In FIG. 26A the nanoparticle is $Au_{0.21}Ag_{0.32}Pd_{0.32}Sn_{0.15}$, in FIG. 26B the nanoparticle is $Au_{0.31}Co_{0.34}Pd_{0.21}Sn_{0.14}$, in FIG. 26C the nanoparticle is $Au_{0.25}Ni_{0.24}Pd_{0.20}Sn_{0.31}$, in FIG. 26D the nanoparticle is $Au_{0.24}Cu_{0.38}Pd_{0.25}Sn_{0.13}$, in FIG. 26E the nanoparticle is $Ag_{0.30}Cu_{0.30}Pd_{0.27}Sn_{0.13}$, in FIG. 26F the nanoparticle is $Ag_{0.22}Ni_{0.24}Pd_{0.21}Sn_{0.33}$, in FIG. 26G the nanoparticle is $Ag_{0.43}Co_{0.23}Pd_{0.23}Sn_{0.11}$, in FIG. 26H the nanoparticle is $Cu_{0.33}Ni_{0.32}Pd_{0.16}Sn_{0.19}$, in FIG. 26I the nanoparticle is $Cu_{0.29}Co_{0.34}Pd_{0.21}Sn_{0.16}$, in FIG. 26J the nanoparticle is $Co_{0.38}Ni_{0.23}Pd_{0.18}Sn_{0.21}$. Scale bars, 15 nm;

In FIG. 27A the nanoparticle is $Au_{0.12}Ag_{0.30}Cu_{0.28}Pd_{0.20}Sn_{0.10}$, in FIG. 27B the nanoparticle is $Au_{0.12}Cu_{0.19}Ni_{0.26}Pd_{0.23}Sn_{0.20}$, in FIG. 27C the nanoparticle is $Au_{0.06}Ag_{0.10}Co_{0.24}Pd_{0.39}Sn_{0.21}$, in FIG. 27D the nanoparticle is $Au_{0.20}Ag_{0.16}Ni_{0.21}Pd_{0.19}Sn_{0.24}$, in FIG. 27E the nanoparticle is $Au_{0.25}Cu_{0.25}Co_{0.18}Pd_{0.22}Sn_{0.10}$, in FIG. 27F the nanoparticle is $Au_{0.24}Co_{0.21}Ni_{0.15}Pd_{0.17}Sn_{0.23}$, in FIG. 27G the nanoparticle is $Ag_{0.25}Cu_{0.25}Ni_{0.20}Pd_{0.16}Sn_{0.14}$, in FIG. 27H the nanoparticle is $Ag_{0.32}Cu_{0.20}Co_{0.21}Pd_{0.15}Sn_{0.12}$, in FIG. 27I the nanoparticle is $Cu_{0.38}Co_{0.15}Ni_{0.12}Pd_{0.20}Sn_{0.15}$, in FIG. 27J the nanoparticle is $Ag_{0.31}Co_{0.18}Ni_{0.13}Pd_{0.21}Sn_{0.17}$. Scale bars, 15 nm;

In FIG. 28A the nanoparticle is $Au_{0.16}Ag_{0.09}Cu_{0.18}Ni_{0.15}Pd_{0.22}Sn_{0.20}$, in FIG. 28B the nanoparticle is $Ag_{0.25}Cu_{0.16}Co_{0.16}Ni_{0.15}Pd_{0.17}Sn_{0.11}$, in FIG. 28C the nanoparticle is $Au_{0.10}Ag_{0.19}Co_{0.19}Ni_{0.15}Pd_{0.20}Sn_{0.17}$, in FIG. 28D the nanoparticle is $Au_{0.18}Ag_{0.16}Cu_{0.20}Co_{0.23}Pd_{0.13}Sn_{0.10}$, in FIG. 28E the nanoparticle is $Au_{0.14}Cu_{0.18}Co_{0.22}Ni_{0.16}Pd_{0.17}Sn_{0.13}$, in FIG. 28F the nanoparticle is $Au_{0.16}Ag_{0.13}Cu_{0.16}Co_{0.15}Ni_{0.15}Pd_{0.15}Sn_{0.09}$. Scale bars, 15 nm;

FIG. 36A is ADF-STEM image and EDS mapping of an Au—CoNi—NiSn—PdSn tetra-phase nanoparticle with six phase boundaries ($Au_{0.18}Co_{0.14}Ni_{0.33}Pd_{0.18}Sn_{0.17}$). Scale bars, 20 nm. Dashed circles in first and second columns of the images outline the position of the CoNi phase as guides;

FIG. 36B is ADF-STEM image and EDS mapping of the same particle after rotating the particle 60°. Scale bars, 20 nm. Dashed circles in first and second columns of the images outline the position of the CoNi phase as guides. After rotating the nanoparticle, the CoNi phase moves from the center of the image to the bottom of the image, indicating that the CoNi domain is on top of the particle;

FIG. 37A is ADF-STEM images and EDS elemental mapping of two representative Au—CoNi—NiSn—PdSn tetra-phase nanoparticles ($Au_{0.17}Co_{0.11}Ni_{0.33}Pd_{0.24}Sn_{0.15}$ and $Au_{0.18}Co_{0.09}Ni_{0.33}Pd_{0.25}Sn_{0.15}$). Overlays of all element maps (middle column) and selected element maps (right column) indicates that the CoNi phases are either on top of the particle or at the bottom the of particle (scale bars, 20 nm);

FIG. 37B is ADF-STEM images and EDS elemental mapping of an Au—CoNi—NiSn—PdSn tetra-phase nanoparticle ($Au_{0.20}Co_{0.12}Ni_{0.32}Pd_{0.20}Sn_{0.16}$) with the CoNi phase locating on the edge. Dashed circle outlines the position of CoNi phase as a guide. Scale bars, 20 nm;

FIGS. 46A and 46B are ADF-STEM images, EDS elemental mapping, and EDS spectra of AuPd—Co heterodimers synthesized on Si TEM grids with SiNx support films or on Cu TEM grids with carbon support films, in FIG. 46A the nanoparticles are $Au_{0.32}Co_{0.34}Pd_{0.34}$, in FIG. 46B the nanoparticles are $Au_{0.29}Co_{0.33}Pd_{0.38}$;

FIGS. 46C and 46D are ADF-STEM images, EDS elemental mapping, and EDS spectra of Au—Co—PdSn heterotrimers synthesized on Si TEM grids with SiNx support films or on Cu TEM grids with carbon support films, in FIG. 46C the nanoparticles are $Au_{0.31}Co_{0.34}Pd_{0.21}Sn_{0.14}$; and in FIG. 46D the nanoparticles are $Au_{0.33}Co_{0.29}Pd_{0.25}Sn_{0.13}$.

DETAILED DESCRIPTION

Scanning probe block copolymer lithography (SPBCL), which uses lithographically defined polymer domes as nanoreactors to synthesize multimetallic nanoparticles (NPs) with broad material choices, allows one to study polyelemental systems of unprecedented complexity[30]. Since the positions of NPs in an SPBCL experiment are spatially controlled, the NPs can be heated to reach thermodynamic architectures while avoiding coarsening between neighboring NPs. Therefore, SPBCL allows one to study multi-phase NPs at a single NP level on substrates that are amenable to thermal annealing and electron microscopy characterization.

In accordance with embodiments, SPBCL can be used in combination with density functional theory (DFT) simulations to understand the principles of interface arrangement in multi-phase NPs. From these studies, unusual miscibility gaps between PdSn alloys and other metals (such as Au, Ag, Cu, Co, and Ni), have beneficially been found to allow for the generation of multi-phase nanoparticles. In embodiments, the miscibility gaps between PdSn alloys and other metals can be used in combination with carefully controlled annealing parameters to construct a library of compositionally and structurally-related multi-phase NPs. Based on the architecture of the resulting NPs, design rules for making polyelemental heterostructures with increasing complexity can be developed. It has been demonstrated that the methods of the disclosure can be used to form an unprecedented tetra-phase NP made from Au, Co, Pd, Sn, and Ni with six phase boundaries.

Methods of the disclosure can include depositing a polymer ink solution on a substrate to for a printed individual of the polymer ink solution, thereby forming a nanoreactor; and annealing in $H_2$, using a multistage annealing process, to form multi-elemental, multi-phase nanoparticles. The polymer ink solution can be deposited onto a substrate using any suitable technique such as SPBCL, dip-pen nanolithography, microcontact printing, spin-coating, dip-coating, spray-coating, drop-casting, and the like. Each printed indicia can include an amount of polymer ink solution on an attoliter scale. For example, each printed indicia can include about 1 attoliter to about 100 attoliters of polymer ink solution.

Figure 42A:
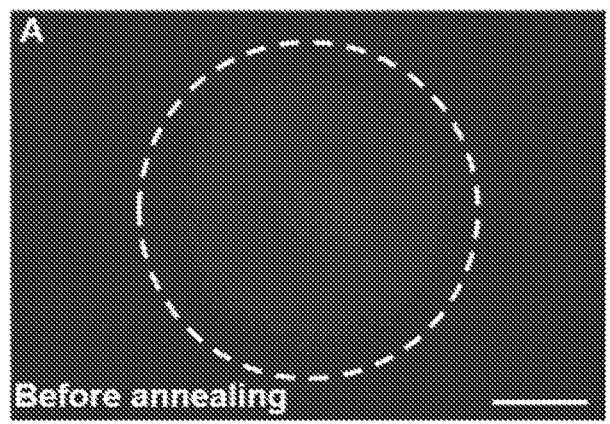
FIG. 42A is an ADF-STEM image of an as-deposited polymer nanoreactor in accordance with the disclosure; dashed circle indicates the edge of the reactor. Scale bar is 300 nm.
Figure 42B:
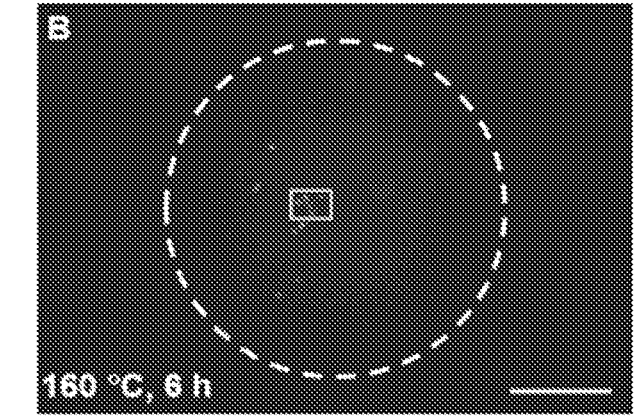
FIG. 42B is an ADF-STEM image of the polymer nanoreactor of FIG. 42A after being annealed in $H_2$ at 160° C. for 6 hours; dashed circle indicates the edge of the reactor. Scale bar is 300 nm.
Figure 42C:
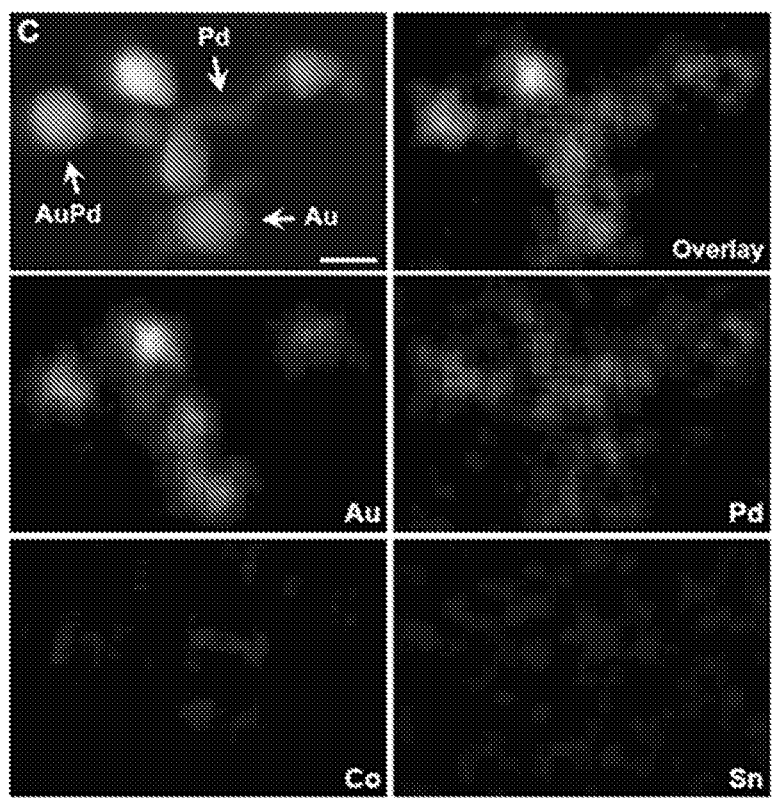
FIG. 42C is ADF STEM image and EDS elemental mapping of the nanoparticles located in the square frame in FIG. 42B. The nanoparticles are composed of three phases—Au, Pd, and AuPd alloy. Scale bar is 15 nm.
Figure 43A:
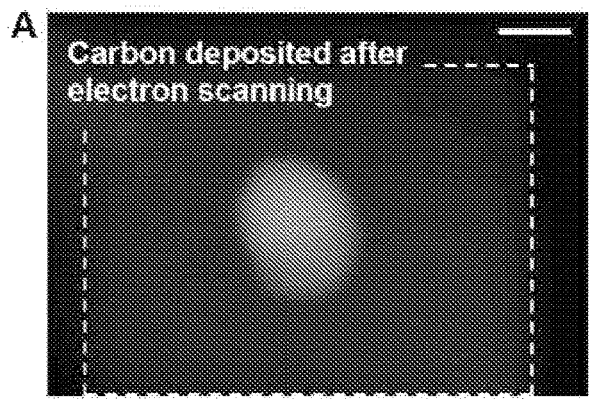
FIG. 43A is ADF-STEM image of a Co—PdSn heterodimer synthesized on SiNx substrates. To mark the position of the nanoparticle, a rectangular carbon layer was deposited by exposing the particle to E-beam for 10 min.
Figure 43B:
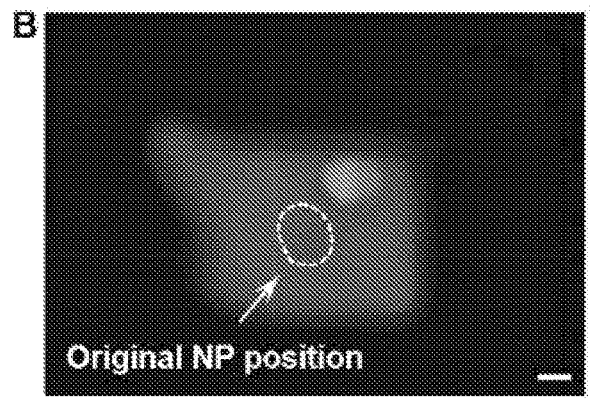
FIG. 43B is an ADF-STEM image of the nanoparticle in 43A after thermal annealing in $H_2$ at 650° C. for 12 h. After being thermally annealed, the Co—PdSn heterodimer rotated and moved towards the upper right corner of the carbon layer. Scale bar, 20 nm.
Figure 43C:
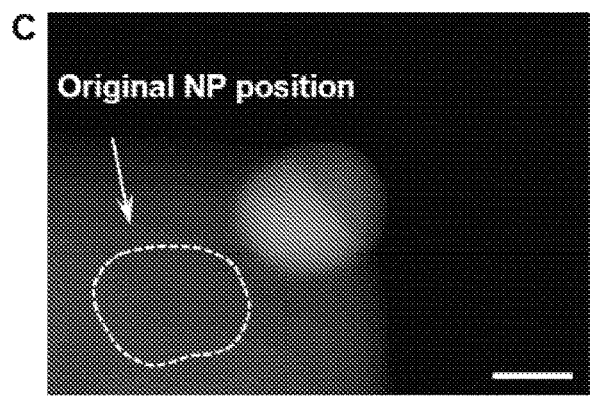
FIG. 43C is an ADF-STEM image of the nanoparticle in 43A after thermal annealing in $H_2$ at 650° C. for 24 h. After being thermally annealed, the Co—PdSn heterodimer rotated and moved towards the upper right corner of the carbon layer. Scale bar, 20 nm.
Figure 43D:
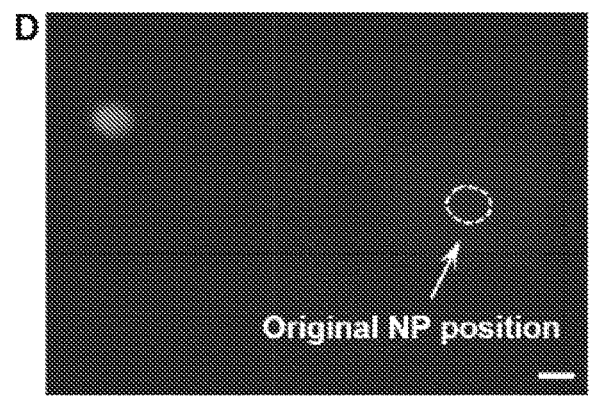
FIG. 43D is an ADF-STEM image of a Au—PdSn heterodimer synthesized on SiNx substrates. After being deposited with a carbon layer, the nanoparticle was annealed in $H_2$ at 550° C. for 12 h. The Au—PdSn heterodimer moved out of the carbon layer. Scale bar, 20 nm.

The polymer ink solution can include a block copolymer and the metals and/or metal precursors for the desired metals to be in the final nanoparticle. At a minimum the polymer ink solution includes tin and/or a tin precursor. For example, the tin precursor can be one or more of $SnCl_4$, $SnCl_2$, $Na_2SnO_3$, and $K_2SnO_3$. The inclusion of tin in the polyelemental systems has been found to allow for formation of distinct phases domains. For example, it has been found that tin in the presence of Pd allows for segregation of PdSn domains with other metals. Referring to FIG. 42A-42C, without the Sn, it was found that phase segregation between Pd and other metals is not observed. In embodiments, the polymer ink solution includes a molar ration of Pd:Sn of less than or equal to 3:1. Referring to FIG. 42B, in molar ratios in excess of 4:1, it was found that $Pd_3Sn$ remains an individual domain while excess amounts of Pd diffuses into other metal domains.

The polymer ink solution can include any block copolymer compatible with the metals and metal precursors. For example the polymer can be PEO-b-P2VP or PEO-b-P4VP. The polymer ink solution can include one or more, preferably two or more, additional metals and/or metal precursors. Metals can include one or more two or more of Au, Ag, Cu, Co, Ni, and Pd. Metal precursors can include one or more or two or more of $HAuCl_4.3H_2O$, $AgNO_3$, $Cu(NO_3)_2.xH_2O$, $Co(NO_3)_2.6H_2O$, $Ni(NO_3)_2.6H_2O$, and $(NH_4)_2PdCl_6$.

When the block copolymer includes pyridyl groups, the polymer ink solution can include a molar ratio of pyridyl group to total metal and/or metal precursors of about 4:1 to about 512:1, about 48:1 to about 256:1, about 4:1 to about 50:1, about 200:1 to about 500:1, and other such intermediary ranges.

In embodiments, the polymer ink solution can have a pH (or adjusted to have a pH) of about 1. The pH can be adjusted, for example, by addition of HCl.

The polymer ink solution can be made by dissolving the block copolymer and the metals and/or metal precursors in water and adjusting the pH, if needed. The ink solution can be stirred to disperse the metals in the polymer. Stirring can be done for any suitable time. For example, stirring can be done for 1 hour at room temperature prior to use.

The methods of the disclosure include a multiple stage annealing process performed entirely in $H_2$ in which the deposited nanoreactors are annealed in a first stage to aggregate metal atoms in the nanoreactor and a then in a second stage reduce the aggregated metal atoms to produce the multiple element multi-phase nanoparticle. The first stage of annealing can include multiple annealing steps at different temperatures to aggregate the different metal atoms within the nanoreactor. Methods of the disclosure provide multiple annealing steps at increasing temperatures within the first stage to aggregate metals at the lowest temperature at which they will aggregate. That is, the methods do not simply utilize a single temperature (i.e., that of the metal requiring the highest temperature for aggregation) but rather aggregate each of the metal types at their respective aggregation temperatures. This is in contrast to conventional methods, which utilize only a single annealing stage and do not utilize individual annealing temperatures for individual aggregation of the metals at their lowest temperature for aggregation. Any suitable number of annealing steps can be done in the first stage depending on the number of different metals and associated aggregation temperatures in the nanoreactor. Selection of suitable annealing temperature for aggregation of a given metal atom can be readily selected based on common knowledge in the art. For example, the first stage of the annealing process can include a first low-temperature anneal at a first anneal time and a second higher-temperature anneal at a second anneal time. The first low-temperature anneal can be performed at a temperature of about 100° C. to about 200° C., while the second higher-temperature anneal can be performed at a temperature of about 200° C. to about 300° C. The first stage anneal generally includes two or more steps of increasing annealing temperature. The annealing time in any one or more of the annealing steps of the first stage can be the same or different and can be in a range of about 1 hours to about 12 hours, about 4 hours to about 6 hours, and 6 hours to about 10 hours.

Figure 44:
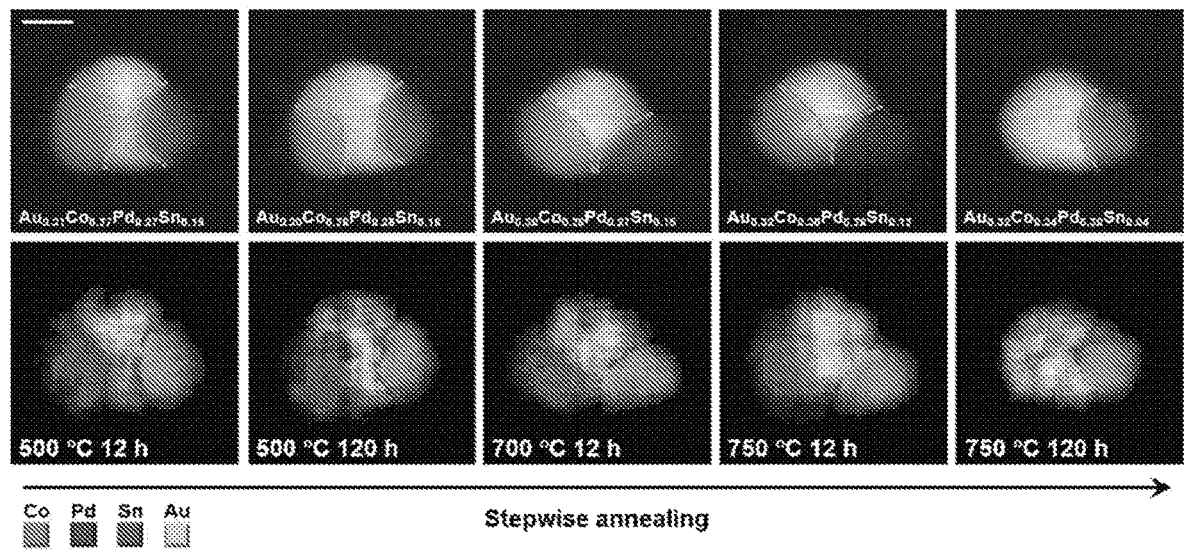
FIG. 44 is ADF-STEM images and corresponding EDS elemental mapping of a two-interface Au—Co—PdSn heterotrimer thermally annealed at prolonged times and elevated temperatures. Dashed lines outline the position of phase boundaries. Scale bar, 15 nm. The two-interface particle shows a tendency to evolve into a three-interface architecture. Evaporative loss of Sn is inevitable when the particle is annealed at 750° C. for a long time.
Figure 45:
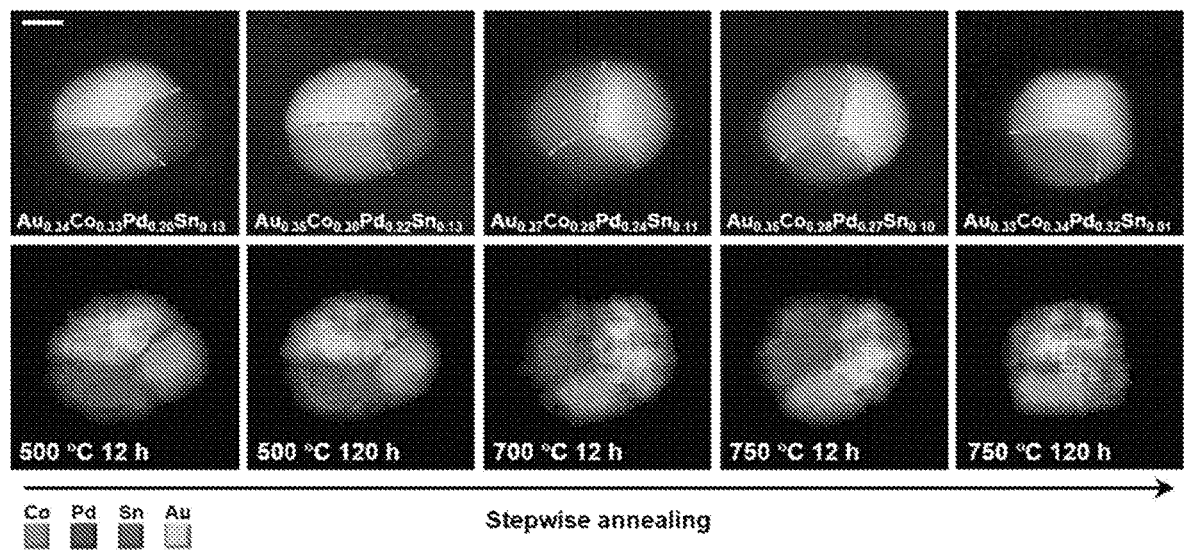
FIG. 45 is ADF-STEM images and corresponding EDS elemental mapping of a three-interface Au—Co—PdSn heterotrimer thermally annealed at prolonged times and elevated temperatures. Dashed yellow lines outline the position of phase boundaries. Scale bar, 15 nm. The three-interface architecture is relatively unchanged under long-term and high-temperature annealing. However, evaporative loss of Sn is inevitable when the particle is annealed at 750° C. for a long time.

The second stage of the annealing process is performed at a sufficiently high temperature to reduce the aggregated metal atoms to form the nanoparticle. For example, the second stage annealing process can be performed at a temperature of about 500° C. to about 800° C. The second stage annealing can be performed for about 6 hours to about 24 hours, about 10 hours to about 12 hours, about 6 hours to about 12 hours, or about 8 hours to about 14 hours. As shown in FIG. 44, annealing at higher temperatures and/or for extended periods of time can results in structural changes to the nanoparticle. However, evaporative loss of Sn can occur when annealing at temperatures of 750° C. or higher for extended periods of time.

Any suitable annealing ramp times can be used between the two or more steps of the first annealing stage, as well as between the first annealing stage and the second annealing stage.

For example, in embodiments, the first annealing stage can include a ramp to 160° C. under $H_2$ in 10 min, a first annealing step at 160° C. for 6 h, a ramp to 300° C. in 10 min, and a second annealing step at 300° C. for 6 h. The process can then include a ramp to 500° C. in 10 min to perform the second stage of the annealing process at 500° C. for 12 h. Other such combinations of annealing times and temperatures are also contemplated herein.

Theoretically Possible Number of Interfaces in Multi-Phase Nanoparticles

The possible number of different interfaces in a n-phase NP is between n−1 and $$\binom{n}{2},$$

where $$\binom{n}{2}$$

is the number of total selections of 2 phases from the n phases $$\left(\binom{n}{2} = \frac{n(n-1)}{2}\right).$$

If one considers kinetic particles, multi-phase NPs have an almost unlimited number of possible architectures, even within particles with a fixed composition and size. However, as particles reconfigure to decrease the total surface and interfacial energy through the migration of atoms/domains, kinetically-trapped multi-phase NPs will transform into thermodynamic architectures once enough energy has been provided to trigger this process.

In various embodiments, thermodynamic architectures of heterostructured NPs (not including core-shell structures) were considered. For a n-phase NP, the maximum possible number of different interfaces is $$\binom{n}{2},$$

which occurs when an phases are interconnected. Since the n phases must be part of a single NP, the minimum possible number of interfaces is (n−1), which occurs when the n phases are bound in a row. Therefore, bi-phase heterostructured NPs have one type of architecture, i.e., a heterodimer with one interface. Tri-phase NPs will have two types of architectures: one is a striped heterotrimer with two interfaces while the other is a pie-shaped structure consisting of three interfaces. For tetra-phase NPs, the number of possible interfaces within a single NP ranges from three to six. FIG. 1 depicts the proposed architecture of all possible bi-phase, tri-phase, and tetra-phase heterostructured NPs, and the proposed relationship between lower and higher order structures.

Figures 7A, 7B:
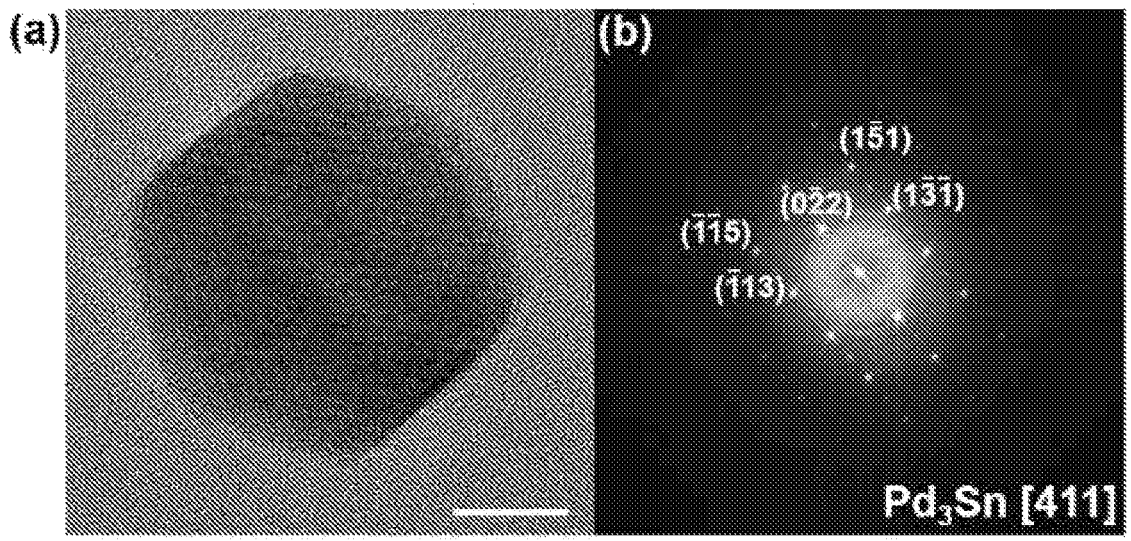
FIG. 7A is HRTEM image of a representative $Pd_{0.75}Sn_{0.25}$ nanoparticle synthesized in a polymer nanoreactor (scale bar, 5 nm)
FIG. 7B is Fast Fourier transform (FFT) and of the nanoparticle in FIG. 7A indicating that the nanoparticle possesses $Pd_3Sn$ intermetallic structure.
Figure 7C:
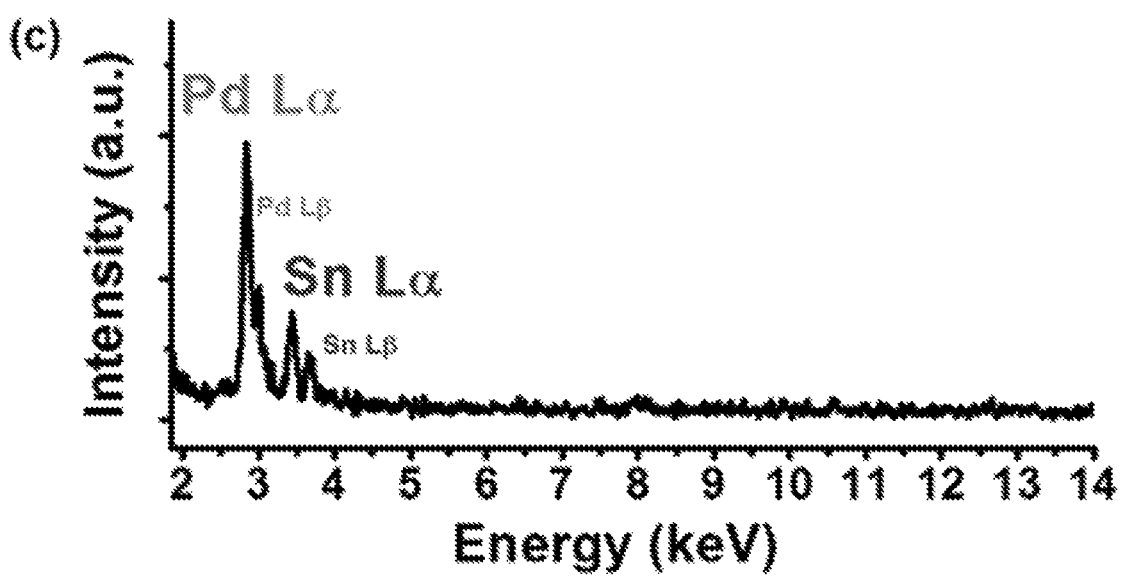
FIG. 7C is an EDS spectrum of the nanoparticle in FIG. 7A indicating that the nanoparticle possesses $Pd_3Sn$ intermetallic structure.
Figure 8A:
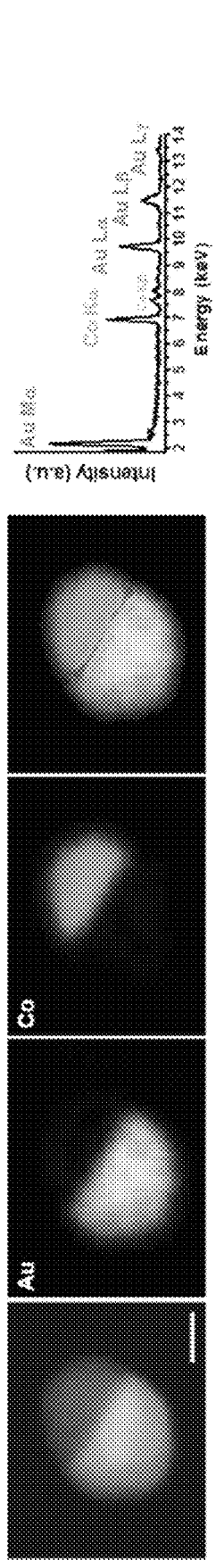
FIG. 8A is ADF-STEM images, EDS elemental mapping, and EDS spectra of Au—Co ($Au_{0.5}Co_{0.5}$) heterostructured nanoparticles synthesized in polymer nanoreactors (Scale bars, 20 nm). The Cu Kα signals at 8.0 keV in the EDS spectra are from the TEM sample holder.
Figure 8B:
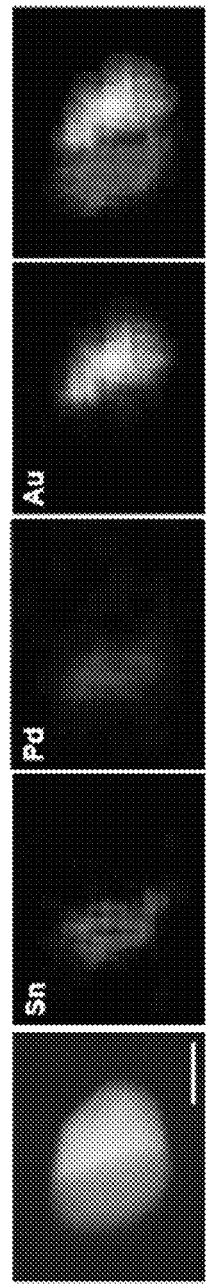
FIG. 8B is ADF-STEM images, EDS elemental mapping, and EDS spectra of Au—PdSn ($Au_{0.57}Pd_{0.27}Sn_{0.16}$) heterostructured nanoparticles synthesized in polymer nanoreactors (Scale bars, 20 nm). The Cu Kα signals at 8.0 keV in the EDS spectra are from the TEM sample holder.
Figure 8C:
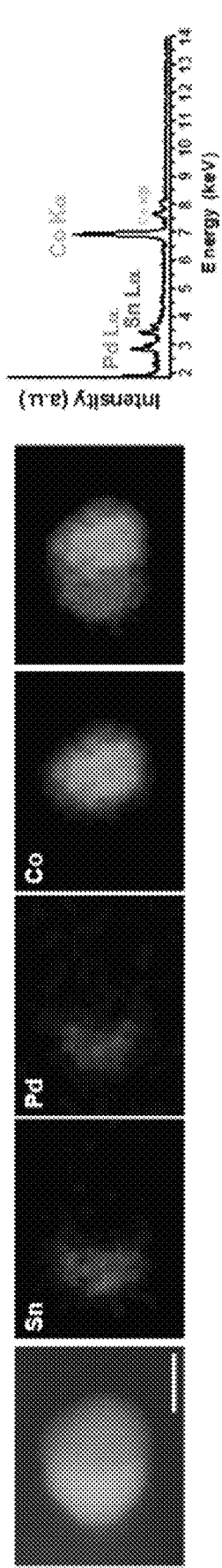
FIG. 8C is ADF-STEM images, EDS elemental mapping, and EDS spectra of Co—PdSn ($Co_{0.66}Pd_{0.17}Sn_{0.17}$) heterostructured nanoparticles synthesized in polymer nanoreactors (Scale bars, 20 nm). The Cu Kα signals at 8.0 keV in the EDS spectra are from the TEM sample holder.
Figure 9A:
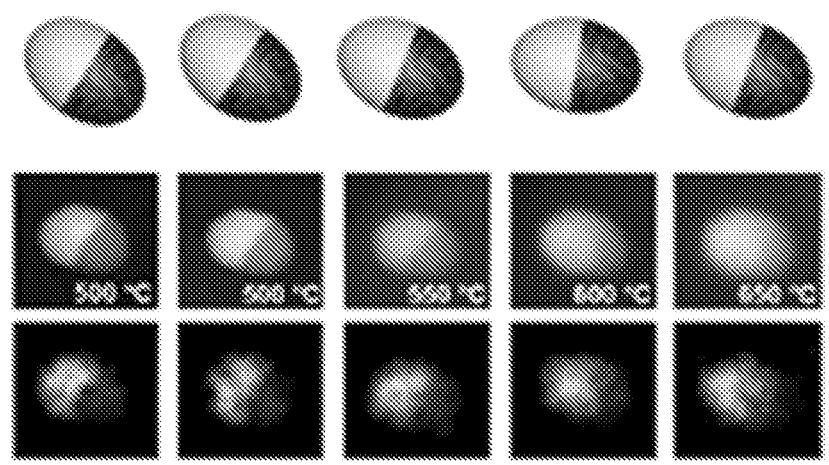
FIGS. 9A-9D are stability test of (FIGS. 9A and 9B) Au—PdSn and (FIGS. 9C and 9D) Co—PdSn heterodimers subjected to thermal annealing. The particles were heated under $H_2$ at different conditions and quickly cooled down to ambient temperature in 0.5 h.
Figure 9B:
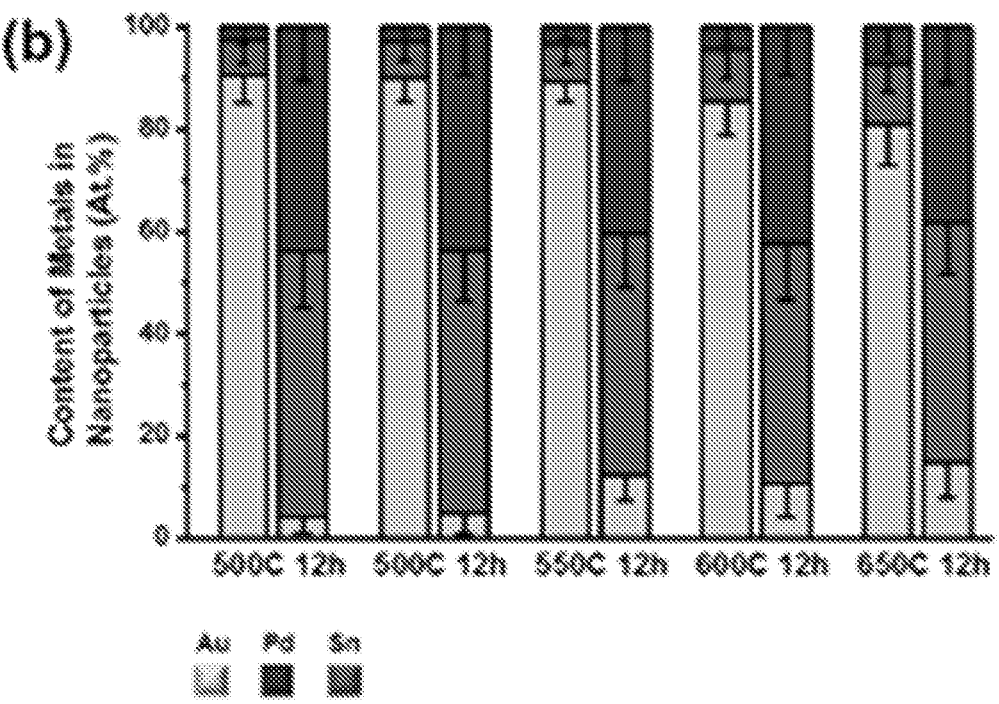
Figure 9C:
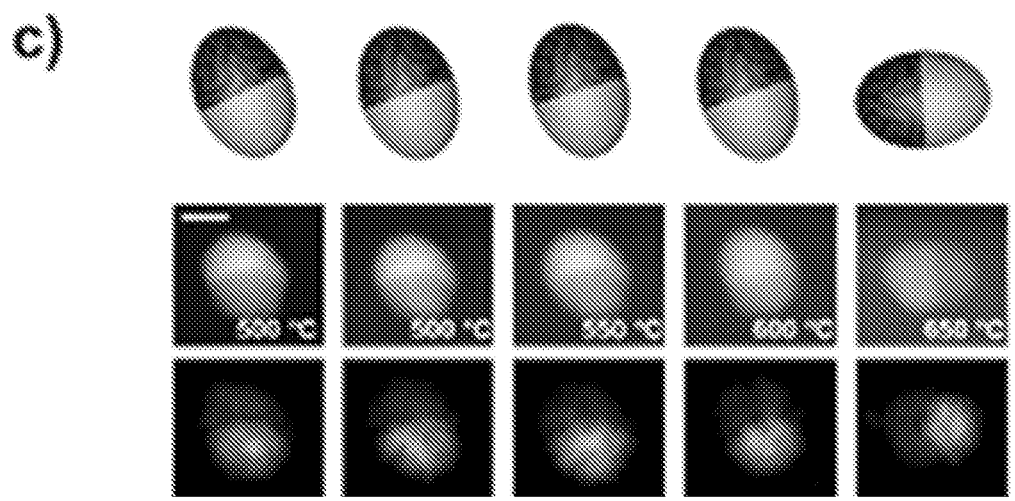
Figure 9D:
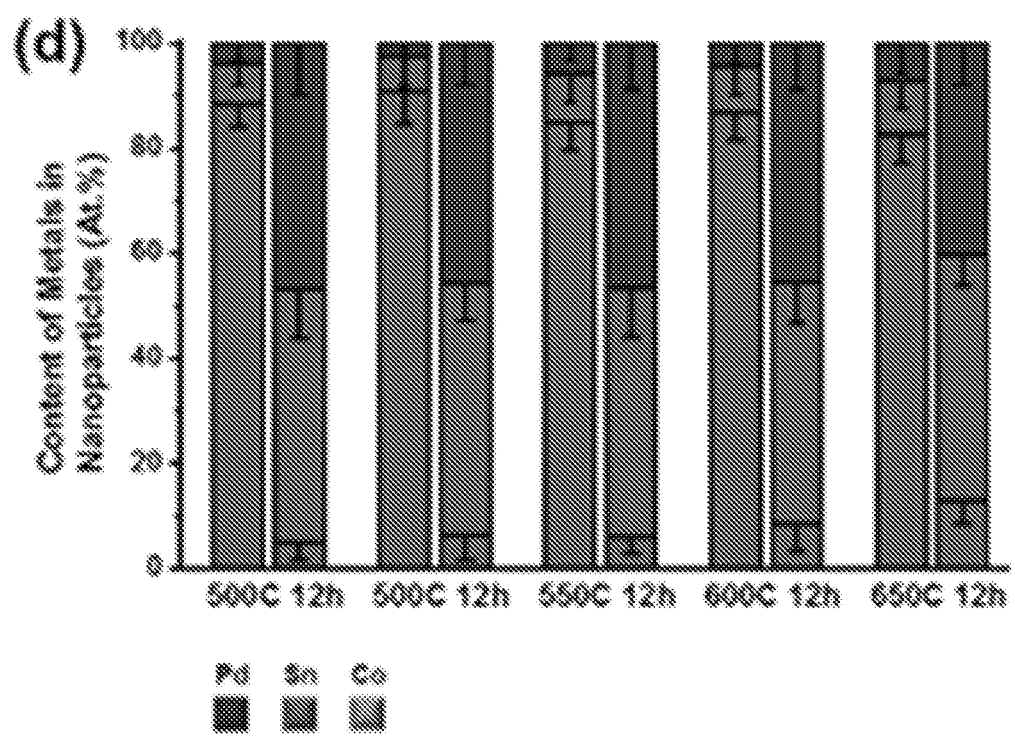
Figure 12:
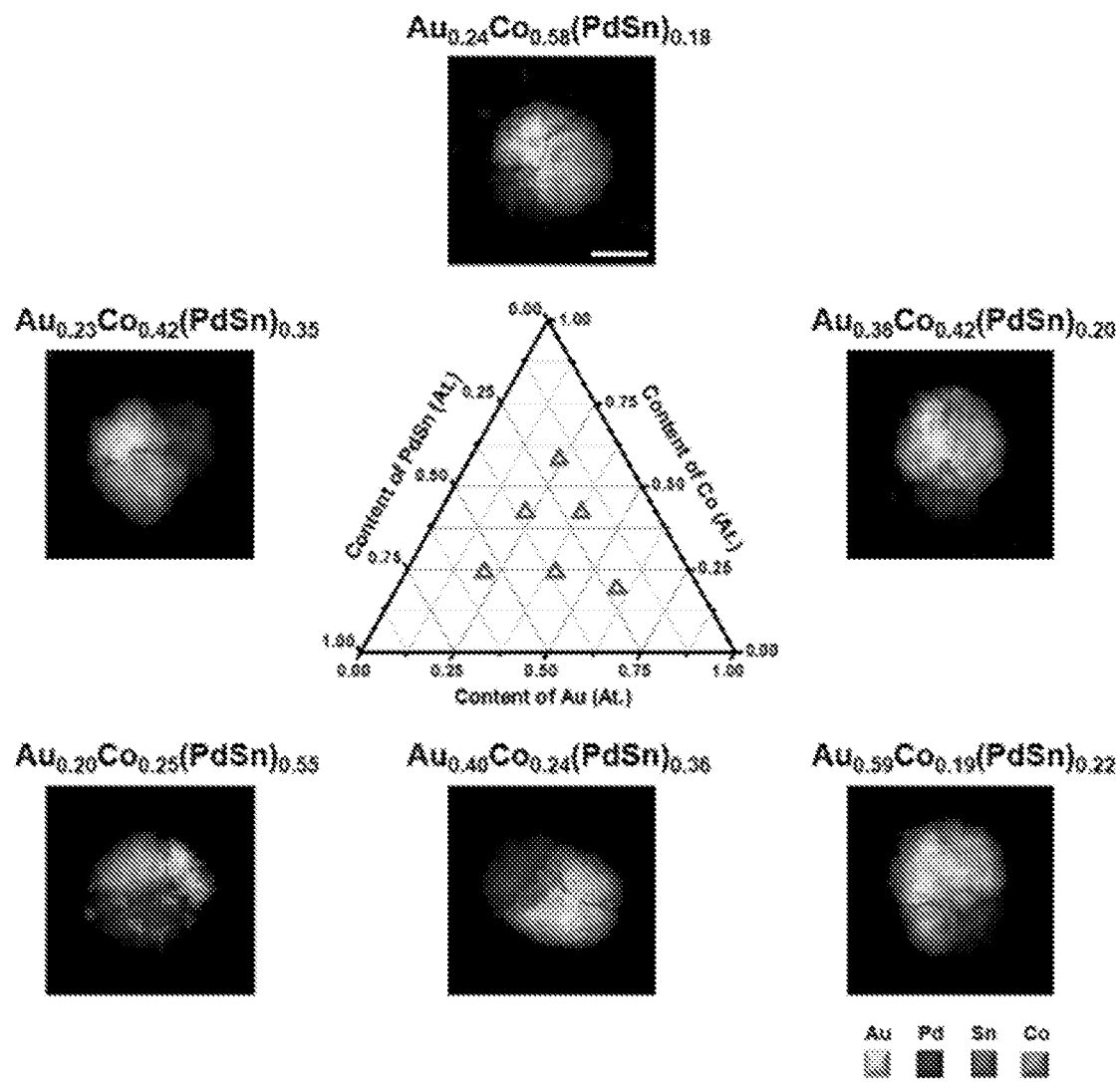
FIG. 12 is an EDS characterization of Au—Co—PdSn nanoparticles with different compositions. The molar ratio of Pd:Sn is approximately 1:1 in each nanoparticle. The varying content of Au, Co, and PdSn only changes the size of each domain in the particles. All the particles possess the same architecture with three interconnected phase boundaries. Scale bar: 20 nm.

In accordance with embodiments, a systematic study of a septenary system can be generated. The septanary system can include particles containing combinations of Au, Ag, Cu, Co, Ni, Pd and Sn. This can result in a new set of NPs with as many as four phases. According to bulk phase diagrams, Pd and Sn are miscible with the other five elements, forming either solid solutions or intermetallics. In embodiments, when three elements consisting of AuPdSn or CoPdSn, respectively, were combined into one NP and annealed under $H_2$ at 500° C. for 24 h, heterodimers with PdSn domains and Au or Co domains, respectively, were obtained (FIGS. 7-8). This is a surprising result since any pair of two elements in the combination studied are miscible with one another.

Referring to FIG. 8, annular dark field scanning transmission electron microscopy (ADF-STEM) images of Au—PdSn and Co—PdSn NPs show the dimeric structures with the contrast mainly from the difference in atomic number between PdSn and Au, or between PdSn and Co. Energy dispersive X-ray spectroscopy (EDS) analysis further verifies the separation of the elements in Au—PdSn and Co—PdSn heterodimers. As used herein in describing the nanoparticles "-" refers to the separate different phases. The following materials phases were used for the nanoparticles. In the table below, the main elements (content >80%) of one material phase are used to denote that phase. Different phases in a nanoparticle are separated by "-". For example, Au—Co—PdSn means a tri-phase nanoparticle with an Au domain, a Co domain, and a PdSn domain.

TABLE 1

| Material Phases for the Nanoparticles | |
| --- | --- |
| DENOTATION | PHASES |
| AU | AU |
| AG | AG |
| CU | $CU_{0.92}PD_{0.08}$ (AVERAGE COMPOSITION) |
| CO | CO |
| NISN | NISN ALLOY |
| AUAG | AUAG ALLOY |

TABLE 1-continued

Material Phases for the Nanoparticles

| DENOTATION | PHASES |
| --- | --- |
| AUCU | AUCU ALLOY |
| CONI | CONI ALLOY |
| CUNI | CUNI ALLOY |
| PDSN (NP DOES NOT CONTAIN CU OR NI) | PDSN ALLOY |
| PDSN (NP CONTAINS CU) | $(PDSN)_{0.8}CU_{0.2}$ (AVERAGE COMPOSITION) |
| PDSN (NP CONTAINS NI) | $(PDSN)_{0.92}NI_{0.08}$ (AVERAGE COMPOSITION) |
| PDSN (NP CONTAINS CU AND NI) | $(PDSN)_{0.8}(CUNI)_{0.2}$ (AVERAGE COMPOSITION) |

To understand why this unexpected phase separation was observed, DFT simulations were performed to calculate the Gibbs free energy ($\Delta G_m$) of mixing of 25 stochiometric combination in the AuPdSn system and 24 stoichiometric combination in the CoPdSn system using the Open Quantum Materials Database (OQMD, Table S2)[47,48]. Based on the $\Delta G_m$ of all combinations, thermodynamically stable phases were evaluated with the Grand Canonical Linear Programming (GCLP) method[49]. For an equal mixture of either Au or Co with Pd and Sn, it was identified that the stable phases are PdSn and either Au or Co (i.e. X—PdSn, X=Au or Co). To verify the simulation the thermal stability of Au—PdSn and Co—PdSn heterodimers was examined by heating the NPs to temperatures ranging between 500 and 800° C. (FIGS. 9-10), which is close to the melting temperature of bulk Au (1064° C.) and far beyond that of bulk Sn (232° C.). Experimentally, for both Au—PdSn and Co—PdSn, heterodimers are stable after being annealed at a temperature between 500 and 800° C. for 60 h, supporting the conclusion that that the observed phase segregation is not a kinetic result. Given the low miscibility between Au and Co (FIG. 8A), PdSn, Au, and Co constitute a new set of building blocks for constructing higher-order hetero structured NPs.
Tri-Phase Nanoparticles with Two or Three Interfaces It was observed that bi-phasic structures cannot be used to predict the architecture of structures with three or more phases.

Figure 1A:
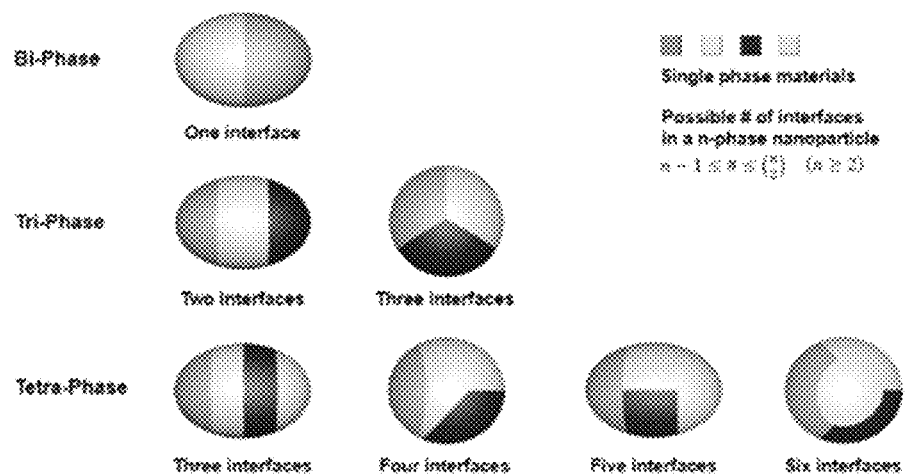
FIG. 1A is a schematic representation of a theoretical possible number of interfaces in heterodimer, heterotrimer, and heterotetramer nanoparticles.
Figure 1B:
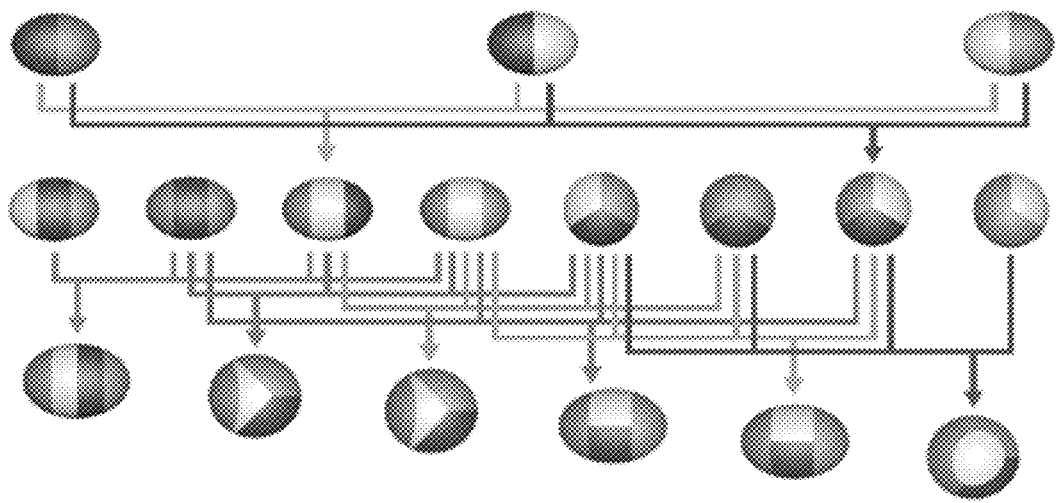
FIG. 1B is a schematic representation of the relationship between the architecture of bi-phase, tri-phase, and tetra-phase nanoparticles.
Figure 2A:
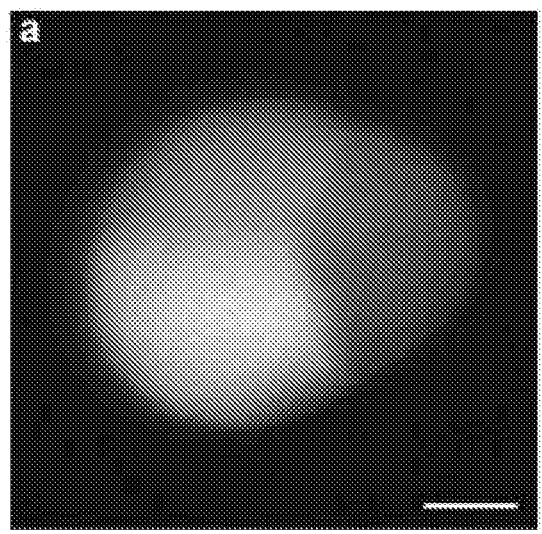
FIG. 2A is an ADF-STEM image of a Au—Co—PdSn nanoparticle (($Au_{0.30}Co_{0.37}Pd_{0.19}Sn_{0.14}$, scale bar, 10 nm), in accordance with an embodiment of the disclosure.
Figure 2B:
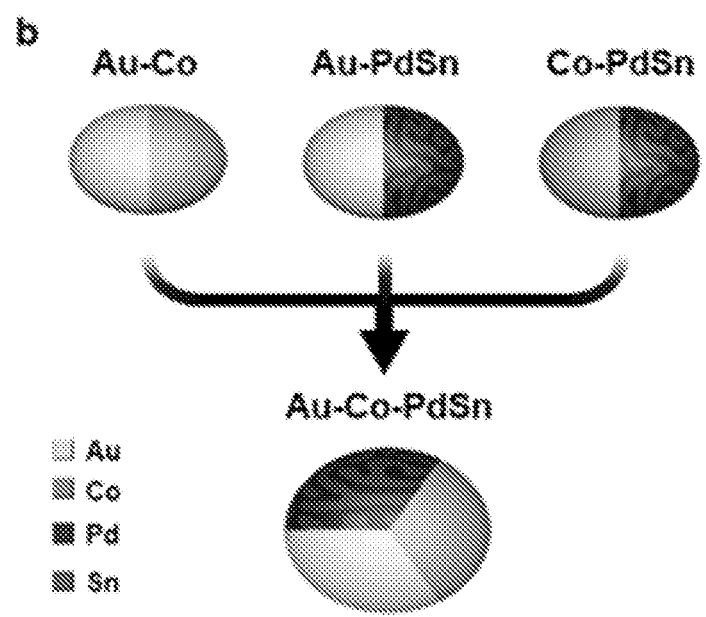
FIG. 2B is a schematic illustration of the miscibility relationship between Au, Co, and PdSn phases.
Figure 2C:
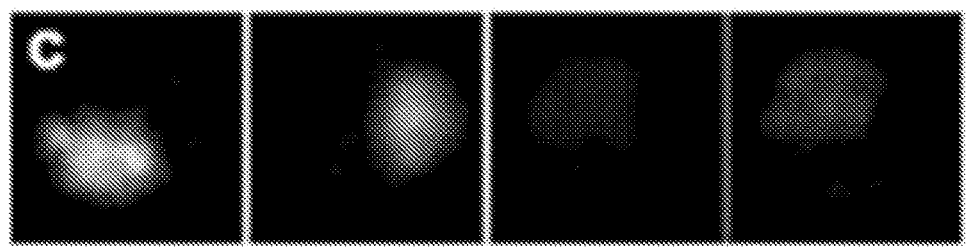
FIG. 2C is an EDS elemental mapping of the nanoparticle of FIG. 2A.
Figures 2D, 2E, 2F, 2G:
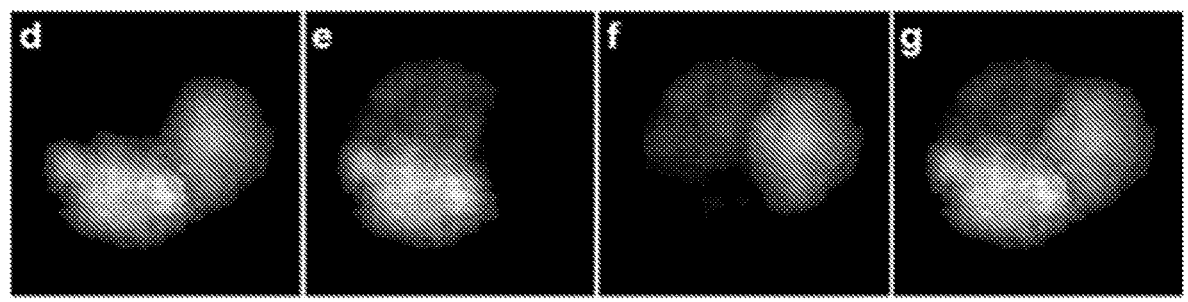
FIG. 2D is an overlap of selected elemental maps of FIG. 2C showing the phase boundaries of Au—Co.
FIG. 2E is an overlap of selected elemental maps of FIG. 2C showing the phase boundaries of Au—PdSn.
FIG. 2F is an overlap of selected elemental maps of FIG. 2C showing the phase boundaries of Co—PdSn.
FIG. 2G is an overlap of all elemental maps of FIG. 2C showing the configuration of three phase boundaries in the Au—Co—PdSn nanoparticle.
Figure 2H:
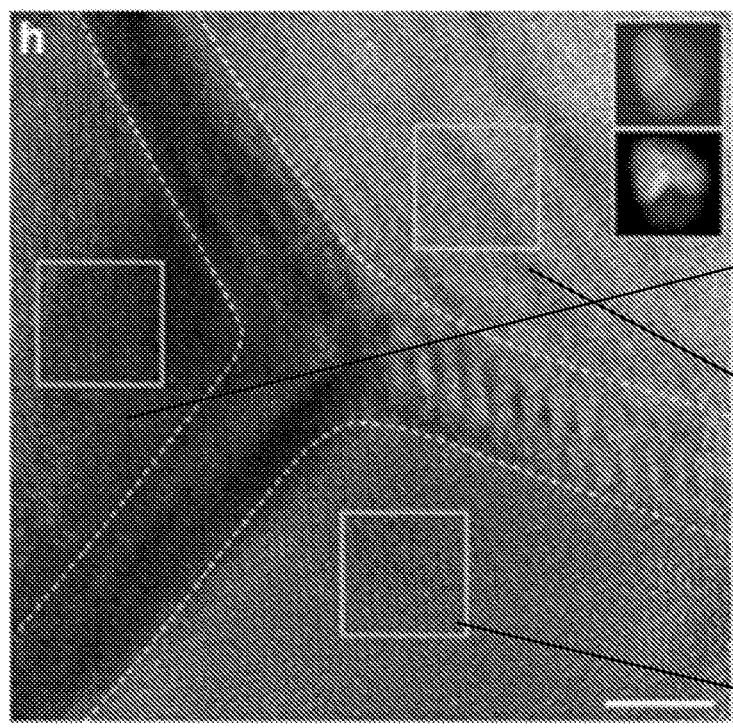
FIG. 2H is an HRTEM image of the tri-phase junction of an Au—Co—PdSn nanoparticle ($Au_{0.25}Co_{0.36}Pd_{0.29}Sn_{0.10}$, scale bar, 3 nm). Dashed lines highlight the position of three phase boundaries. Insets are an ADF-STEM image and EDS mapping of the entire nanoparticle.
Figures 13A, 13B:
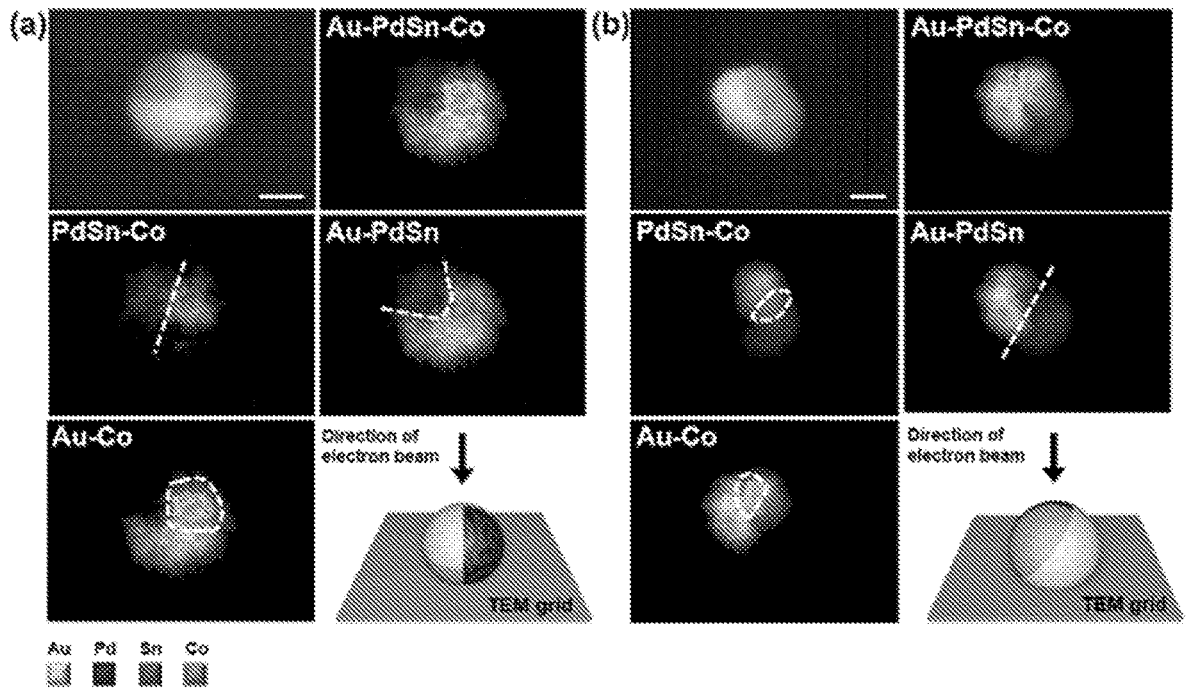
FIGS. 13A and 13B are ADF-STEM images and EDS elemental mapping of Au—Co—PdSn nanoparticles whose interfaces are not all perpendicular to the image planes. Dashed lines/circles in the overlay of selected element maps highlight the position of interfaces as a guide to the eye. Scale bars, 15 nm.
Figure 14A:
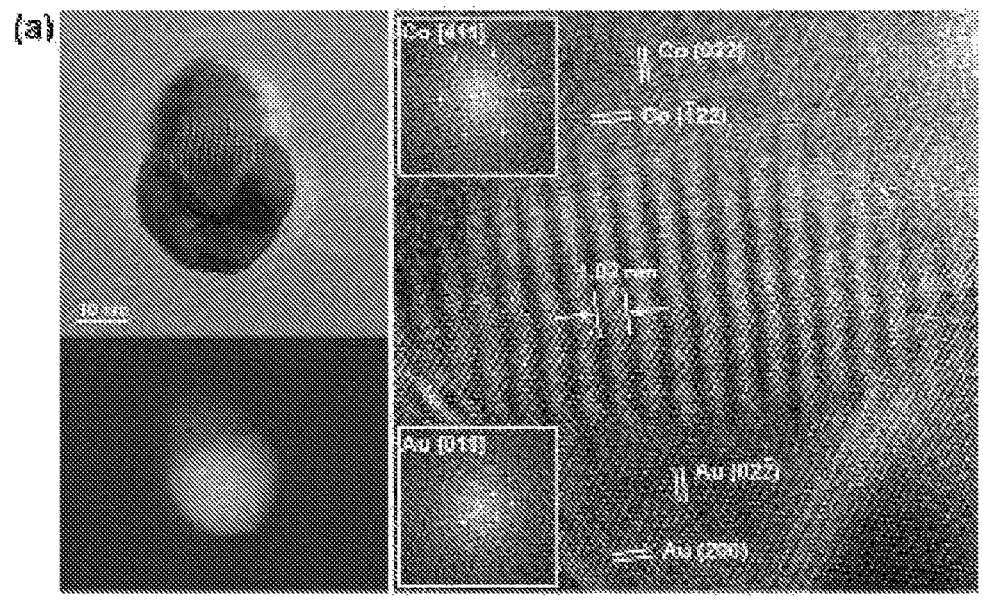
FIGS. 14A-14D are HRTEM and ADF-STEM characterization of Au—Co heterodimers synthesized in polymer nanoreactors. In each panel, the left column shows TEM and STEM images of entire particles; the right column shows a zoomed-in HRTEM image of the interface region between Au and Co phases. Insets are FFTs of the Au domain or Co domain.
Figure 14B:
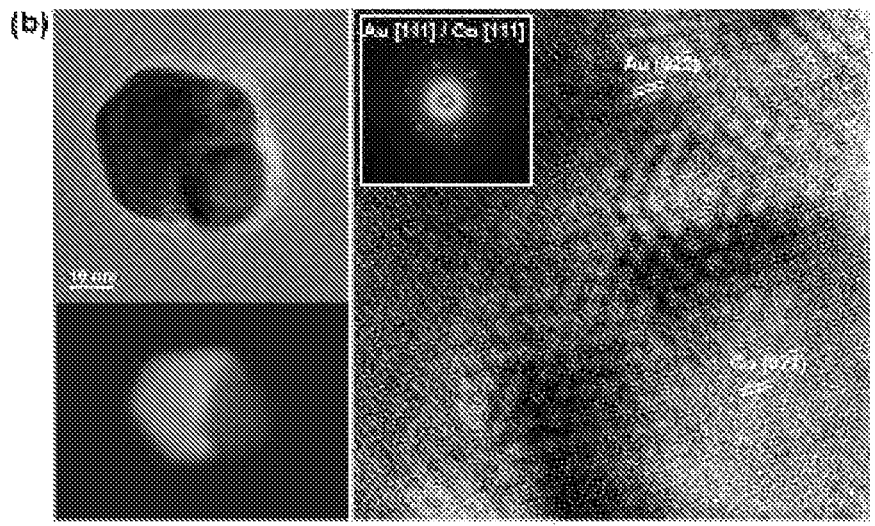
Figure 14C:
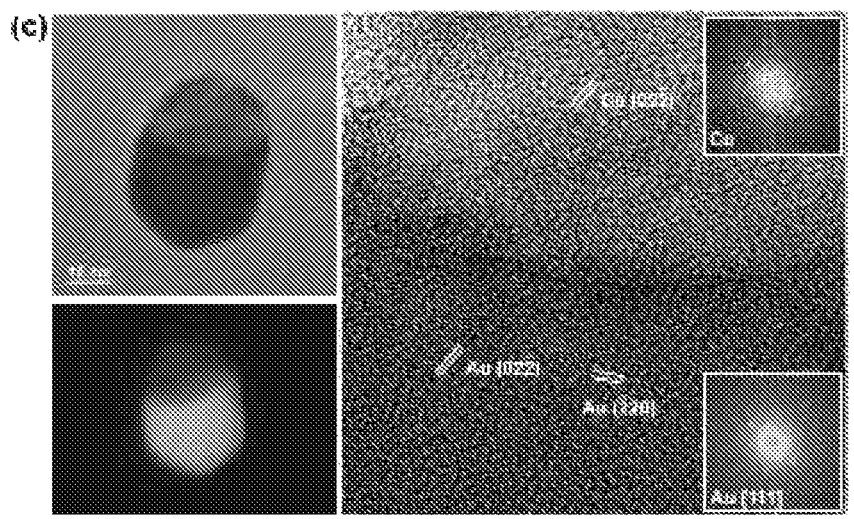
Figure 14D:
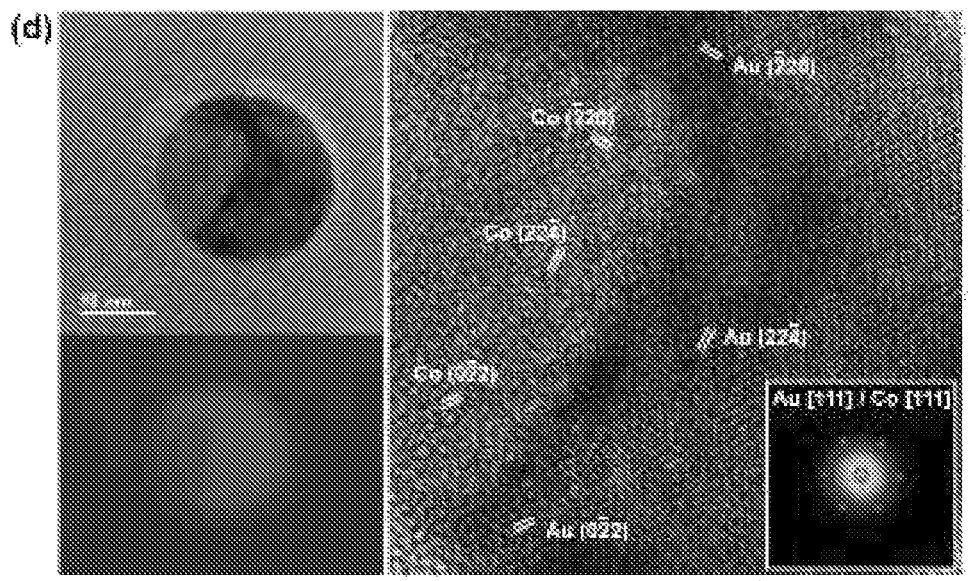
Figure 15A:
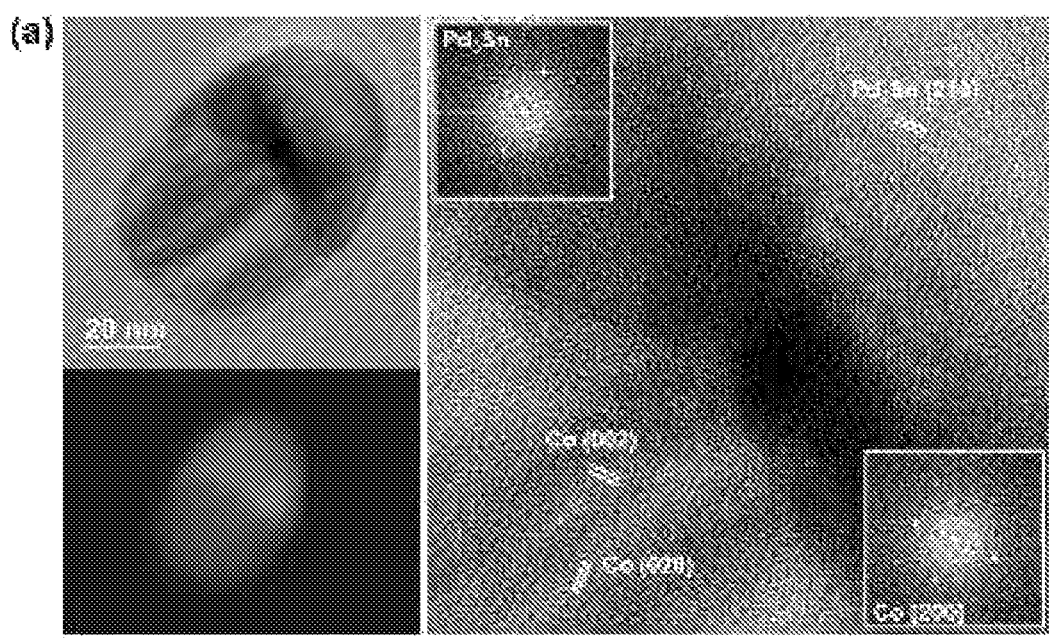
FIGS. 15A-15C are HRTEM and ADF-STEM characterization of Co—$Pd_3Sn$ heterodimers synthesized in polymer nanoreactors. In each panel, the left column shows TEM and STEM images of entire particles; the right column shows a zoomed-in HRTEM image of the interface region between Co and $Pd_3Sn$ phases. Insets are FFTs of the $Pd_3Sn$ domain or Co domain.
Figure 15B:
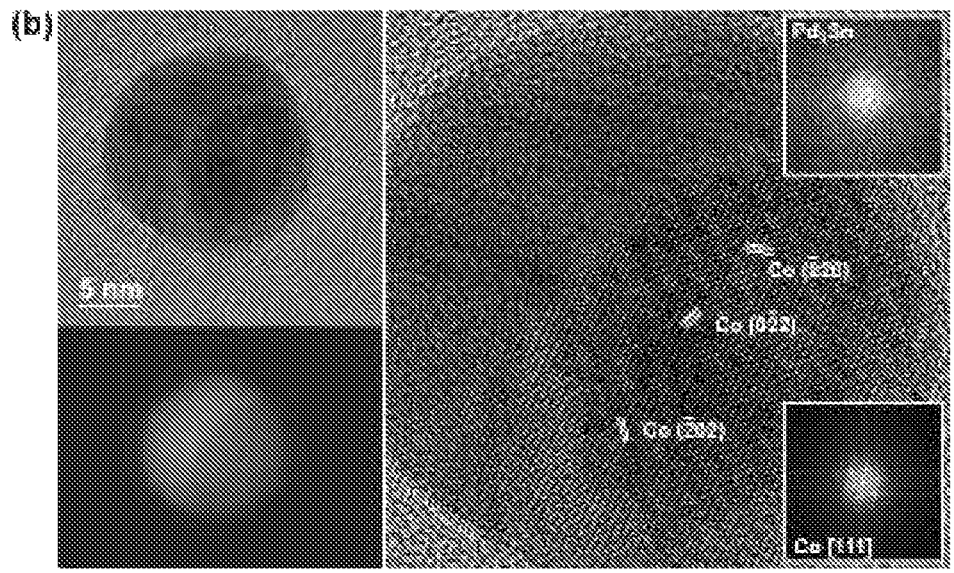
Figure 15C:
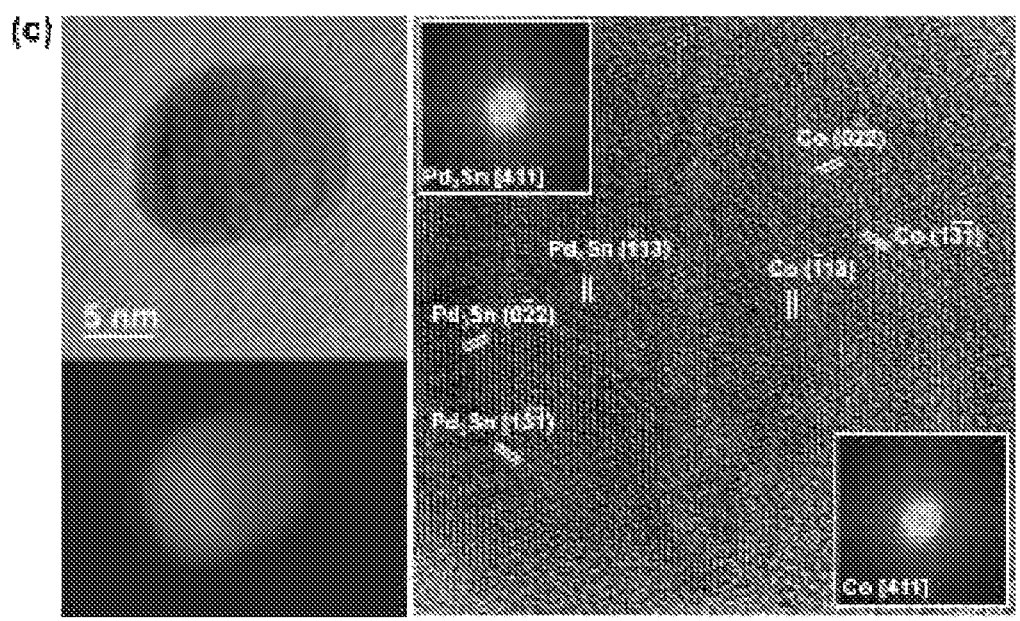
Figure 16A:
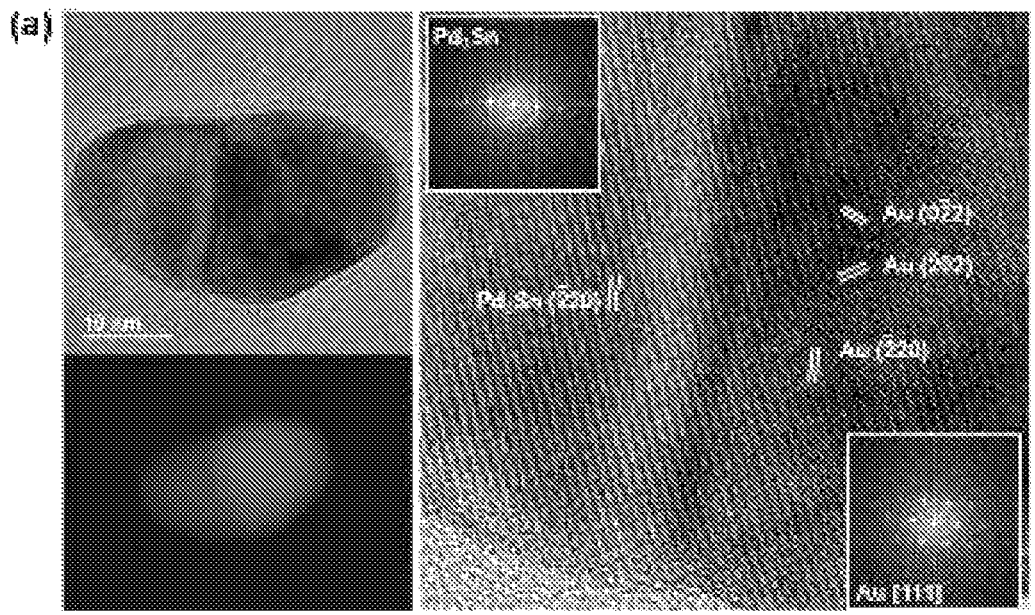
FIGS. 16A-16C are HRTEM and ADF-STEM characterization of Au—$Pd_3Sn$ heterodimers synthesized in polymer nanoreactors. In each panel, the left column shows TEM and STEM images of entire particles; the right column shows a zoomed-in HRTEM image of the interface region between Au and $Pd_3Sn$ phases. Insets are FFTs of the $Pd_3Sn$ domain or Au domain.
Figure 16B:
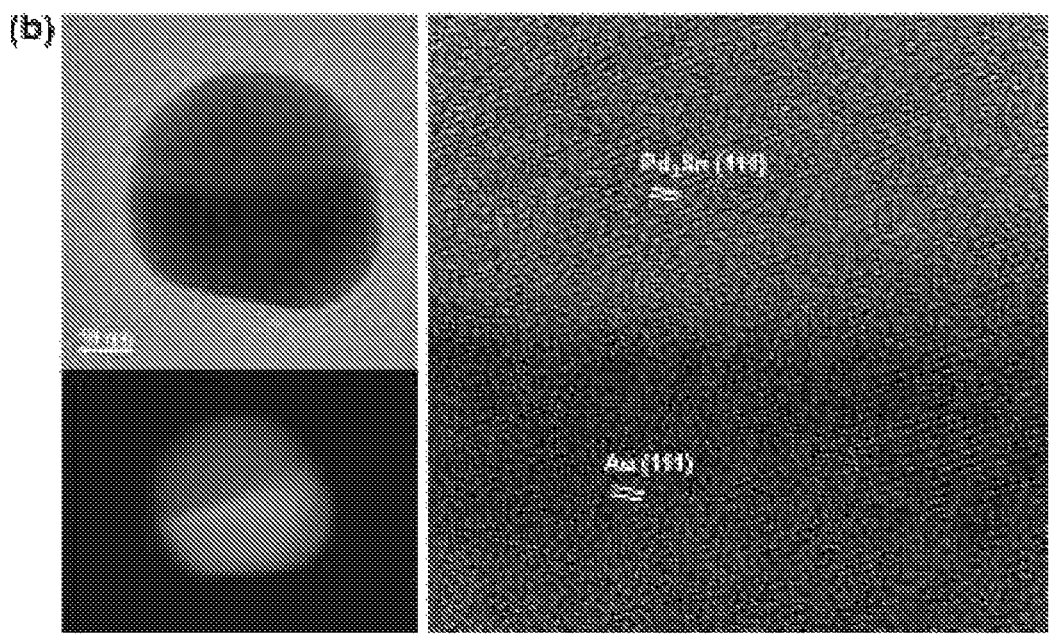
Figure 16C:
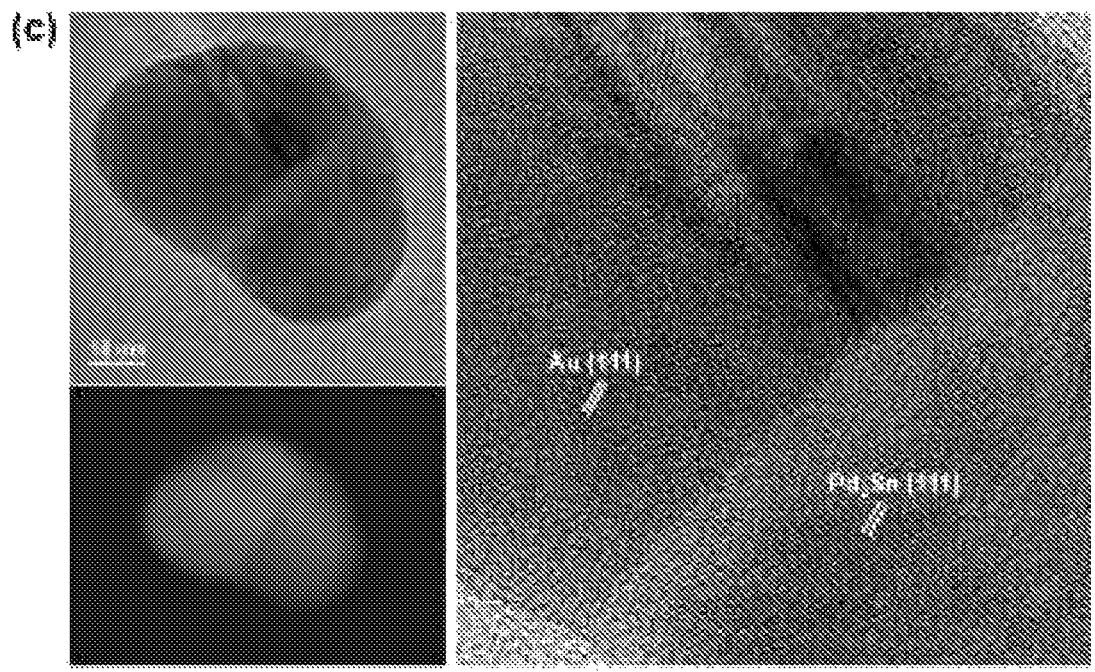
Figure 47:
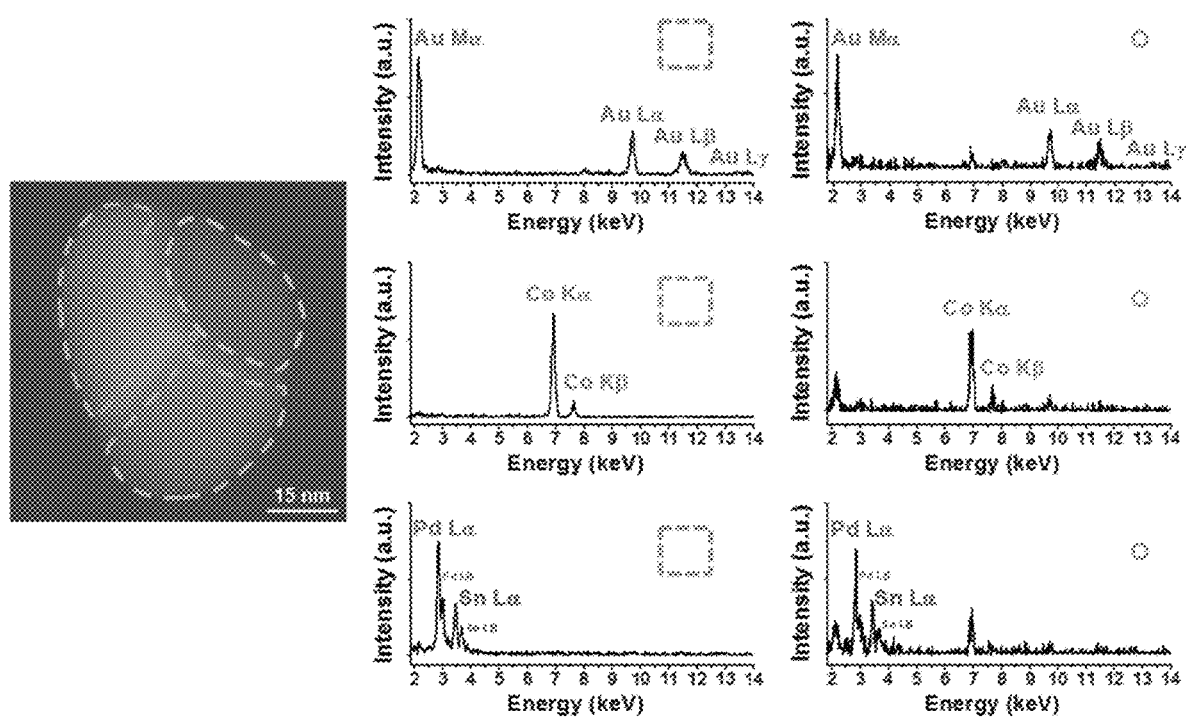
FIG. 47 is EDS spectra of the entire Au, Co, and PdSn domains and regions close to the interfaces in the nanoparticle of FIG. 2H.

Referring to FIG. 1B, for tri-phase NPs, there are two possible types of architectures, i.e., ones with either two or three interfaces. Referring to FIGS. 2A-G and 11-12, for example, in an embodiment, a four element Au—Co—PdSn nanoparticle was synthesized by SPBCL. EDS mapping confirmed element segregation into three interconnected domains, an Au domain (yellow), a Co domain (green), and a PdSn domain (blue/purple, consisting of a compositional variation; e.g. $Pd_3Sn$, $Pd_2Sn$, or PdSn. Referring to FIG. 2A, the STEM image contrast between the three domains is attributed to differences of atomic number. Referring to FIG. 13, the orientation of the phase boundaries in the tri-phase NPs is random with respect to the substrate (i.e., the image plane in the figure). For simplicity, particles with phase boundaries perpendicular to the substrate were used to show the position of different phases. Referring to FIG. 2H, high resolution transmission electron microscopy (HRTEM) characterization of a tri-phase junction in an Au—Co—$Pd_3Sn$ NP confirmed the formation of solid-state interfaces between three domains. Referring to FIG. 47, EDS spectra was performed on the entire Au, Co, and PdSn domains (highlighted by dashed lines) and the regions close to the interfaces (highlighted by hollow dots) in the nanoparticle of FIG. 2H. Due to particle drift during EDS characterization and non-atomically shaped interface, it was difficult to identify the distribution of elements around the interface region. The EDS spectra around interface regions have signals from all elements.

Figure 2I:
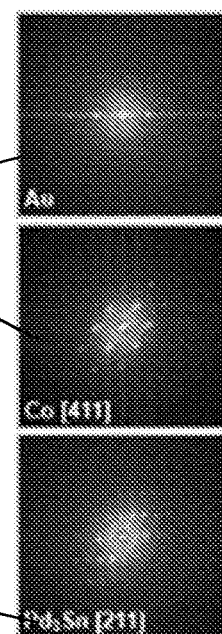
FIG. 2I is a FET of the regions indicated in FIG. 2H with boxes
Figure 2J:
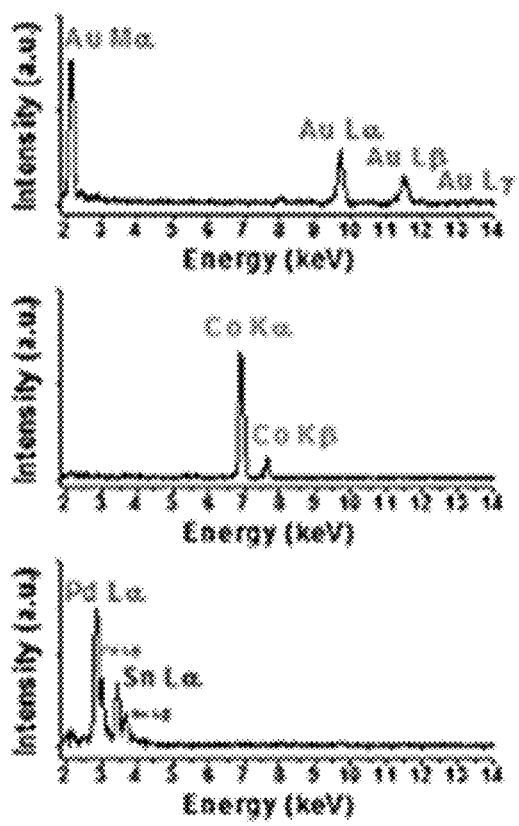
FIG. 2J is EDS spectra of the Au, Co, and PdSn domains of the nanoparticle in FIG. 2H.

Referring to FIG. 2I, Fast Fourier transformations (FFT) of different regions indicate that Co is oriented along the [411] zone axis, and $Pd_3Sn$ is oriented along the [211] zone axis. The FFT of the Au domain only shows reflections that can be assigned to Au {311} planes. Referring to FIGS. 14-18, experimentally, no specific relationship between the lattice structures of the three metal domains was observed. Referring to FIGS. 1A, 2, and 18, though the crystal structure of the interfaces within an Au—Co—PdSn NPs differs from one particle to another, all of the domains in the NPs are in a pie-shaped configuration. Referring to FIG. 19, in contrast, the Ag—Cu—Co tri-phase system adopts a striped domain architecture, with a central Cu domain capped by Ag and Co domains. Within the Au—Co—PdSn and Ag—Cu—Co systems, although all three bi-phase NPs are structurally characterized as heterodimers, they are two very different classes of structure, demonstrating that the behavior of bi-phase architectures cannot be used to predict the architecture of tri-phase NPs (FIG. 1B).

Figure 3A:
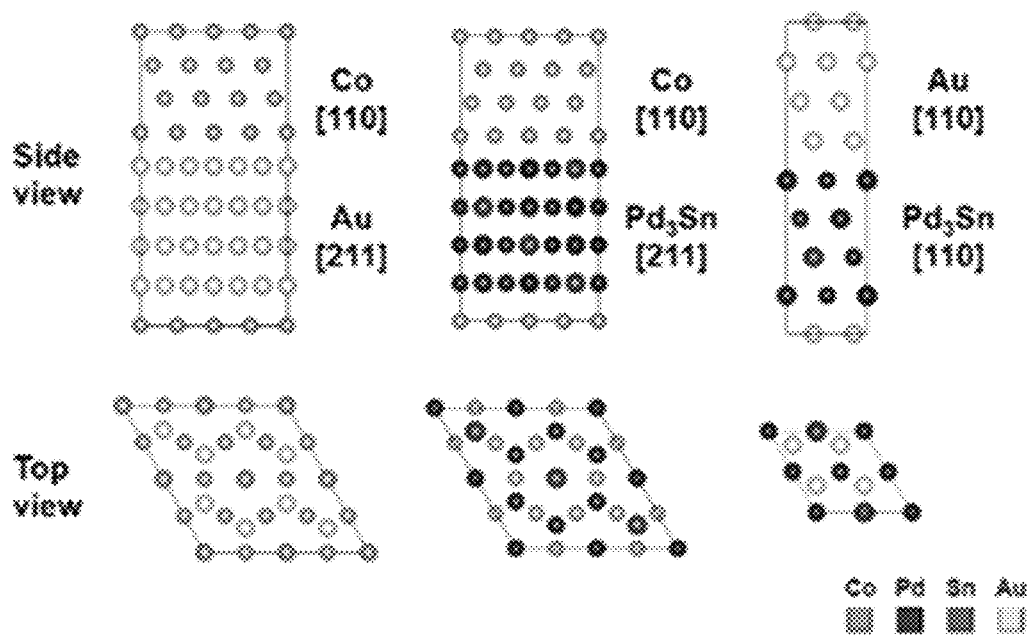
FIG. 3A is a DFT-simulated relaxed structure of the (111) interfacial planes between Au, Co, and $Pd_3Sn$.
Figures 19A, 19B:
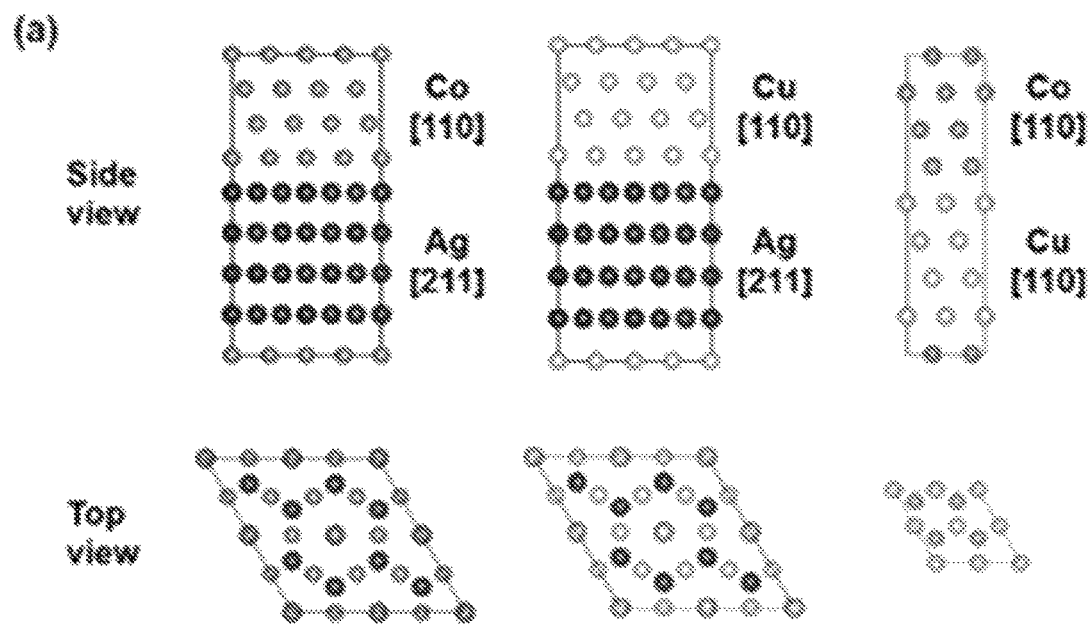
FIG. 19A is a DFT-simulated relaxed structures of the (111) interfacial planes between Ag, Cu, and Co.
FIG. 19B is a table of the Surface energies of Ag, Cu, and Co (111) planes and the interfacial energies between Ag, Cu, and Co (111) planes.
Figure 19C:
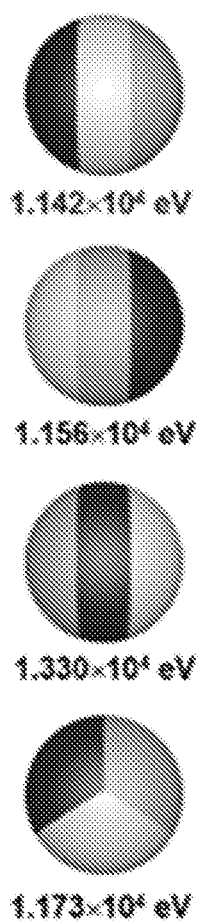
FIG. 19C is a schematic showing the calculated total surface and interfacial energies of Ag—Cu—Co nanoparticles (diameter 20 nm) with equal volume of each phase.
Figure 19D:
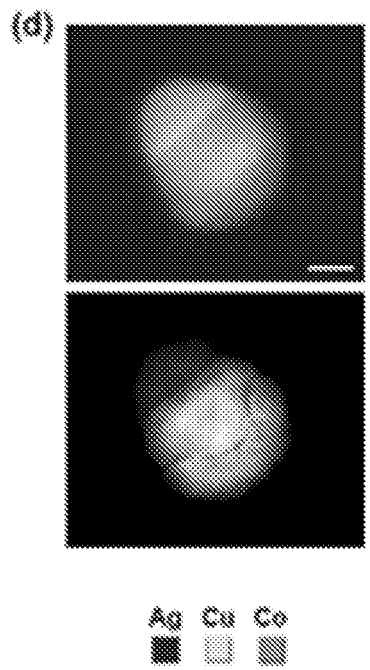
FIG. 19D is ADF-STEM image and EDS mapping of an Ag—Cu—Co nanoparticle ($Ag_{0.23}Cu_{0.47}Co_{0.30}$). Scale bar: 15 nm.
Figure 20:
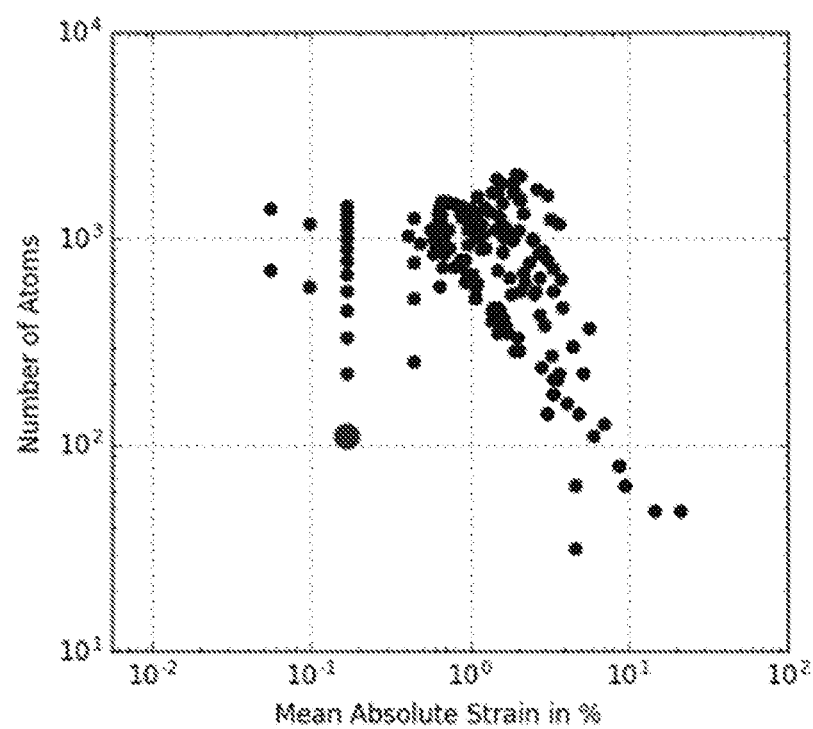
FIG. 20 is a graph of the mean absolute strain verses the number of atoms for Co—$Pd_3Sn$ systems. All the matched structures of Co—$Pd_3Sn$ systems with different supercell sizes and strains are shown. The red dot refers to the optimal structure with both small size and low stress and all the other blue dots represent other structure that have been considered in accordance with embodiments of the disclosure.
Figure 23A:
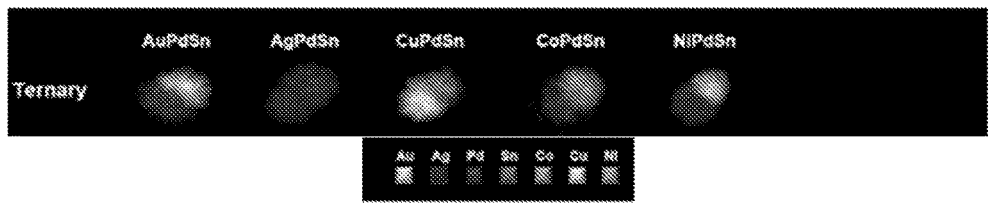
FIGS. 23A-23E illustrate a seven-element library of multi-phase heterostructured nanoparticles that utilize PdSn as the basic building block.
Figure 23B:
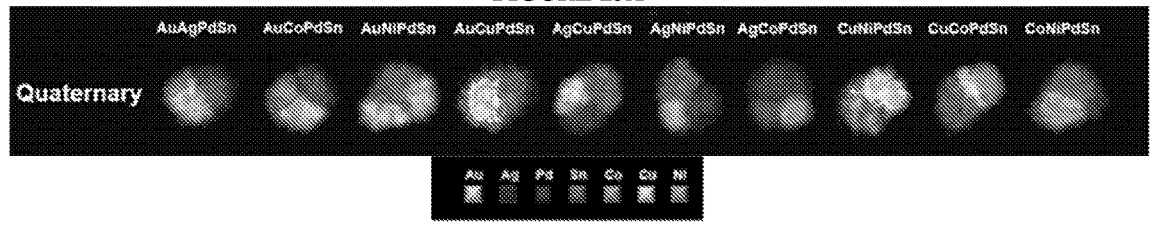
Figure 23C:
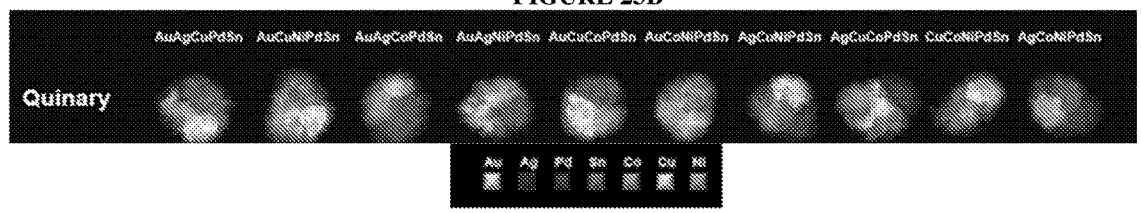
Figure 23D:
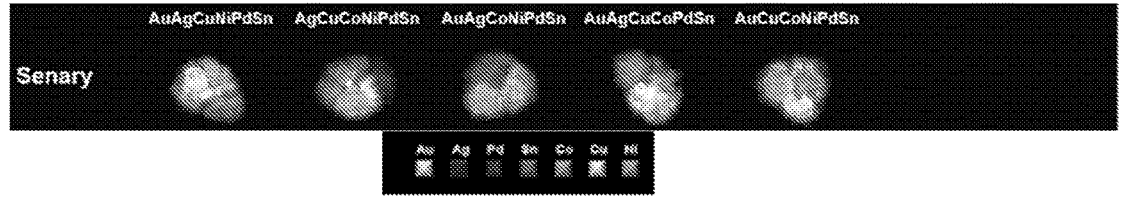
Figure 23E:
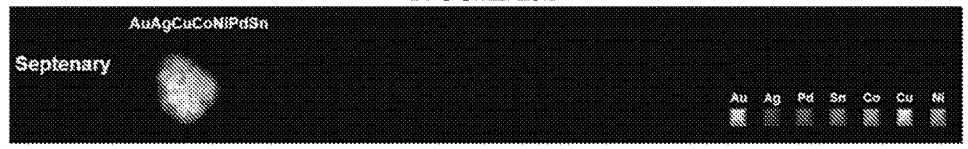
Figure 25A:
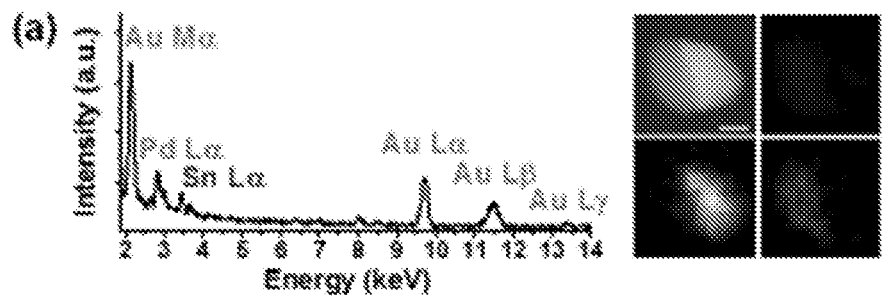
FIGS. 25A-25E are ADF-STEM images, EDS spectra, and detailed EDS mapping of the ternary nanoparticles in FIG. 23A.
Figure 25B:
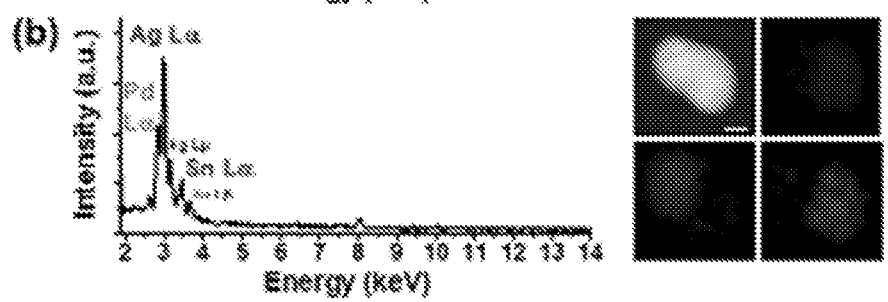
Figure 25C:
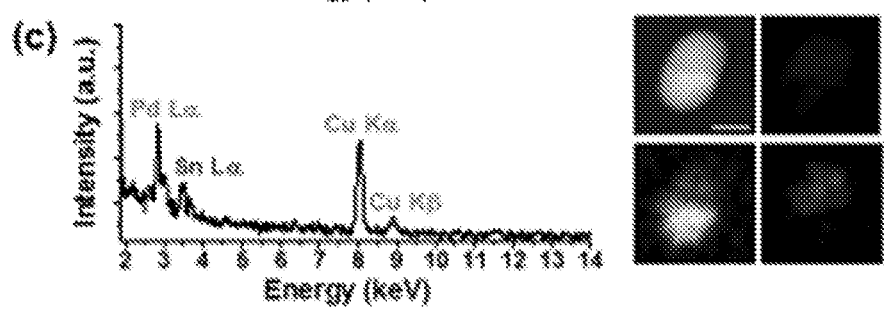
Figure 25D:
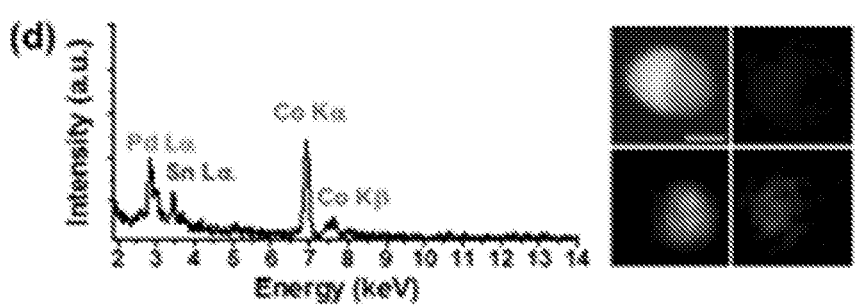
Figure 25E:
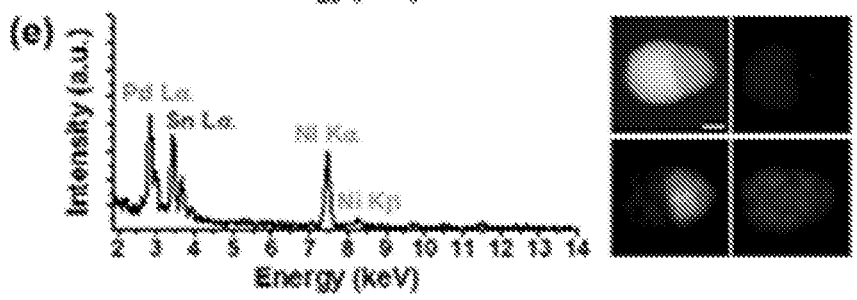
Figure 26A:
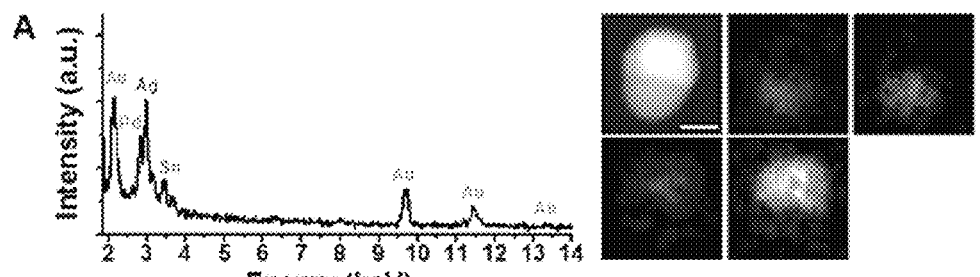
FIGS. 26A-26J are ADF-STEM images, EDS spectra, and detailed EDS mapping of the quaternary nanoparticles in FIG. 23B.
Figure 26B:
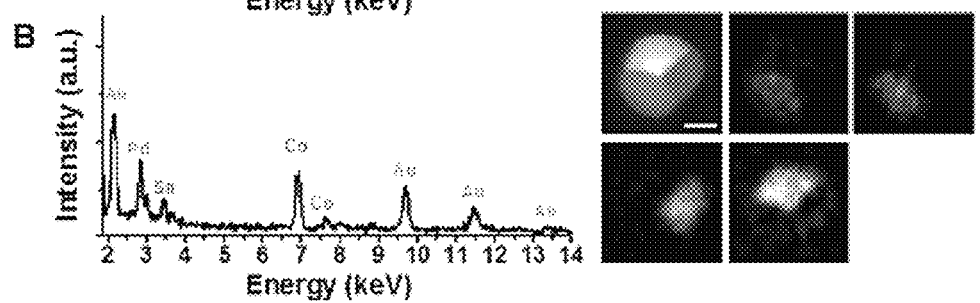
Figure 26C:
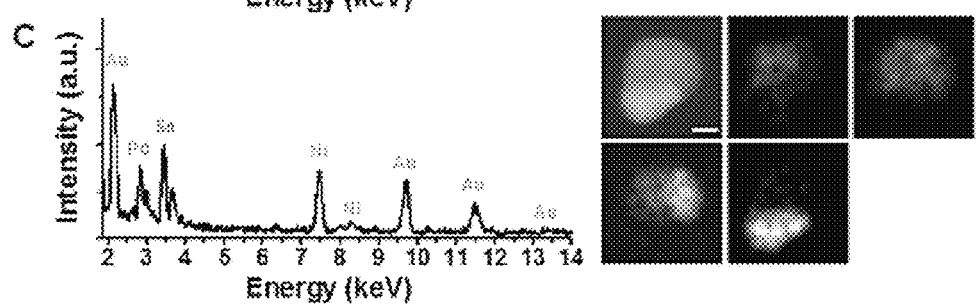
Figure 26D:
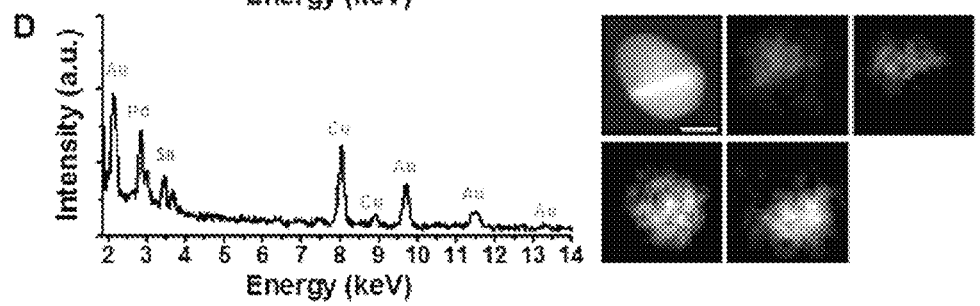
Figure 26E:
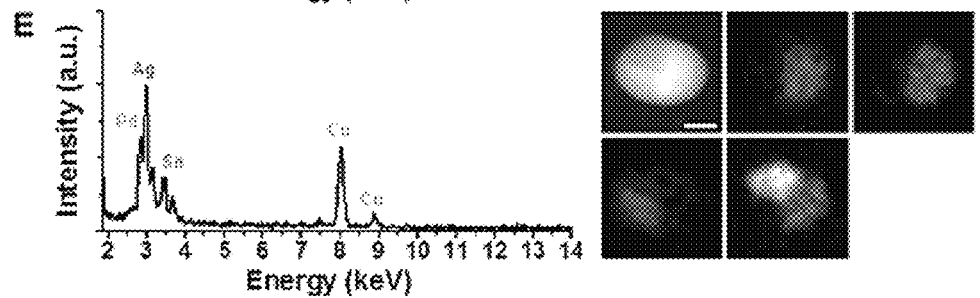
Figure 26F:
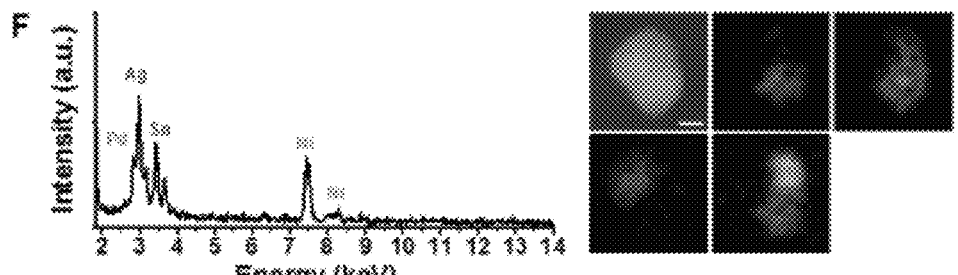
Figure 26G:
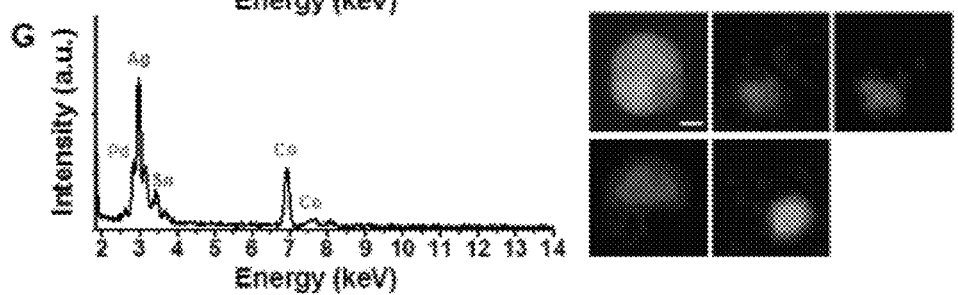
Figure 26H:
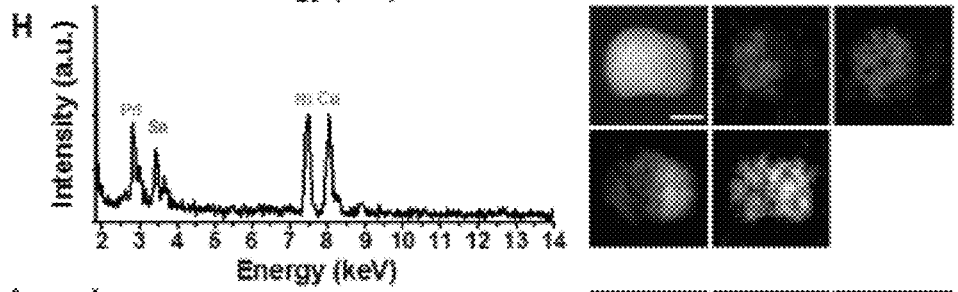
Figure 26I:
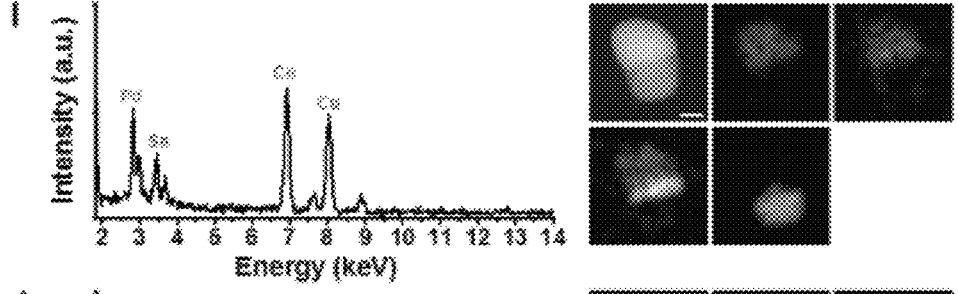
Figure 26J:
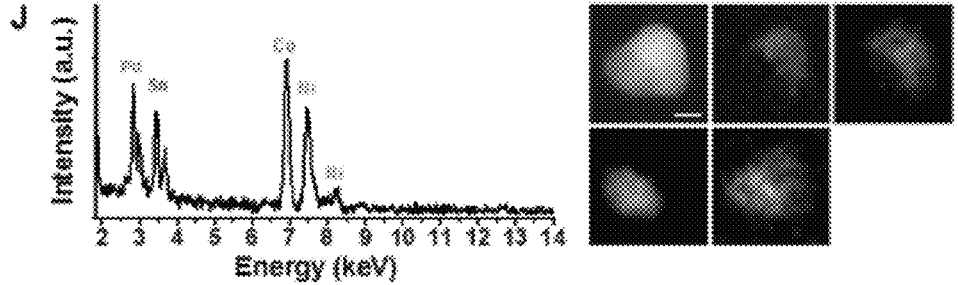
Figures 27A, 27B, 27C, 27D, 27E:
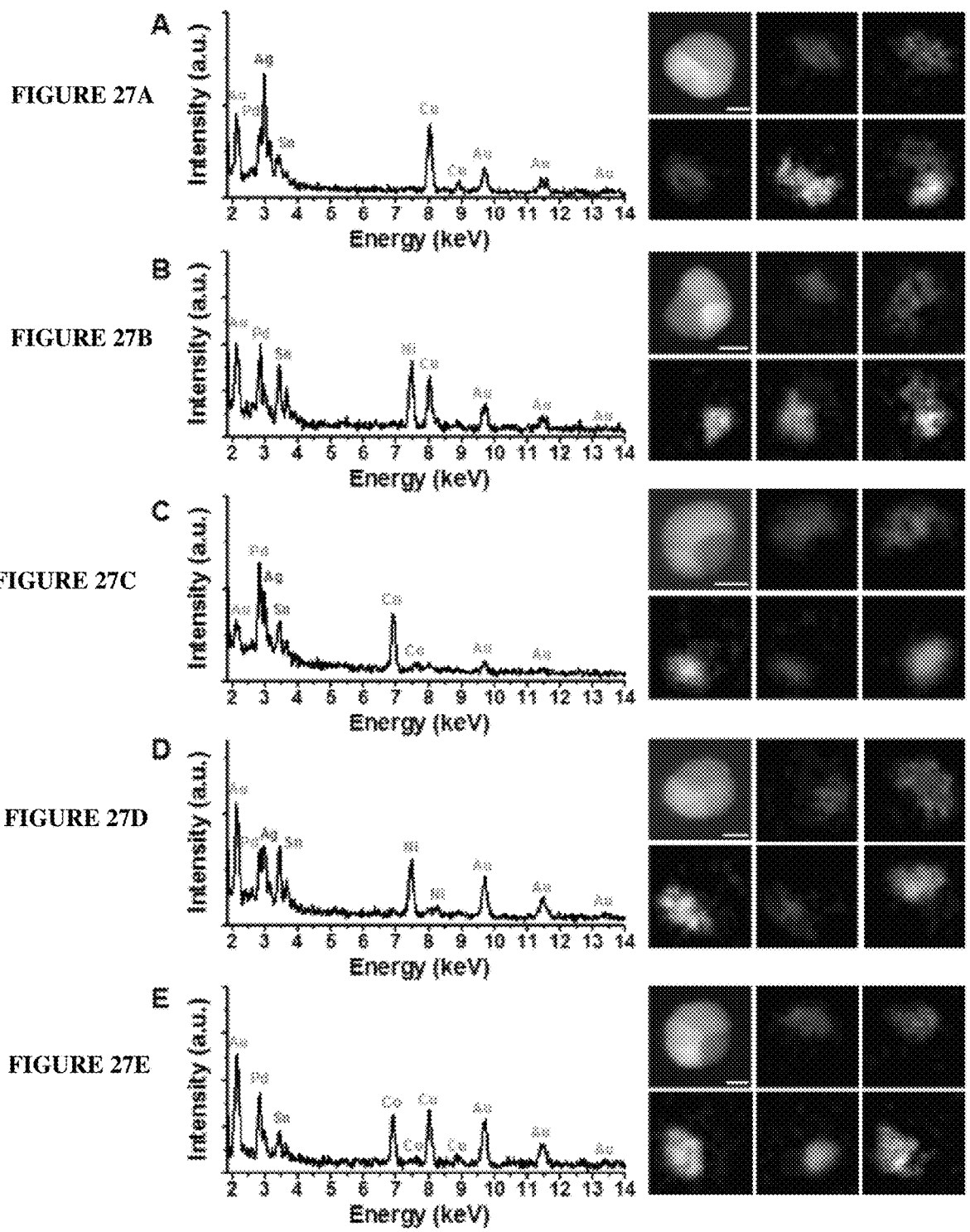
FIGS. 27A-27J are ADF-STEM images, EDS spectra, and detailed EDS mapping of the quinary nanoparticles in FIG. 23C.
Figure 27F:
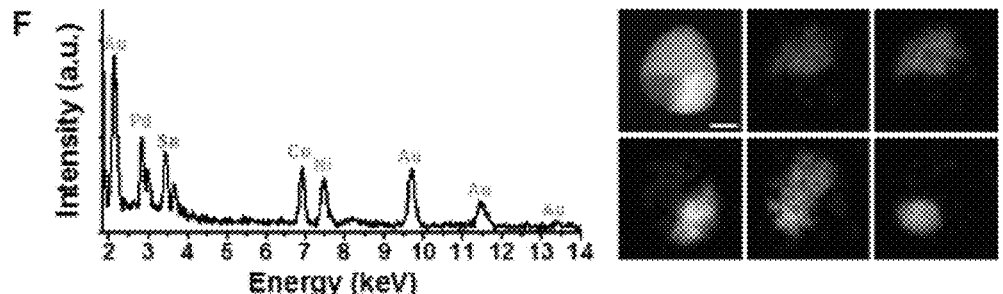
Figure 27G:
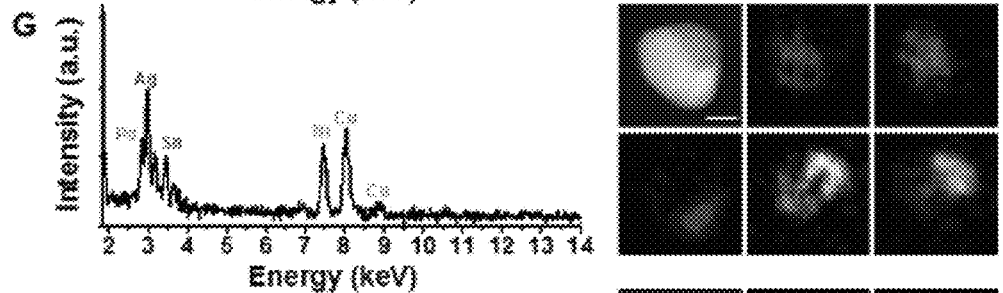
Figure 27H:
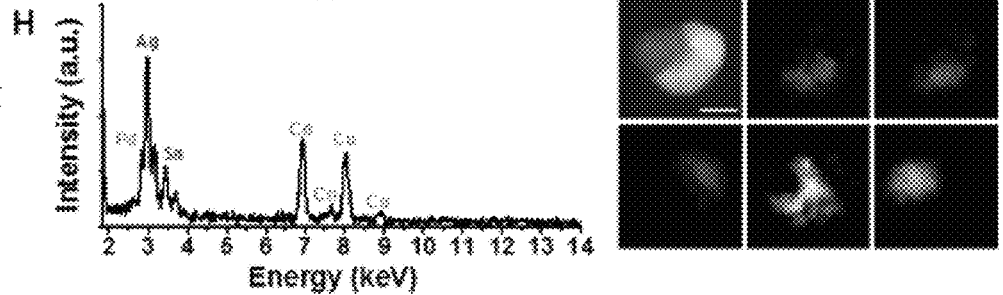
Figure 27I:
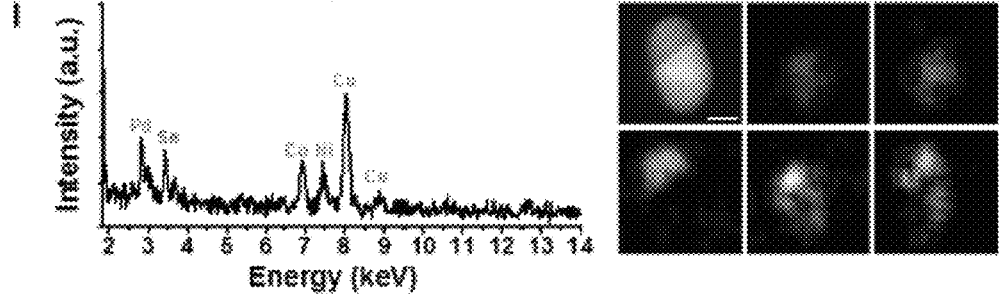
Figure 27J:
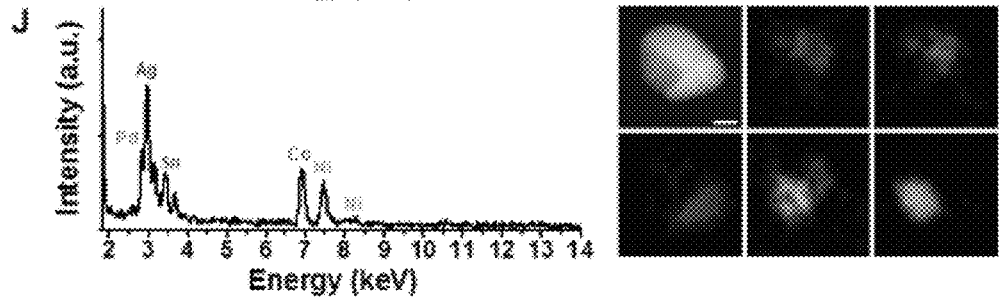
Figure 28A:
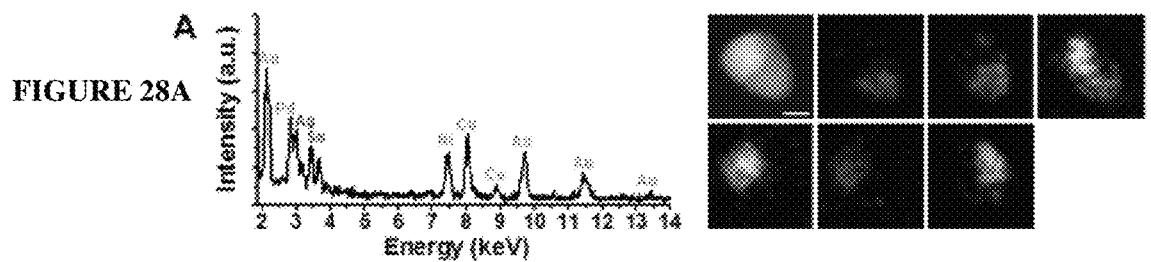
FIGS. 28A-28F are ADF-STEM images, EDS spectra, and detailed EDS mapping of the senary and septenary nanoparticles in FIGS. 23D and 23E.
Figure 28B:
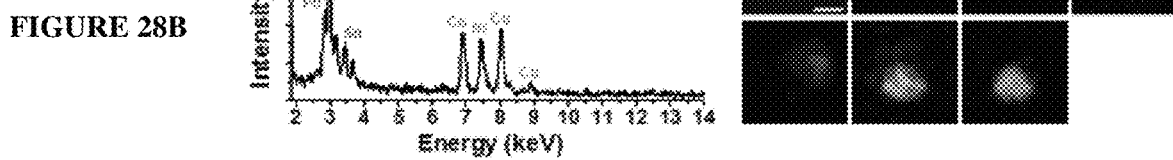
Figure 28C:
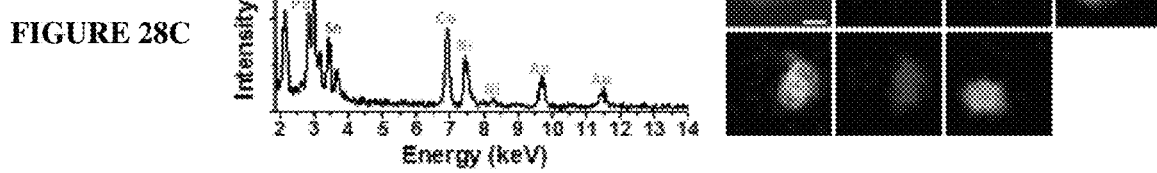
Figure 28D:
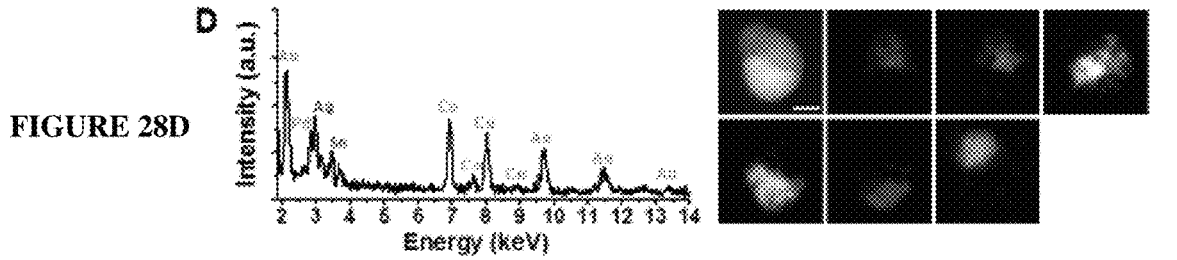
Figure 28E:
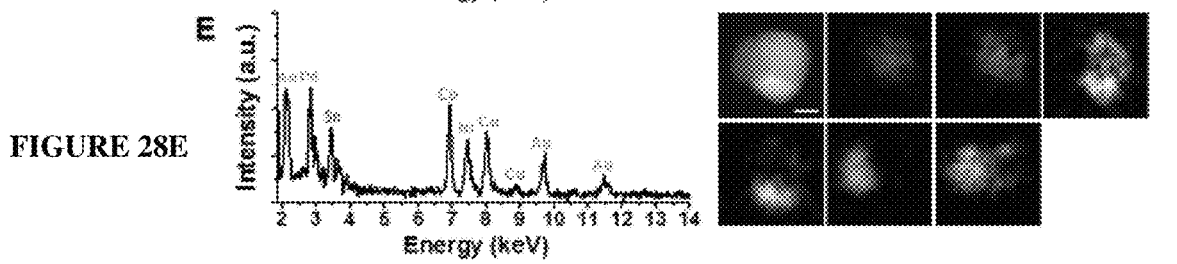
Figure 28F:
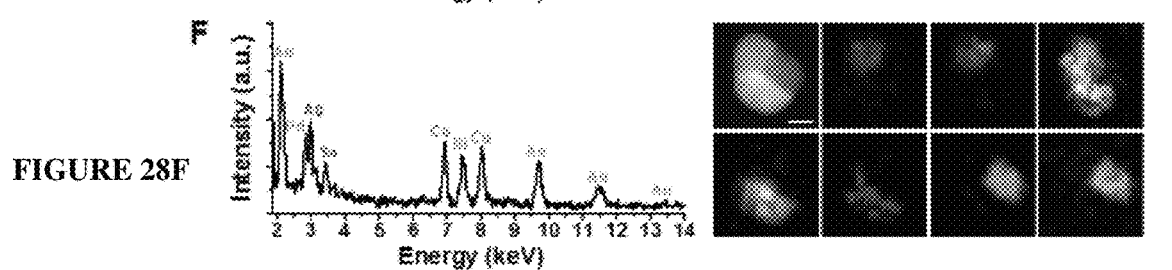

The relative surface and interfacial energies for each possible phase dictates the number and structural arrangement (pie-shaped versus striped) of interfaces. To understand why different architectures form in tri-phase NPs, DFT simulations were performed to compare the total surface/interfacial energy of Au—Co—$Pd_3Sn$ and Ag—Cu—Co tri-phase NPs for all possible architectures. Referring to FIGS. 3A and 20, interface models of Au—Co, $Pd_3Sn$—Co, and Au—$Pd_3Sn$ were set up with each material domain composed of (111) atom planes. The interface models were set up as described in the example below, with the mean absolute strains for different systems being shown in Table 3 below. To minimize the interfacial energy, the structure of each interface was allowed to relax through lattice shrinking or expanding and twisting of one domain with respect to the other. Referring to FIGS. 3B and 21, the three calculated interfacial energies along with three calculated surface energies were combined to evaluate the total energy of NPs using spherical models that have equal volumes of each phase. The area of the interfaces and surfaces in each nanoparticle model are provided in Table 4 in the example below. As shown in FIG. 3C, Au—Co—$Pd_3Sn$ NPs with pie-shaped architectures were found to possess the lowest total energy. In contrast, as illustrated in FIG. 19, DFT simulation on the Ag—Cu—Co tri-phase system revealed that striped architectures with Cu as the central domain possesses the lowest total. Thus, the preferential architecture of each tri-phase NP minimizes the combined surface and interfacial energies.

Figure 4A:
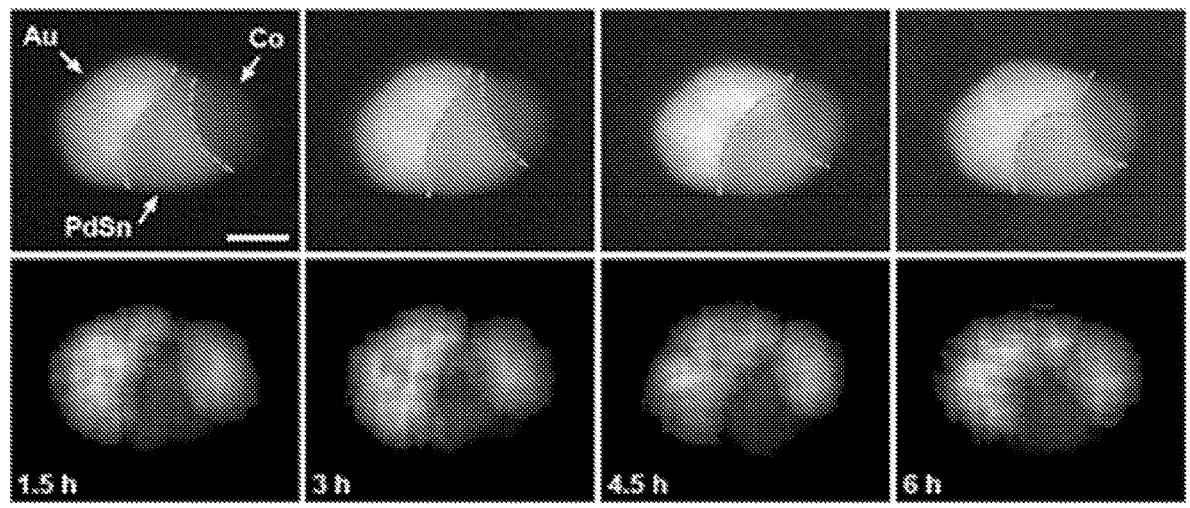
FIG. 4A is an ADF-STEM image (top row) and a corresponding EDS mapping (bottom row) of an Au—Co—PdSn nanoparticle ($Au_{0.33}Co_{0.24}Pd_{0.26}Sn_{0.17}$) annealed under flowing $H_2$ at 500° C. over time. Dashed yellow lines outline the position of phase boundaries. Scale bar, 15 nm.
Figure 4B:
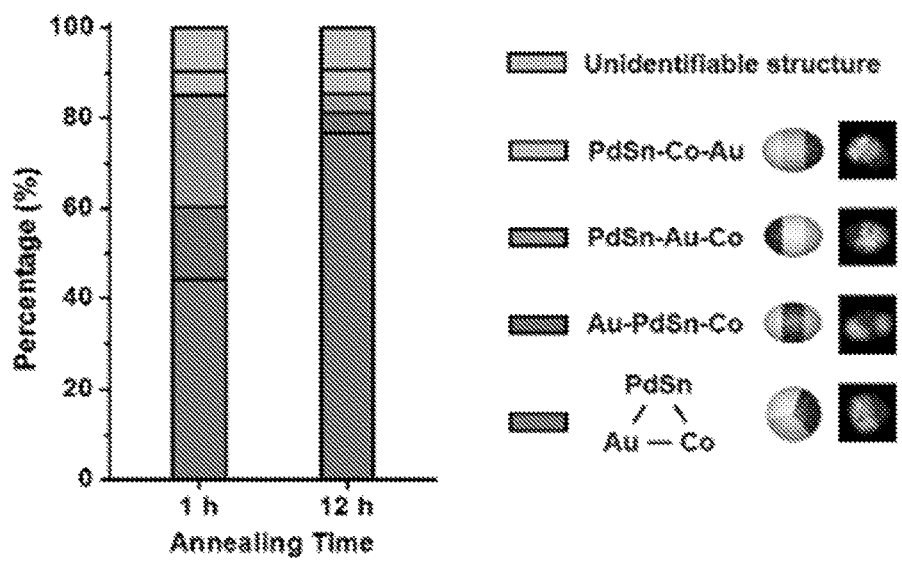
FIG. 4B is a graph showing the statistical distributions of nanoparticles (n=150) with different architectures.
Figure 17A:
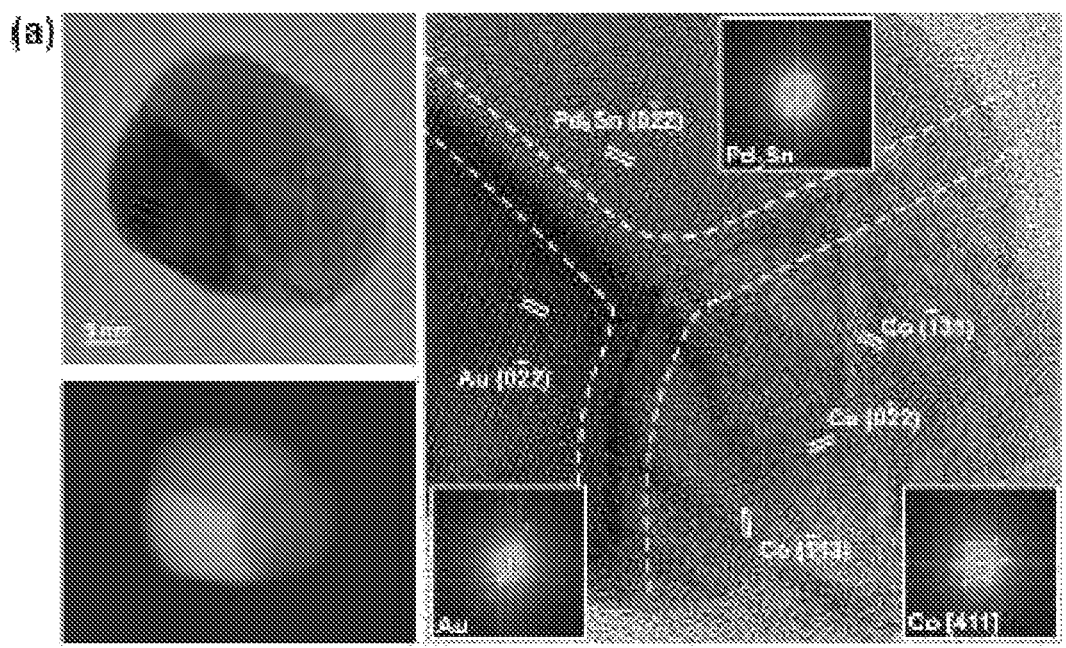
FIGS. 17A-17C are HRTEM and ADF-STEM characterization of Au—Co—$Pd_3Sn$ heterotrimers synthesized in polymer nanoreactors. In each panel, the left column shows TEM and ADF-STEM images of entire particles. The right column shows a zoomed-in HRTEM image of the tri-phase junction between Co, Au and $Pd_3Sn$ domain. Insets are FFTs of the Co, $Pd_3Sn$ or Au domains. Dashed lines highlight the position of the three phase boundaries.
Figure 17B:
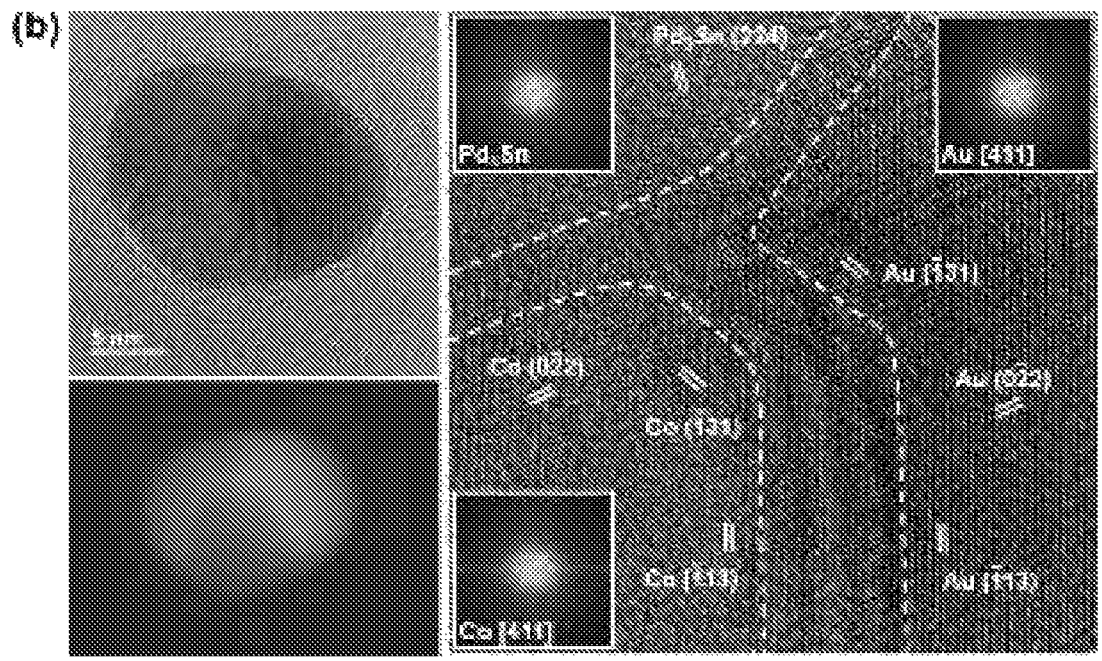
Figure 17C:
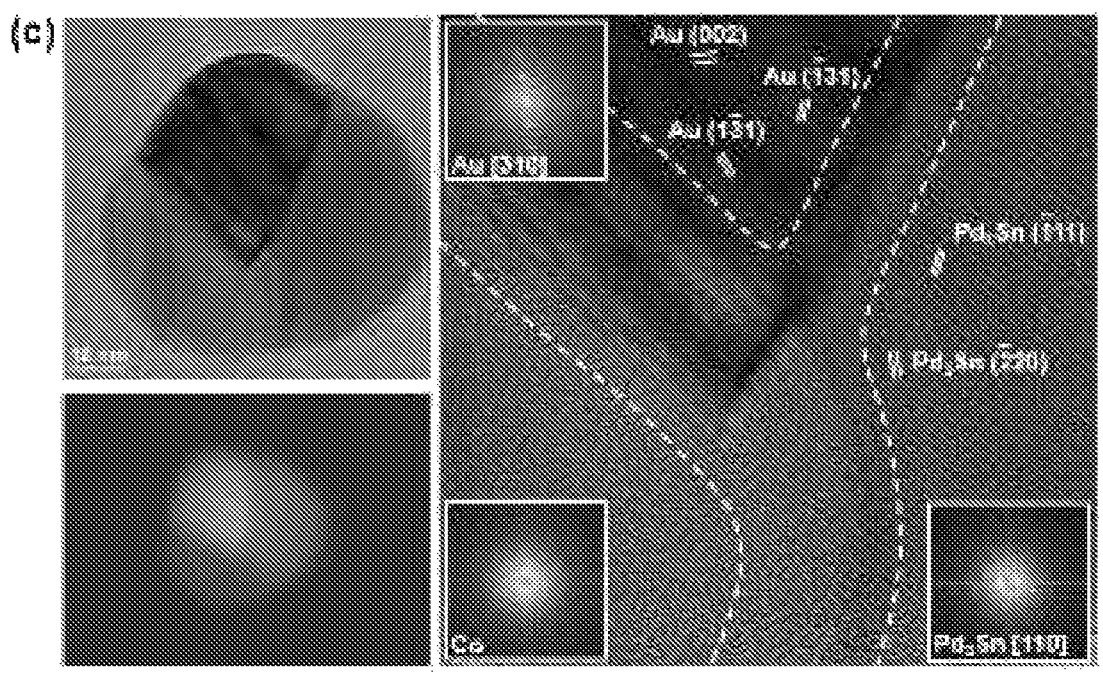
Figure 18A:
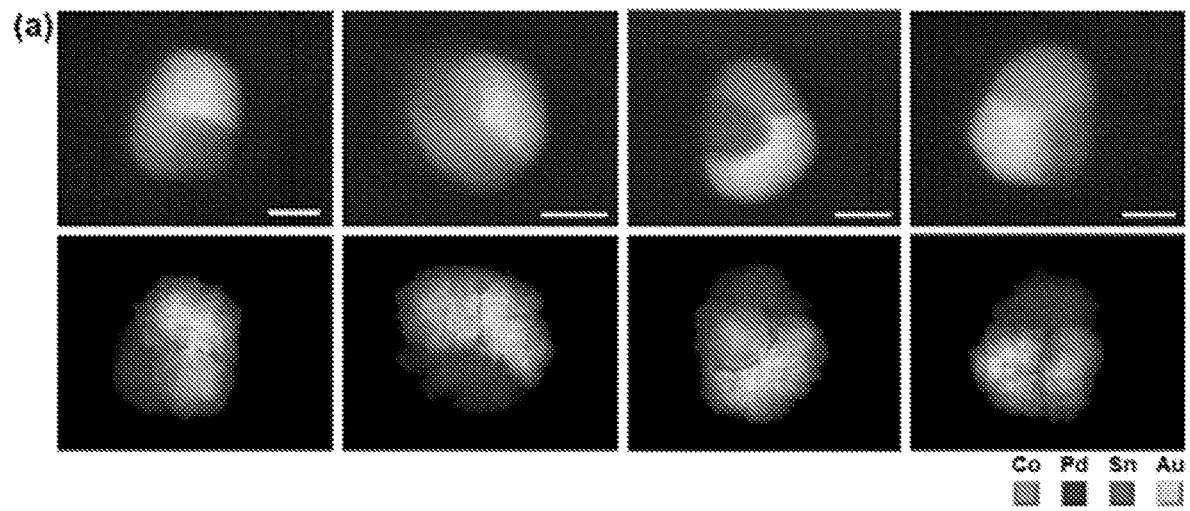
FIG. 18A is ADF-STEM images and EDS elemental mapping of Au—Co—PdSn tri-phase nanoparticles (Pd:Sn=1:1) with different angles between the three phase boundaries. Scale bars, 15 nm.
Figure 18B:
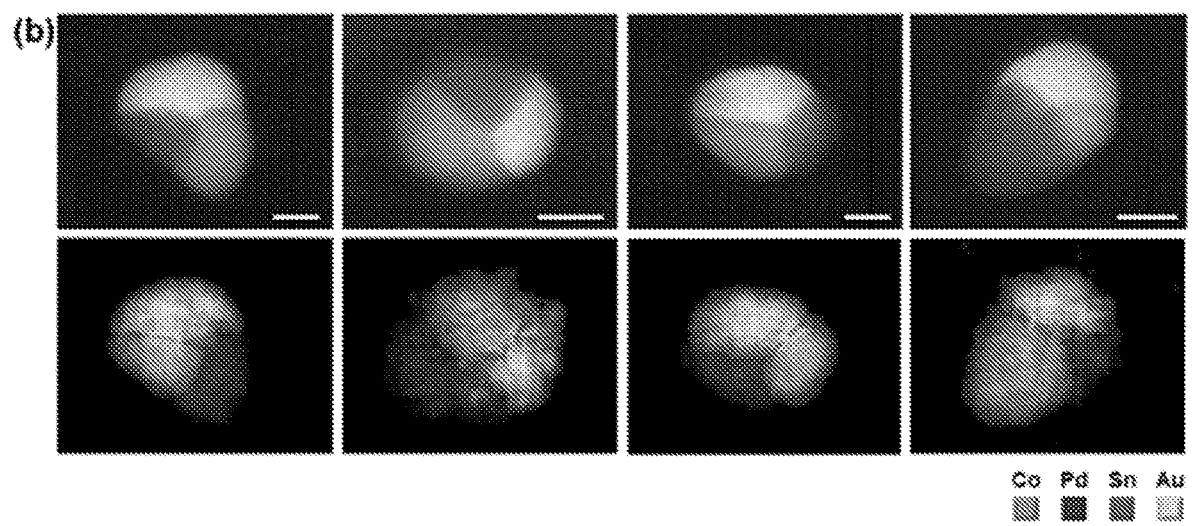
FIG. 18B is ADF-STEM images and EDS elemental mapping of Au—Co—$Pd_2Sn$ tri-phase nanoparticles (Pd:Sn=2:1) with different angles between three phase boundaries. Scale bars, 15 nm. While the nanoparticles in FIG. 18A or FIG. 18B are composed of the same material phases, the angles between three phase boundaries are different in each particle. This suggests that the interfacial lattice structures in these nanoparticles are different. The nanoparticles all have a pie-shaped architecture.

Referring to FIGS. 17 and 18, although the DFT simulation was performed on ideal lattice models that do not perfectly match the actual scenario where NPs have various interfacial lattice structures, the architectures of tri-phase NPs synthesized by SPBCL match the simulation predictions. Without intending to be bound by theory, it is believed that the high temperature long-term annealing process provides sufficient time and energy for NPs to reconfigure their architectures to the energy-minimized state. Referring to FIG. 22, the annealing process for the Au—Co—PdSn tri-phase NPs kinetically arrested after 0.5 and 1.5 h at 500° C., respectively. It was found that the kinetics are complex, with intraparticle coarsening leading to particles with three distinct metal domains. Due to the randomness of the metal element aggregation within the polymer nanoreactors, element distribution is different within such architectures. Specifically, for the Au—Co—PdSn NP system, striped tri-phase NPs containing only two interfaces are observed as kinetic products (where any of the three domains consisting of Au, Co, or PdSn form the central domain, FIG. 4B). The interchangeability of the central domain provides further evidence that all three phases interact comparable well with each other. Importantly, upon continued annealing at 500° C., the Au—Co—PdSn NPs transform into pie-shaped architectures (FIG. 4A). Since the annealing temperature is higher than the Tammann temperature of bulk Au (395° C.)° and melting temperature of bulk Sn (232° C.), it is believed that the transformation proceeds through the motion of surface atoms on the NP as opposed to the entire movement of intact domains. Referring to FIG. 4B, experimentally, it was found that the majority of Au—Co—PdSn NPs were converted into a pie-shaped architecture (architectural yield: ~75%, sample size: 150), which is consistent with the conclusion that the pie-shaped architecture is the thermodynamic product, due to a balance between surface and interfacial energy.

Interface Engineering in Tetra-Phase Nanoparticles

Interfaces not observed in lower-order NPs are energetically unfavorable, which precludes their existence in higher-order NPs containing the same phase domains.

Referring to FIG. 1A, bottom row, tetra-phase heterostructured NPs with four distinct metal phases have four distinct types of surfaces, defined by the different phases that comprise them. In addition, they can have up to six interfaces. DFT simulation of such nanoparticles requires comparison of the surface energy of four phases and the interfacial energy of six interfaces, and becomes even more convoluted when accounting for defects present near interfaces. Because a tetra-phase NP can always be broken down into four constituent tri-phase NPs, experimentally the architecture of the four tri-phase NPs (either striped or pie-shaped) will be predictive of the thermodynamic architecture of the tetra-phase NP. Referring to FIG. 1B, when classifying the architectures of four tri-phase NPs, there are six non-duplicated tri-phase NP combination types that, in theory, lead to tetra-phase NPs with either three-, four-, four-, five-, five-, or six-interfaces, respectively.

In accordance with embodiments, SPBCL can be used to construct a combinatorial library of NPs by changing the formulation of the polymer nanoreactors. For example, as illustrated in FIGS. 23 to 28, in an embodiment, with PdSn as the basic building block, all thirty-one types of multi-phase nanoparticles consisting of Au, Ag, Cu, Co, Ni, and PdSn synthesized and characterized. In addition to Au and Co, it was found that Ag, Cu, and Ni phase-segregate with PdSn, forming Ag—PdSn, $Cu_{0.92}Pd_{0.08}$—$Cu_{0.2}(PdSn)_{0.8}$, and $Ni_{0.6}Sn_{0.4}$—$Ni_{0.08}(PdSn)_{0.92}$ heterodimers, respectively. The phase segregation in these particles can be explained by the thermodynamically stable phases evaluated with GCLP method described in detail below (Table 2). Referring to FIGS. 1B, 5 and 6, when higher-order structures are synthesized, the library of PdSn-based NPs contains tri-phase NP combinations that can be used to synthesize tetra-phase architectures with up to six interfaces.

Figure 5A:
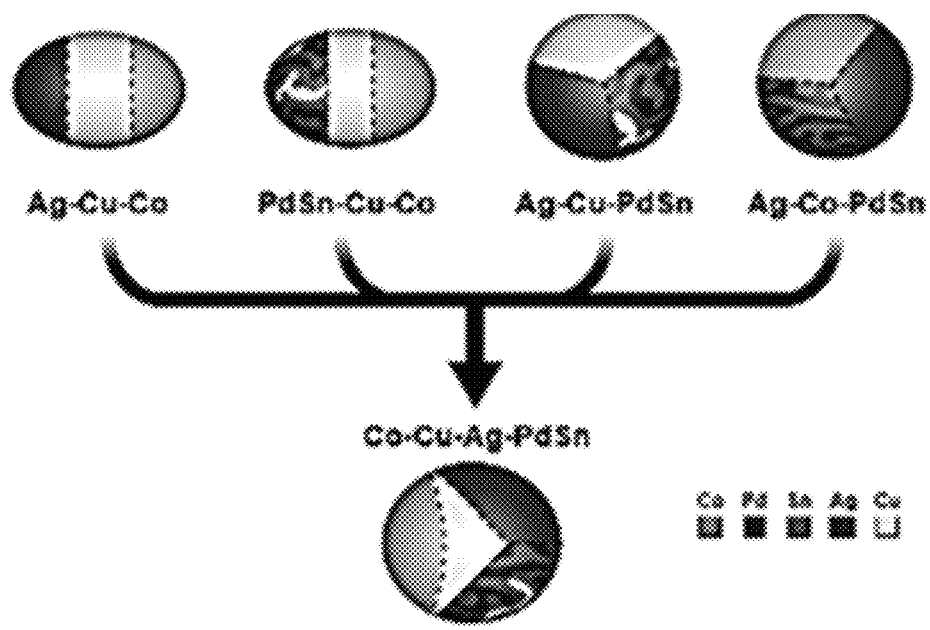
FIG. 5A is a schematic illustration depicting the architectures of tri-phase or tetra-phase nanoparticles composed of Ag, Cu, Co, and PdSn phases. Dashed lines outline the position of phase boundaries.
Figure 5B:
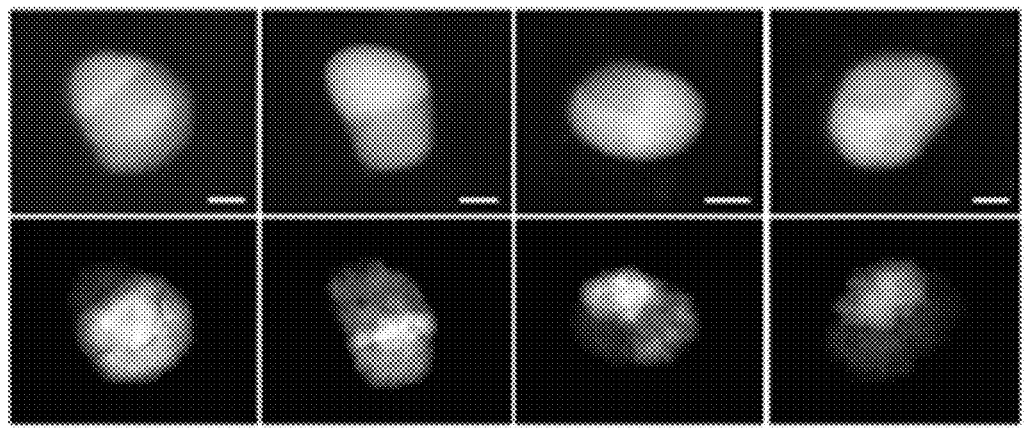
FIG. 5B is ADF-STEM images (top row) and EDS mapping (bottom row) of representative tri-phase nanoparticles for all phase combinations. The compositions of the four hi-phase nanoparticles are $Ag_{0.23}Cu_{0.47}Co_{0.30}$, $Co_{0.34}Cu_{0.29}Pd_{0.21}Sn_{0.16}$, $Ag_{0.30}Cu_{0.30}Pd_{0.27}Sn_{0.13}$, and $Ag_{0.34}Co_{0.24}Pd_{0.27}Sn_{0.17}$.
Figure 29:
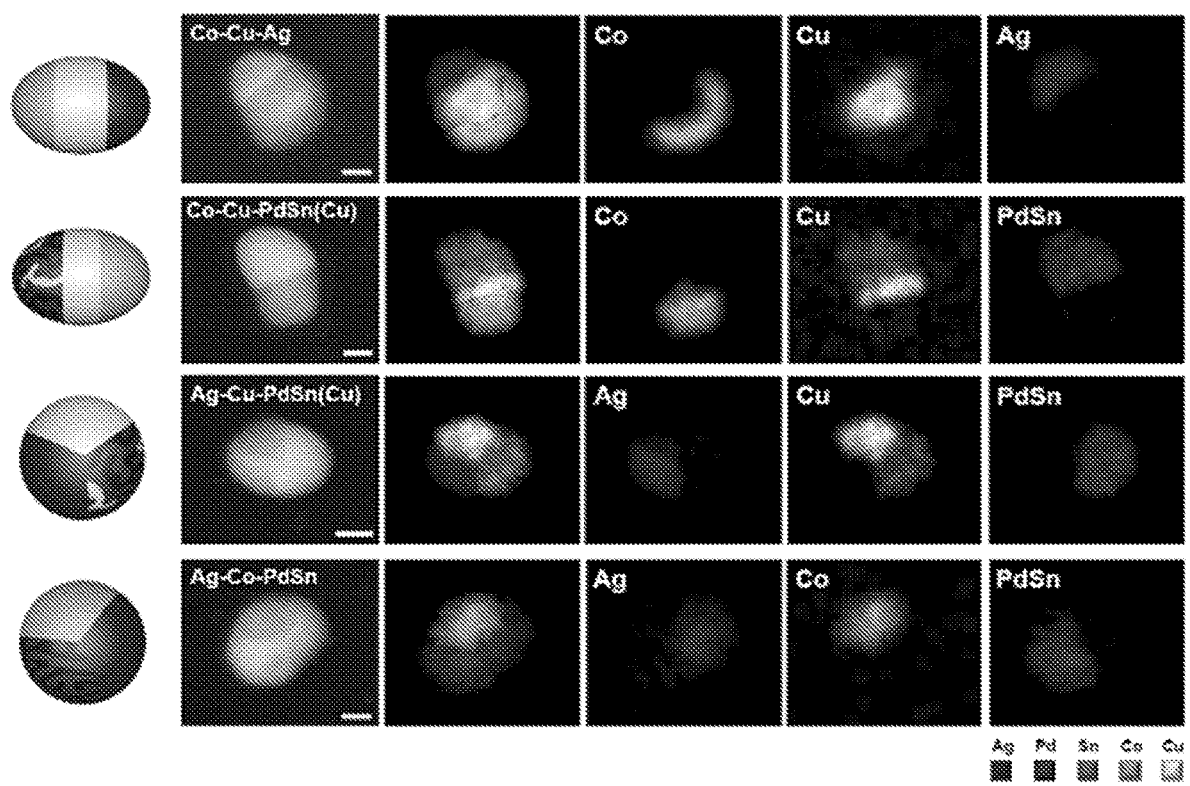
FIG. 29 is ADF-STEM images and detailed EDS elemental mapping of the tri-phase nanoparticles in FIG. 4b ($Ag_{0.23}Cu_{0.47}Co_{0.30}$, $Co_{0.34}Cu_{0.29}Pd_{0.21}Sn_{0.16}$, $Ag_{0.30}Cu_{0.30}Pd_{0.27}Sn_{0.13}$, and $Ag_{0.34}Co_{0.24}Pd_{0.27}Sn_{0.17}$). Scale bars, 15 nm. Overlay of all element maps (second column) and selected element maps (third to fifth columns) show the relative position of three phases in each particle.

To confirm that tri-phase NP architectures could be used to predict tetra-phase NP architectures, tetra-phase NPs were synthesized by selecting tri-phase NP combinations that would yield increasingly complex architectures. Referring to FIGS. 1B and 5A, the first NP combination included two striped tri-phase NPs and two pie-shaped tri-phase NPs. Referring to FIGS. 5B and 29, a system consisting of Ag, Cu, Co, and PdSn matches this scenario, where Ag—Cu—Co and PdSn—Cu—Co are striped heterotrimers, and Ag—Cu—PdSn and Ag—Co—PdSn are pie-shaped heterotrimers, as observed in the ADF-STEM images and EDS elemental mapping of every tri-phase NP.

Figure 5C:
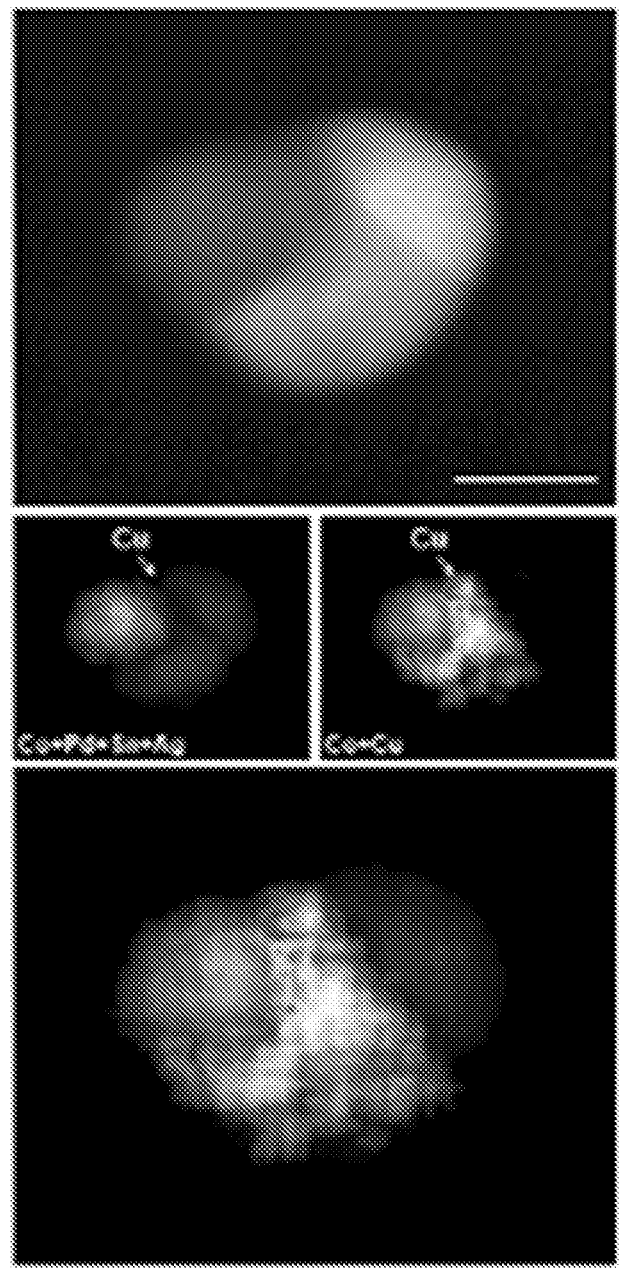
FIG. 5C is ADF-STEM image (top row) and EDS mapping (bottom row) of a representative tetra-phase nanoparticles composed of Ag, Cu, Co, and PdSn phases ($Ag_{0.32}Cu_{0.20}Co_{0.21}Pd_{0.15}Sn_{0.12}$). Overlay of selected element maps (middle row) reveals the relative position of four phases in the nanoparticles.
Figure 30:
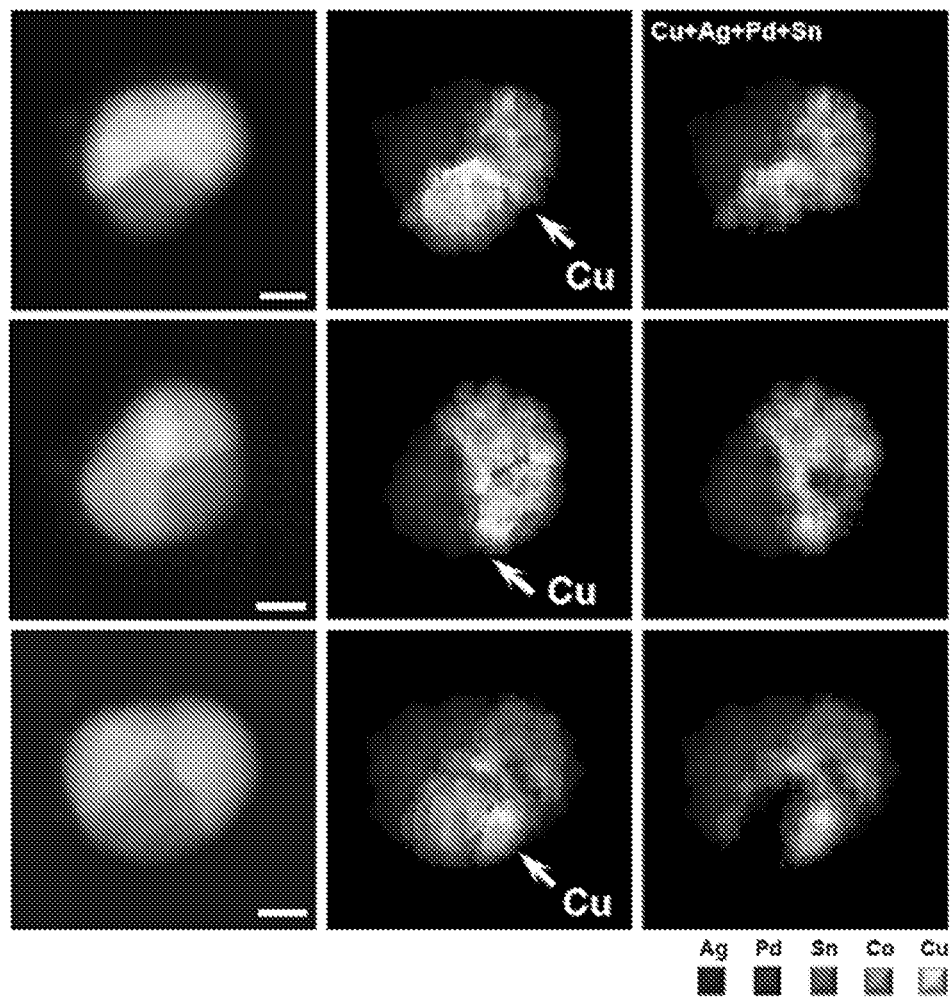
FIG. 30 is ADF-STEM images and EDS elemental mapping of three representative Ag—Cu—Co—PdSn tetraphase nanoparticles ($Ag_{0.28}Cu_{0.23}Co_{0.23}Pd_{0.16}Sn_{0.10}$, $Ag_{0.31}Cu_{0.19}Co_{0.21}Pd_{0.17}Sn_{0.12}$, and $Ag_{0.29}Cu_{0.21}Co_{0.23}Pd_{0.17}Sn_{0.11}$). Scale bars, 15 nm. Overlay of all element maps (middle column) and selected element maps (right column) reveal the configuration of four phases in Ag—Cu—Co—PdSn particles.

The architectures of the four tri-phase NPs suggest that the interfaces between Ag/Co and between PdSn/Co are energetically unfavorable compared to the other four interfaces and four surfaces, which should prevent formation of such interfaces when the tetra-phase NP reaches a thermodynamic configuration. Ag—Cu—Co—PdSn NPs were synthesized and their structures analyzed by ADF-STEM and EDS. Referring to FIGS. 5C and 30, the majority (architectural yield: ~70%, sample size: 30) of Ag—Cu—Co—PdSn NPs had architectures as predicted. The Cu domain in the center of the NP separates the Co domain from the Ag and PdSn domains, thus avoiding the formation of Ag—Co interface and PdSn—Co interface. On the other hand, the three interfaces between Cu, Ag, and PdSn domains connect with each other, forming a tri-phase junction. Tetra-phase NPs with this combination of tri-phase architectures adopt an architecture with four interfaces and one tri-phase junction.

Figure 5D:
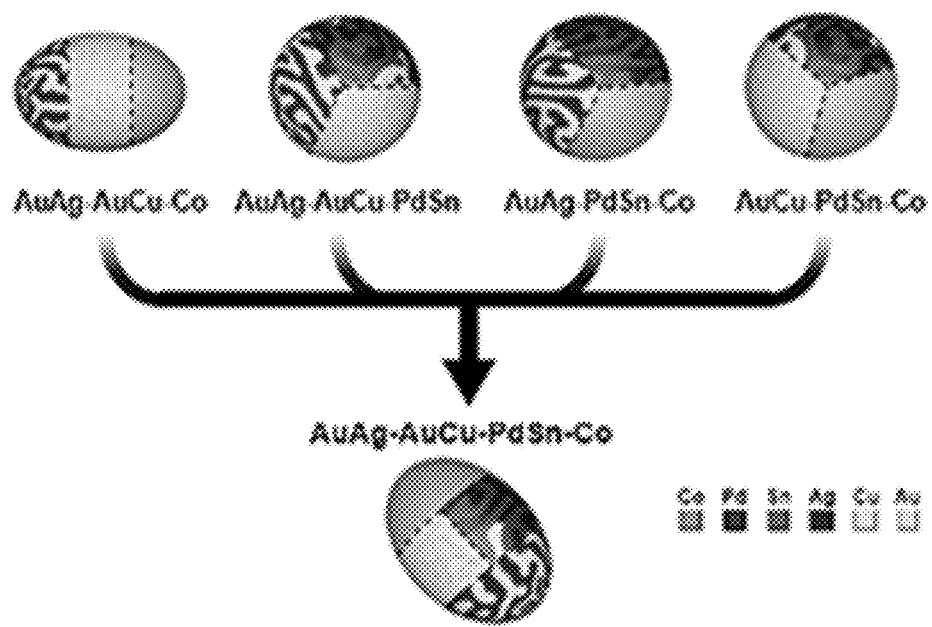
FIG. 5D is a schematic illustration depicting the architectures of tri-phase and tetra-phase nanoparticles composed of AuAg, AuCu, Co, and PdSn phases. Dashed lines outline the position of phase boundaries.
Figure 5E:
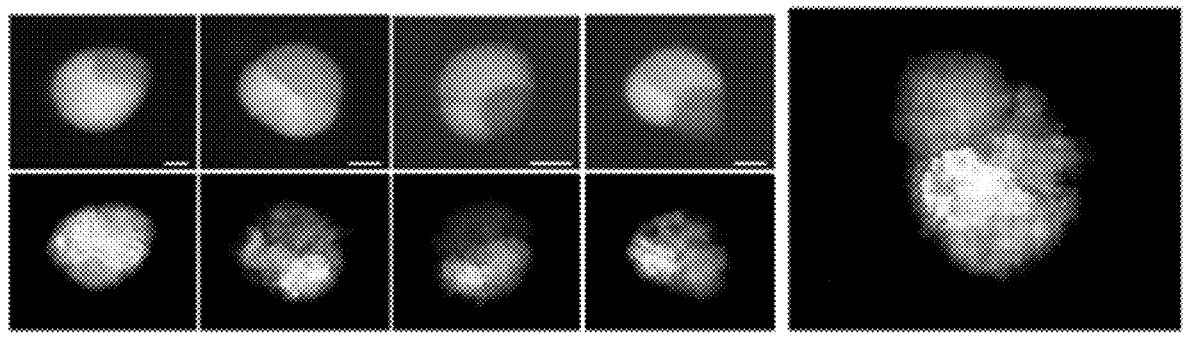
FIG. 5E is ADF-STEM images (top row) and EDS mapping (bottom row) of representative tri-phase nanoparticles for all phase combinations. The compositions of the four tri-phase nanoparticles are $Au_{0.30}Ag_{0.19}Cu_{0.29}Co_{0.22}$, $Au_{0.12}Ag_{0.30}Cu_{0.28}Pd_{0.20}Sn_{0.10}$, $Au_{0.06}Ag_{0.10}Co_{0.24}Pd_{0.39}Sn_{0.24}$, and $Au_{0.13}Cu_{0.27}Co_{0.30}Pd_{0.15}Sn_{0.15}$.
Figure 5F:
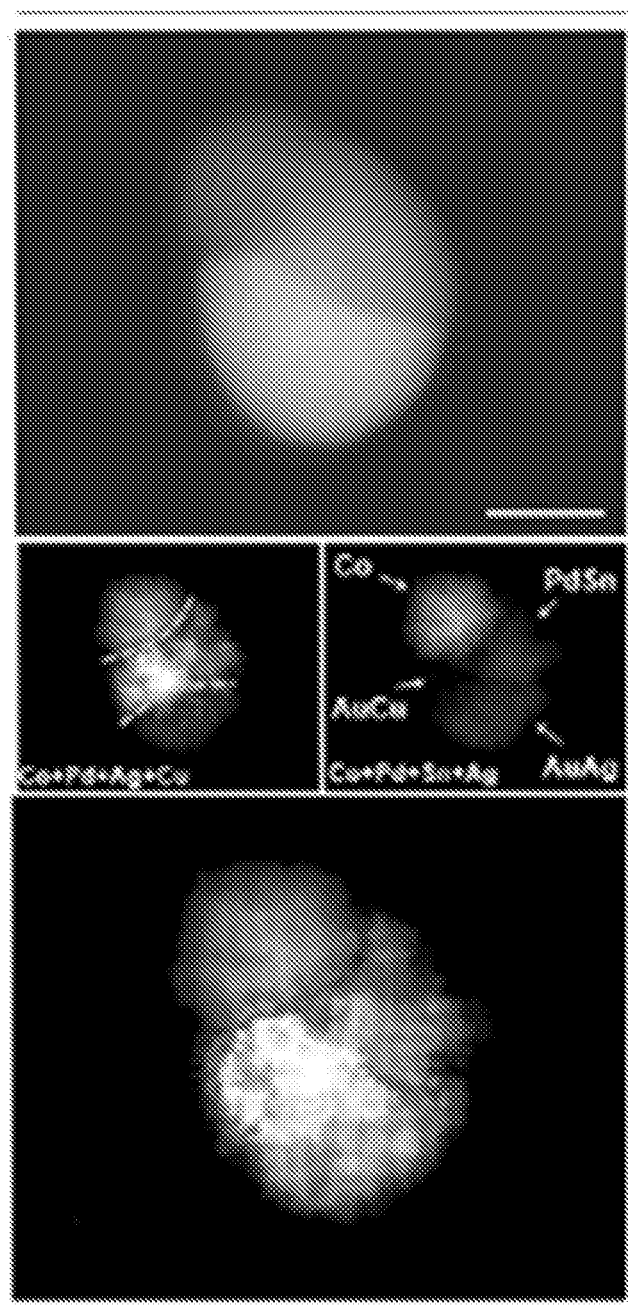
FIG. 5F is ADF-STEM image (top row) and EDS mapping (bottom row) of a representative tetra-phase nanoparticle composed of AuAg, AuCu, Co, and PdSn phases ($Au_{0.18}Ag_{0.16}Cu_{0.20}Co_{0.23}Pd_{0.13}Sn_{0.10}$). Overlay of selected element maps (middle row) shows the relative configuration of the four phases in the nanoparticle. Dashed yellow lines highlight the position of five phase boundaries (scale bar 15 nm)
Figure 31:
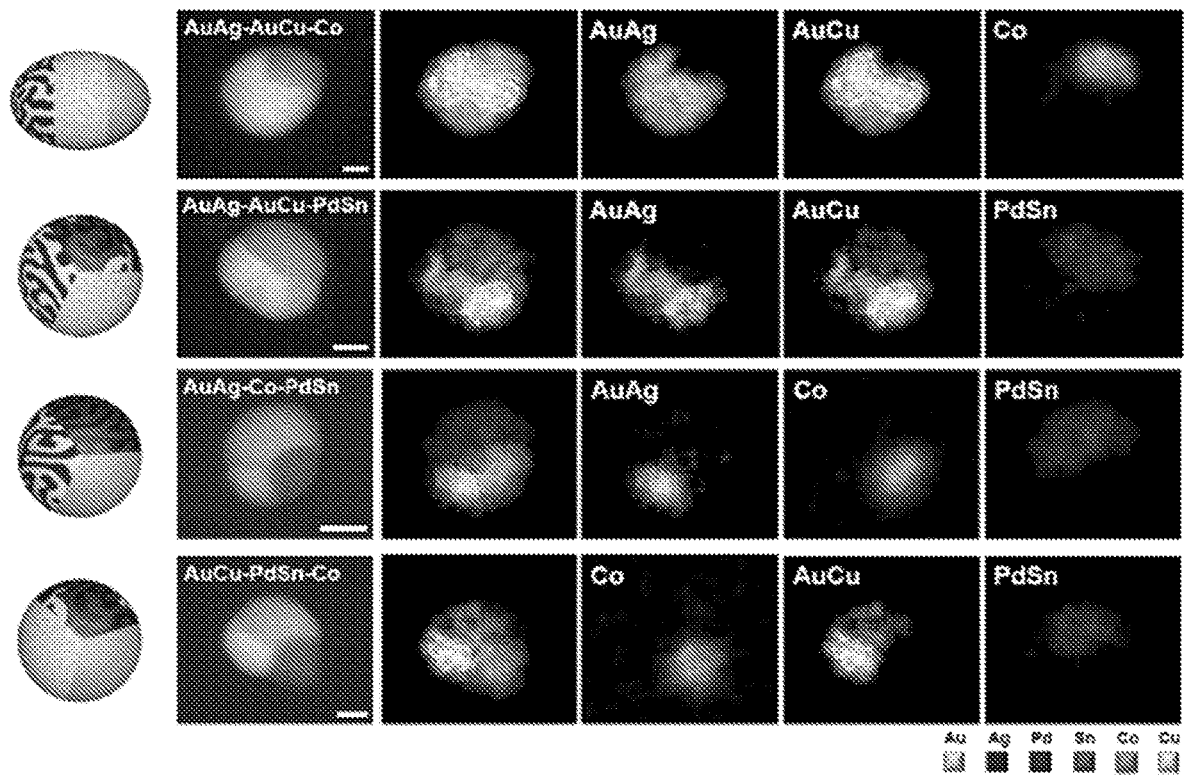
FIG. 31 is ADF-STEM images and detailed EDS elemental mapping information of the tri-phase nanoparticles in FIG. 4e ($Au_{0.30}Ag_{0.19}Cu_{0.29}Co_{0.22}$, $Au_{0.12}Ag_{0.30}Cu_{0.28}Pd_{0.20}Sn_{0.10}$, $Au_{0.06}Ag_{0.10}Co_{0.24}Pd_{0.39}Sn_{0.21}$, and $Au_{0.13}Cu_{0.27}Co_{0.30}Pd_{0.15}Sn_{0.15}$). Scale bars, 15 nm. Overlays of all element maps (second column) and selected element maps (third to fifth columns) show the relative position of three phases in each particle
Figure 32:
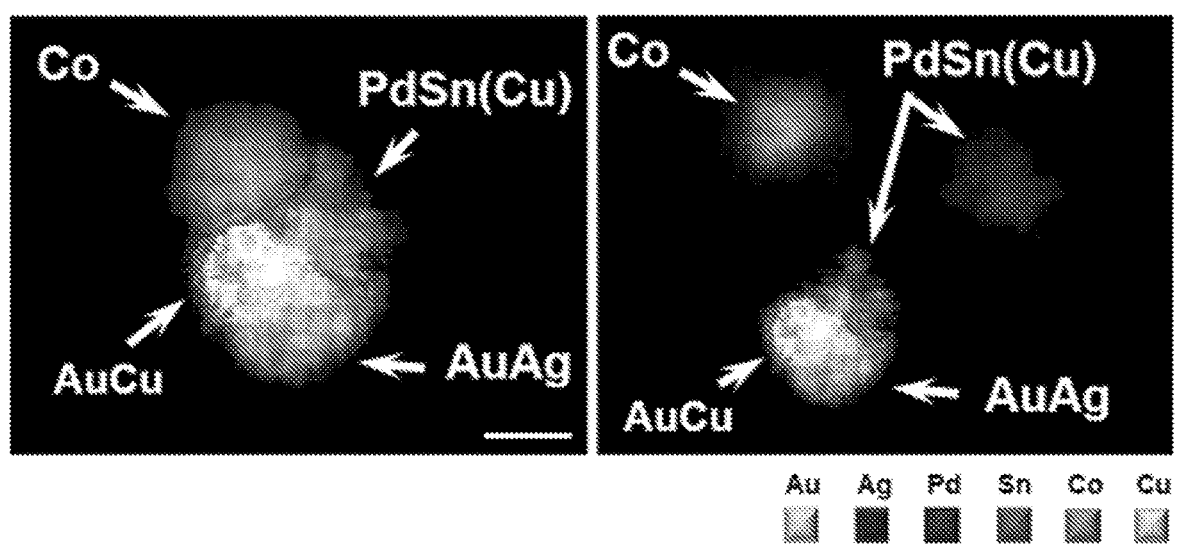
FIG. 32 is additional EDS mapping information of the AuAgCuCoPdSn nanoparticle in FIG. 4f. The overlay of selected element maps shows that the particle consists of four phases (AuAg, AuCu, Co, and PdSn) with five phase boundaries. Scale bar, 15 nm.
Figure 33A:
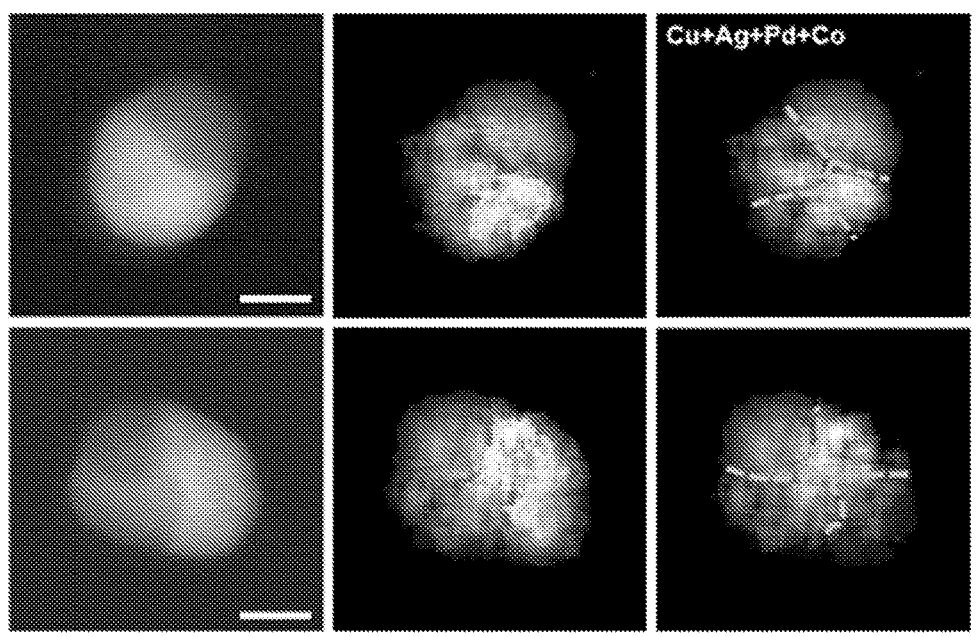
FIGS. 33A and 33B are ADF-STEM images and EDS elemental mapping of representative (FIG. 33A) AuAg—AuCu—Co—PdSn ($Au_{0.11}Ag_{0.15}Cu_{0.17}Co_{0.28}Pd_{0.19}Sn_{0.10}$ and $Au_{0.17}Ag_{0.15}Cu_{0.17}Co_{0.23}Pd_{0.18}Sn_{0.10}$) and (FIG. 33B) AuAg—AuCu—NiSn—PdSn ($Au_{0.17}Ag_{0.12}Cu_{0.22}Ni_{0.14}Pd_{0.19}Sn_{0.16}$) tetra-phase nanoparticles. Scale bars, 15 nm. Overlays of all element maps (middle column) and selected element maps (right column) reveal the configuration of four phases in the nanoparticles. Dashed yellow lines indicate the position of the five phase boundaries in one nanoparticle.
Figure 33B:
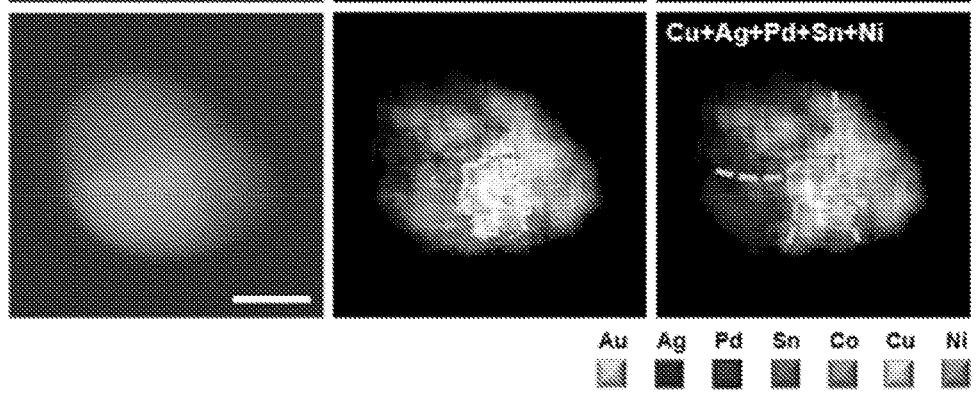

Referring to FIGS. 1B and 5D, the second NP combination consists of one tri-phase NP with two interfaces while the other three tri-phase NPs have three interfaces. The tri-phase combinations of AuAg, AuCu, Co, and PdSn satisfies this category, where AuAg—AuCu—Co is a striped heterotrimer, and AuAg—AuCu—PdSn, AuAg—PdSn—Co, and AuCu—PdSn—Co are pie-shaped heterotrimers. Referring to FIGS. 5E and 31, the architecture of every tri-phase NP was verified by the ADF-STEM characterization and EDS elemental mapping. The only striped NP (AuAg—AgCu—Co) in this combination type suggests that only one interface is energetically unfavored when forming a tetra-phase NP. AuAg—AuCu—PdSn—Co NPs were synthesized to confirm the prediction. As shown in FIGS. 5F, 32 and 33, AuCu and PdSn domains are in the center of the particle with AuAg and Co domains capped on each end (architectural yield: ~70%, sample size: 30). One tri-phase junction forms between AuAg/AuCu/PdSn phases. The other tri-phase junction forms between AuCu/PdSn/Co phases. Tetra-phase NPs with this combination of tri-phase particle types have an architecture with five interfaces and two tri-phase junctions.

Figure 6A:
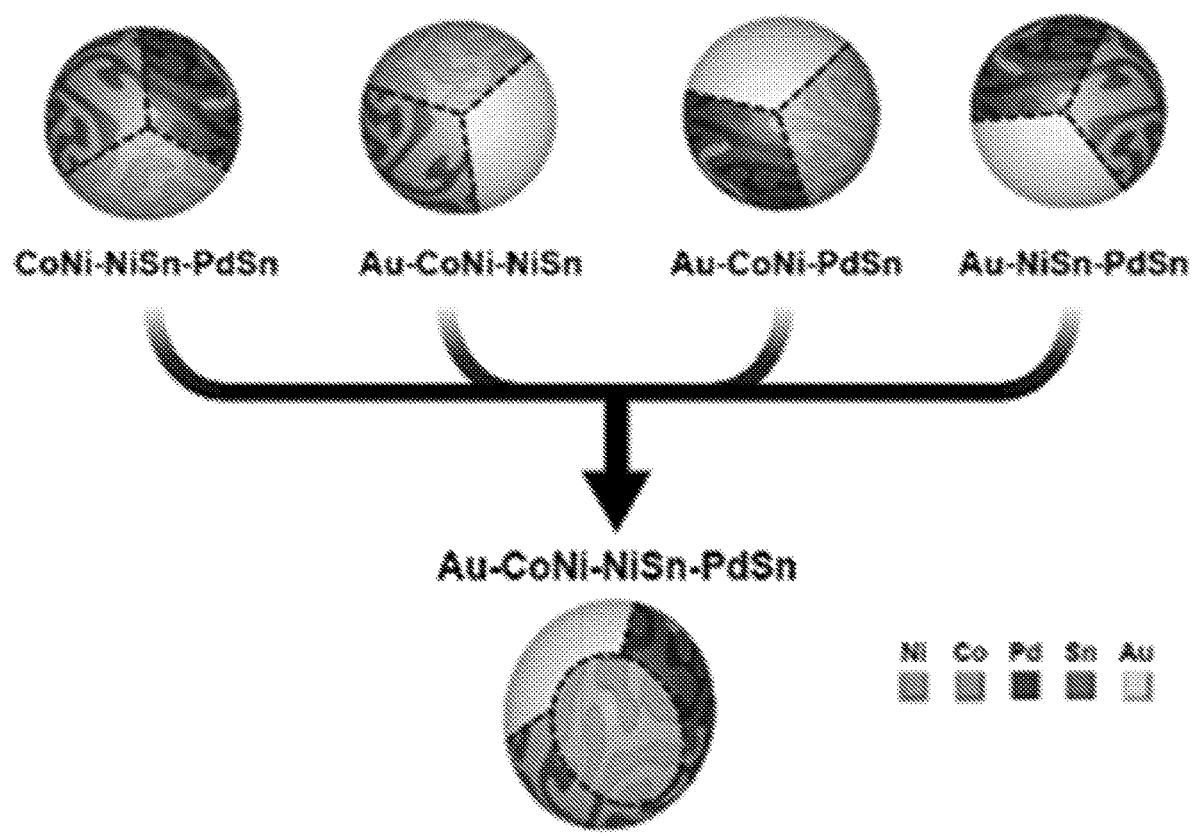
FIG. 6A is a schematic illustration of the architectures of tri-phase or tetra-phase nanoparticles composed of Au, CoNi, NiSn, and PdSn phases. Dashed lines outline the position of phase boundaries.
Figure 6B:
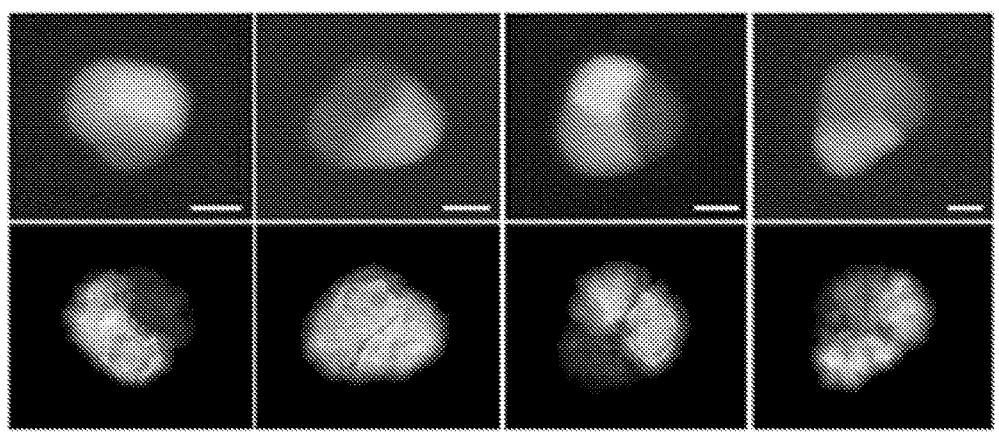
FIG. 6B is ADF-STEM images (top row) and EDS mapping (bottom row) of representative tri-phase nanoparticles for all phase combinations. The compositions of the four hi-phase NPs are $Co_{0.13}Ni_{0.35}Pd_{0.26}Sn_{0.26}$, $Au_{0.37}Co_{0.18}Ni_{0.36}Sn_{0.09}$, $Au_{0.29}Co_{0.17}Ni_{0.19}Pd_{0.20}Sn_{0.15}$, and $Au_{0.25}Ni_{0.24}Pd_{0.20}Sn_{0.31}$ (scale bars 15 nm)
Figure 6C:
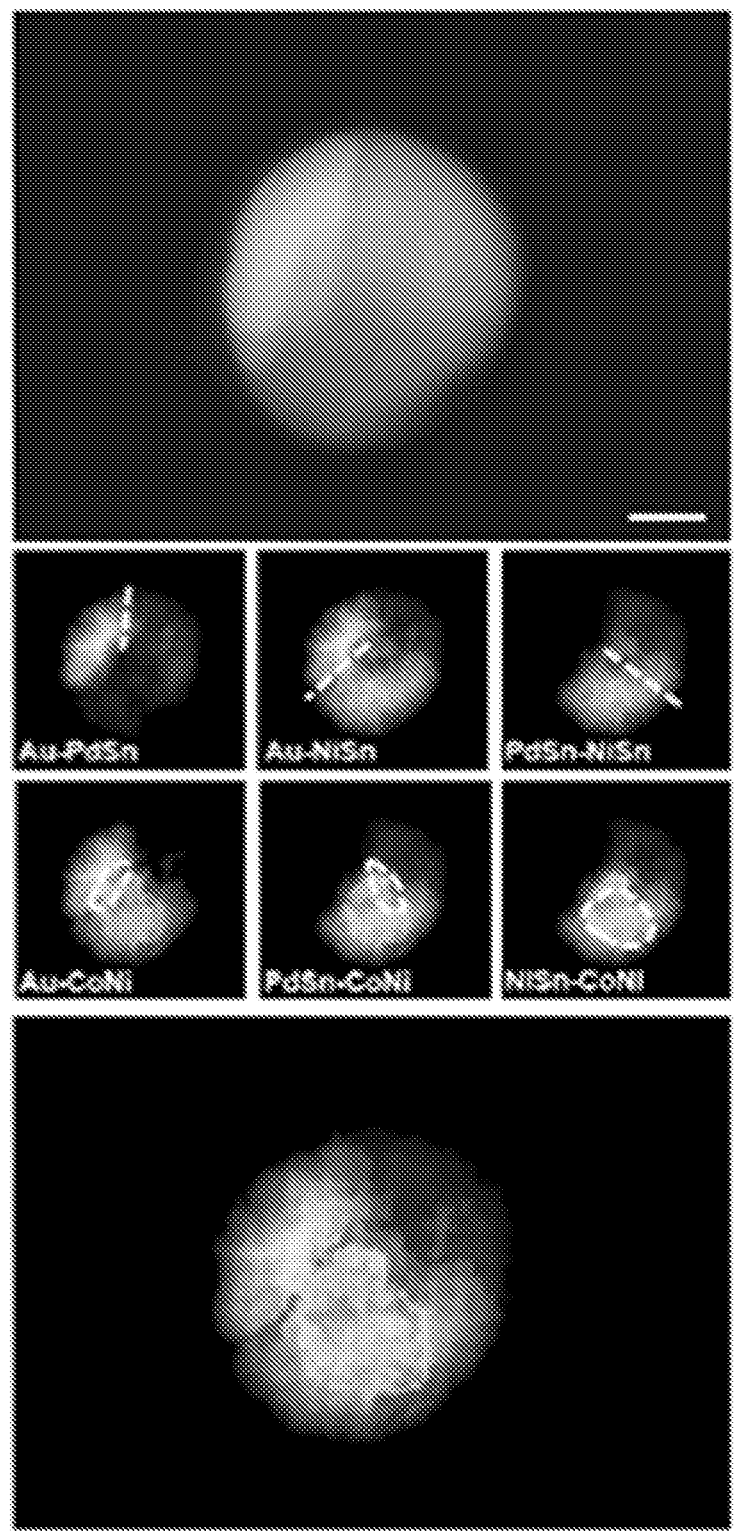
FIG. 6C is an ADF-STEM image (top row) and EDS mapping (bottom row) of a representative tetra-phase nanoparticle composed of Au, CoNi, NiSn, and PdSn phases ($Au_{0.20}Co_{0.11}Ni_{0.30}Pd_{0.21}Sn_{0.18}$). Overlay of selected elemental maps (two middle rows) show the relative position of any two of the four phases. Dashed lines/circles outline the position of six phase boundaries in the nanoparticle (scale bars 15 nm)
Figure 34:
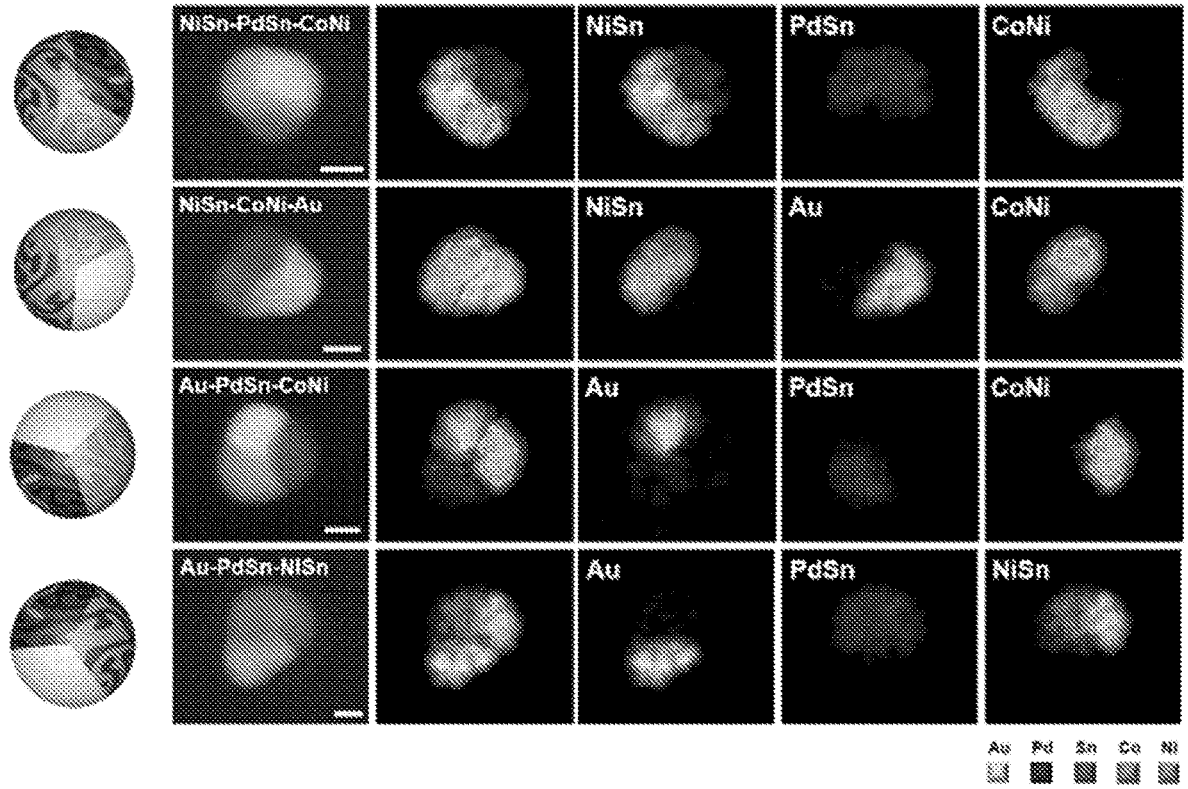
FIG. 34 is ADF-STEM images and detailed EDS elemental mapping information of the tri-phase nanoparticles in FIG. 5b ($Co_{0.13}Ni_{0.35}Pd_{0.26}Sn_{0.26}$, $Au_{0.37}Co_{0.18}Ni_{0.36}Sn_{0.09}$, $Au_{0.29}Co_{0.17}Ni_{0.19}Pd_{0.20}Sn_{0.15}$, and $Au_{0.25}Ni_{0.24}Pd_{0.20}Sn_{0.31}$). Overlays of all element maps (second column) and selected element maps (third to fifth columns) show the relative position of three phases in each particle. Scale bars, 15 nm.
Figure 35A:
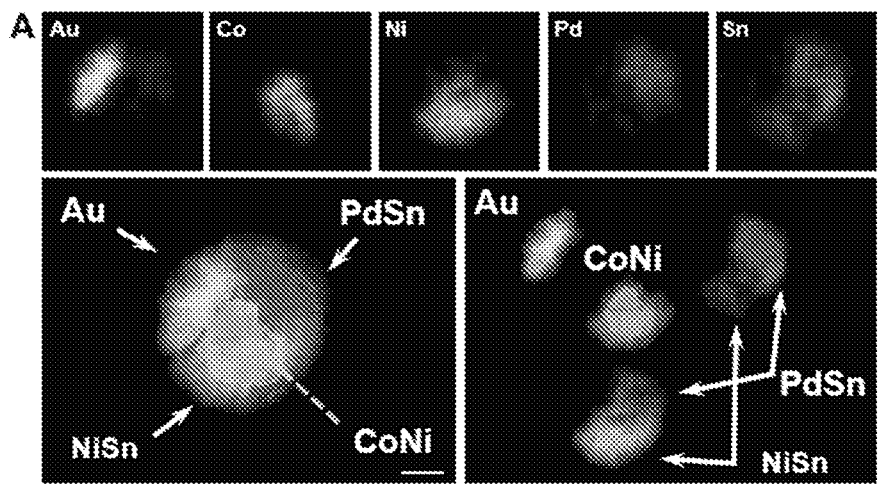
FIGS. 35A and 35B are additional EDS mapping information of the Au—CoNi—NiSn—PdSn tetra-phase nanoparticle in FIG. 5c. The overlay of selected element maps clearly indicates that the particle consists of four phases with six phase boundaries. Scale bar, 15 nm.
Figure 35B:
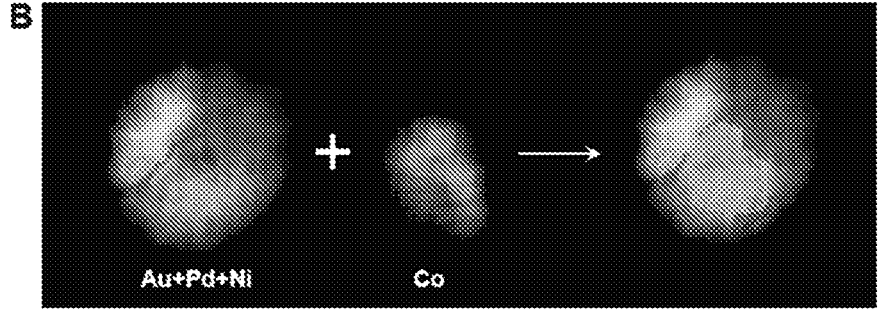
Figure 35C:
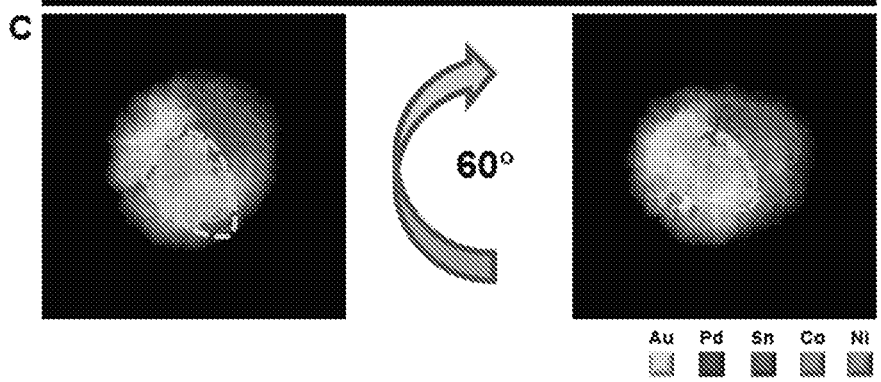
FIG. 35C is EDS mapping of the same particle after rotating the particle 60°. Dashed circles in the images outline the position of CoNi phase as guides for the eye. The CoNi phase moves from the bottom of the image to the center of the image, indicating that the CoNi domain is on top of the particle.
Figure 35D:
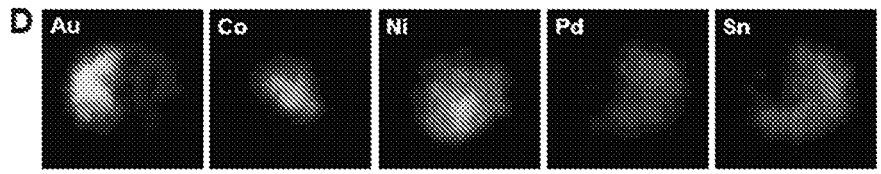
FIG. 35D is EDS mapping showing detailed elemental mapping information of the tilted nanoparticle in FIG. 35C.
Figure 38:
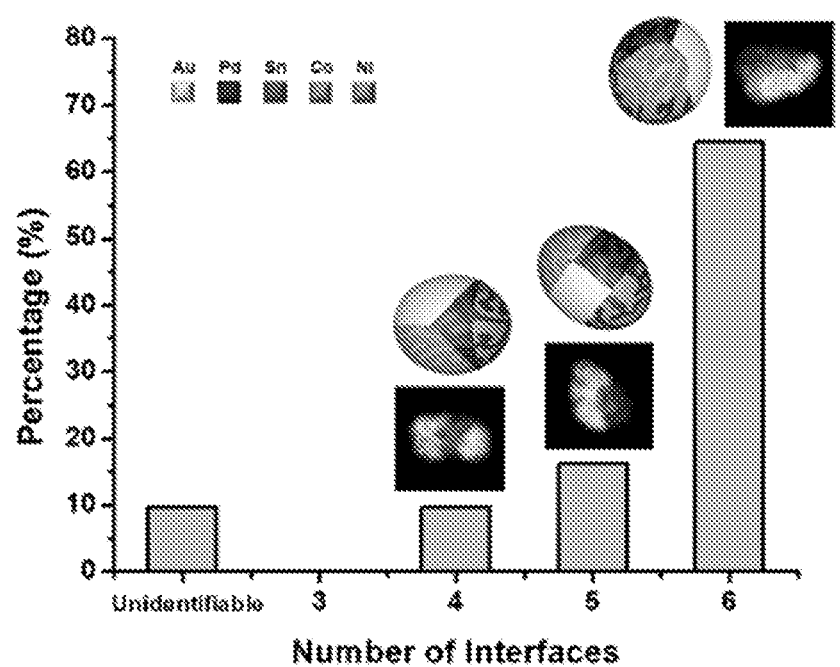
FIG. 38 is a graph illustrating the distributions of Au—CoNi—PdSn—NiSn heterotetramers with different architectures (calculated based on 30 particles)

As a final demonstration of interface engineering in polyelemental NPs, a system where all four tri-phase NPs share the same configurational feature, i.e., a pie-shaped architecture, was utilized. Referring to FIG. 1B, the architecture of the four tri-phase NPs suggests that all six interfaces and four surfaces are energetically compatible with each other. Referring to FIGS. 6A, 6B, and 34, the combination of Au, CoNi, NiSn, and PdSn phases was found to satisfy this combination type. Referring to FIGS. 6C, 35-38, the incorporation of these four phases into one NP leads to an unprecedented nanostructure with four constituent domains interfaced with each other (architectural yield: ~65%, sample size: 30). The overlay of EDS element maps revealed the distribution of four phases and their spatial relationship in one typical NP. Referring to FIGS. 35 and 6C, the Au, PdSn, and NiSn domains interconnect with each other while the CoNi domain sits on top of the other three domains, forming six phase boundaries in one particle (FIGS. 35 and 6c). Tetra-phase NPs composed of a subset of four pie-shaped tri-phase NPs have an architecture with six interfaces, four tri-phase junctions, and one tetra-phase junction point that is embedded in the NP. In embodiments, the method can include utilizing tri-phase NPs can be utilized as models for engineering the configuration of phase boundaries in higher order NPs.

In accordance with embodiments, methods of interface engineering can include determining the balance of surface and interfacial energy for determining the preferred structure of multi-phase NPs. For example, tetra-phase polyelemental NPs were generated in accordance with embodiments having four, five, and six phase boundaries. Methods in accordance with embodiments of the disclosure can be used for elucidating the complicated architecture of NPs containing more than four phases, where the NPs may have ten or more different interfaces. In embodiments, interface engineering in polyelemental nanomaterials can be used for optimizing their use in catalysis, plasmonics, nanoelectronics, and energy harvesting.

Examples

Chemicals and Materials.

Poly(ethylene oxide)-b-poly(2-vinyl pyridine) (PEO-b-P2VP, $M_n$=2.8-b-1.5 kg/mol, polydispersity index=1.11) was purchased from Polymer Source, Inc. The polymer was purified by dialysis (ThermoFisher dialysis cassettes, 2K MWCO) with deionized water for 5 days before use. Metal compounds (>99.9% trace metal basis), $HAuCl_4 \cdot 3H_2O$, $AgNO_3$, $Cu(NO_3)_2 \cdot xH_2O$, $Co(NO_3)_2 \cdot 6H_2O$, $Ni(NO_3)_2 \cdot 6H_2O$, $(NH_4)_2PdCl_6$, and $SnCl_4$ were purchased from Sigma-Aldrich, Inc. and used without further purification. Atomic force microscopy (AFM) multi-contact 1D probes (type M, no gold coating) were purchased from Advanced Creative Solutions Technology, Inc. Hexamethyldisilazane (HMDS) was purchased from Sigma-Aldrich, Inc. TEM grids with 15 or 50 nm silicon nitride support films were purchased from Ted Pella, Inc.

Preparation of Block Copolymer Solution.

Polymer ink solution was prepared by dissolving PEO-b-P2VP and different metal compounds in de-ionized water in predetermined molar ratios. The ink solution had a polymer concentration of 5 mg/mL. The molar ratio of pyridyl group to total metal precursors varied between 48:1 and 256:1 to control the size of nanoparticles. To reduce the hydrolysis of $SnCl_4$, the pH of the ink solution was adjusted to 1 by the addition of HCl. The ink solution was stirred for 1 h at room temperature prior to use.

Nanoparticle (NP) Synthesis.

Nanoparticles were synthesized on TEM grids by scanning probe block copolymer lithography (SPBCL). In a typical experiment, hydrophobic TEM grids were obtained by vapor coating the grids with HMDS for 24 h in a desiccator that contained a vial of an HMDS and hexane mixture (1:1, v/v). AFM 1D probes were mounted onto a Park XE-150 AFM. The probes were dip-coated with polymer ink solution and subsequently brought into contact with the hydrophobic TEM grids to deposit arrays of polymer nanoreactors. The patterning process was performed in a chamber at a controlled temperature of 25° C. and relative humidity of 85%. To synthesize nanoparticles in the polymer nanoreactors, the TEM grids were thermally annealed in a tube furnace. annealing conditions were as follows: ramp to 160° C. under $H_2$ in 10 min, hold at 160° C. for 6 h, ramp to 300° C. in 10 min, hold at 300° C. for 6 h, ramp to 500° C. in 10 min, thermally anneal the grids at 500° C. for 12 h, and finally cool down to room temperature in 0.5 h.

$SnCl_4$, a precursor utilized for making Sn-containing nanoparticles, is hydrolysable in aqueous polymer solutions, which made it difficult for SPBCL to control the composition of Sn-containing nanoparticles. It was found that improved compositional control for Sn-containing multi-phase nanoparticles, could be achieved by adjusting the pH of the polymer solution to about 1 by adding HCL, thus keeping HCL in large excess compared to $AnCl_4$ to decrease the hydrolysis of SnCL4 ($HCl/SnCl_4$>60:1 for all polymer ink solutions. Additionally, freshly prepared polymer solution with one hour of stirring was used.

In the SPBCL experiments of the examples, 0.2 μL of polymer ink solution was used to dip-coat AFM probes. The actual volume of the polymer nanoreactor for making one nanoparticle was at the attoliter scale. For particles made from the sample AFM probe in one batch, the nanoparticles were found to have similar composition, varying about 5-10% for each element for a given sample size of 150 nanoparticles. Compositions of nanoparticles made from the same polymer solution but in various batches of the AFM probe dip-coating were found to be vary significantly, with variation of >25% for each element in a sample size of 150. Without intending to be bound by theory it is believed that the batch-to-batch variation suggests that the metal precursors are not evenly distributed in the polymer solution, which may be attributable to the short-time stirring used in the experiments. The uniformity found in a single batch analysis suggests that the polymer solution is locally uniform at the attoliter scale.

Density Functional Theory (DFT) Simulations.

All DFT calculations were carried out using the Vienna Ab-initio Simulation Package (VASP) with the projected augmented wave (PAW) potentials, and Perdew-Burke-Ernzerhof (PBE) formulation of the generalized gradient approximation (GGA).[51-53] To compute interfacial energies, we generated interface models containing two domains, where each domain consists of four (111) atomic planes. The interface structures are created using Virtual NanoLab (VNL) package and the final strain of each interface structure is less than 1.5%. All of these structures were fully relaxed and Γ-centered k-point meshes were constructed to achieve at least 4000 k-points per reciprocal atom. For each surface energy calculation, we used a crystal slab model and a vacuum region, which are periodically arranged along the direction perpendicular to the surface. Each surface contains seven (111) atomic layers of with (2×2) unit cell and a vacuum region of 15 Å in thickness. The middle three layers are fixed and the other layers are allowed to relax. Brillouin-zone integrations are sampled using Γ-centered k-point meshes corresponding to a 9×9×1 grid. For both interface and surface calculations, an energy cutoff of 400 eV is used for the plane wave basis set used to represent the electronic wave functions and an energy tolerance of $1\times10^{-5}$ eV for the relaxation of all the structure. Spin polarization is included for all DFT calculations in this work. The surface energies are calculated by $\gamma=(E_{slab}-\Sigma_{n_i\mu_i})/2A_{surface}$, where $E_{slab}$ is the total energy of the surface slab, $n_i$ is number of i atoms in the systems, $\mu_i$ is the chemical potential of the element i and $A_{surface}$ is the surface area. The interfacial energies are calculated by $\sigma=(E_{AB}-E_A^{strained}-E_B^{strained})/2A_{interface}$, where $E_{AB}$ is the total energy of the interfacial structure, $E_A^{strained}$ and $E_B^{strained}$ are the strained bulk energies for domain A and B, and $A_{interface}$ is the interface area.

Characterization.

Scanning transmission electron microscopy (STEM) characterization of nanoparticles was performed on an in-house designed dual-energy dispersive X-ray spectroscopy (EDS) detector equipped Hitachi HD-2300 dedicated STEM. The dark-field images were taken with an annular dark-field (ADF) detector at an electron acceleration voltage of 200 kV. Nanoparticle composition was studied using the equipped dual EDS detectors (Thermo Scientific) on the HD-2300 STEM with a 200 kV acceleration voltage. The Lα peaks of Pd, Ag, Sn, and Au, and the Kα peaks of Co, Ni, and Cu in the EDS spectra were used for elemental mapping and for composition quantification with standardless Cliff-Lorimer correction method. The atomic composition measured by EDS has an inherent error of less than 5% due to X-ray absorption and fluorescence. Each EDS map is built based on 30 frames with pixel dimensions of 256×192 and pixel dwell time of 203 μs. Thermo Scientific NSS software was used for EDS data processing. High-resolution transmission electron microscopy (HRTEM) characterization were performed on a JEOL ARM300 transmission electron microscope at an acceleration voltage of 300 kV using nanoparticles prepared on TEM grids with 15 nm $SiN_x$ support films.

DFT Simulation of Phase Separation Between Metals

The Open Quantum Materials Database (OQMD) was used to study the phase segregation behaviors between metals. OQMD is a high-throughput database (openly available at oqmd.org) that currently includes >500,000 density function theory (DFT) total energy calculations of compounds from the Inorganic Crystal Structure Database (ICSD) and decorations of commonly occurring crystal structures. The OQMD utilizes the Grand canonical linear programing (GCLP)[54-57] to compute complex T=0K phase equilibria of multicomponent compositions. GCLP is used to determine phase stabilities and stable reaction pathways by utilizing linear programming routines. In the formalism, the grand potential of a collection of phases is most generally expressed by $$\emptyset(\vec{\mu}, \vec{x}, T, P) = \sum_i x_i G_i(T, P) - \sum_j \left( \mu_j \sum_i x_i \overline{C}_{i,j} \right)$$

where $\vec{x}$ is a vector containing the relative amount of each compound, $G_i(T,P)$ is the Gibbs free energy of compound i at a given temperature and pressure, $\vec{\mu}$ is the chemical potential of each element j, and $\overline{C}_{i,j}$ is a composition matrix. The ground state composition was found by minimizing $\emptyset$ with respect to $\vec{x}$. To determine the stable phases for a certain elemental composition, a constraint is applied such that the amount of each element will stay the same as the initial composition, $\vec{z}_0$. The constraint is simply given by:

$$z_j^0 = \sum_i \overline{C}_{i,j} x_i$$

Since the grand potential is linear in $\vec{x}$ and so is the constraint $\vec{x}_0$ highly efficient linear programming techniques can be used to minimize the free energy. Using this GCLP method, the stable phases for AuPdSn, CoPdSn, AuCoPdSn, AgPdSn, CuPdSn, and NiPdSn systems were determined. For each system free energies $G_i(T,P)$ for all compounds in the given phase region from OQMD were considered. Table 2 shows the number of compounds considered for different systems. The free energies of formation were determined at 0 K and 0 Pa, i.e., $G_i(0, 0)$ which are simply the formation energies of the compounds. To be consistent with experimental setups, the initial composition was set for each element to be the same. The results of GCLP analysis are tabulated in Table 2. From the GCLP analysis, PdSn alloy phase-segregates with Co, Au, Ag and Cu were found. For the NiPdSn system, unlike other cases, PdSn alloy equilibrates with NiSn alloy.

TABLE 2

Grand Canonical Linear Programing Analysis

| SYSTEM | STABLE PHASES | ∅ (EV/ATOM) | NUMBER OF COMBINATIONS EVALUATED |
|---|---|---|---|
| AUPDSN | 33% AU, 67% PDSN | −0.386 | 25 |
| COPDSN | 33% CO, 67% PDSN | −0.386 | 24 |
| AUCOPDSN | 25% AU, 25% CO, 50% PDSN | −0.289 | 55 |
| AGPDSN | 33% AG, 67% PDSN | −0.386 | 20 |
| CUPDSN | 33% CU, 67% PDSN | −0.386 | 26 |
| NIPDSN | 28% $NI_3SN_2$, 22% $NI_3SN$, 50% $PD_2SN$ | −0.424 | 25 |

Thermal Stability of Au—PdSn Heterodimers

Au—PdSn heterodimers were found to be stable when heated between 500-750° C. for more than 2 days (FIGS. 9, 10). When the annealing temperature is further increased to 800° C., the morphology of the nanoparticles transformed from an ellipsoid to an irregular shape. Sn-enriched branches were formed on the PdSn semi-ellipsoidal domain (FIG. 10, 800° C. 12 h). Without intending to be bound by theory, it is believed that given the low melting temperature of bulk Sn (232° C.), this stems from the leaching of Sn from nanoparticles. Nevertheless, alloying between Au and PdSn was not observed, corroborating the simulation that Au and PdSn are segregated phases (FIG. 9).

Critical Ratio of Pd:Sn for the Phase Segregation Between PdSn Alloy and Other Metals According to the calculation of the Gibbs free energy of mixing, all PdSn phases ($Pd_3Sn$, $Pd_2Sn$, PdSn, $PdSn_2$, $PdSn_3$, and $PdSn_4$) should segregate from the other five metals. Experimentally, it was found that PdSn domains segregated with other metals when the molar ratio of Pd:Sn was less than or equal to 3:1 (FIG. 11A), which was consistent with DFT predictions. When the molar ratio of Pd:Sn was increased to 4:1, $Pd_3Sn$ remained an individual domain while the excess amount of Pd diffused into other metal domains (FIG. 11B). When the molar ratio of Pd:Sn was further increased to 20:1, the phase segregation between PdSn and other metals was no longer observable (FIG. 11C).

Single-crystalline PdSn nanoparticles ($Pd_{0.75}Sn_{0.25}$) and polycrystalline PdSn nanoparticles were synthesized in a polymer nanoreactor in accordance with methods of the disclosure using the deposition and annealing described above. For synthesizing the PdSn nanoparticles, a polymer ink solution was prepared by dissolving PEO-b-P2VP in water and $(NH_4)PdCl_6$ and $SnCl_4$ as the metal precursors in a molar ratio of 3:1. The pH of the polymer ink solution was adjusted to 1 by the addition of HCl. The deposited nanoreactors were annealed to form PdSn nanoparticles within the nanoreactors. Polycrystalline PdSn nanoparticles were synthesized by annealing the nanoreactors at 160° C. for 6 h, at 300° C. for 6 h, and then at 500° C. for 12 h. Single-crystalline PdSn nanoparticles were synthesized by annealing the nanoreactors at 160° C. for 6 h, at 300° C. for 6 h, and then at 750° C. for 12 h.

Figure 39A:
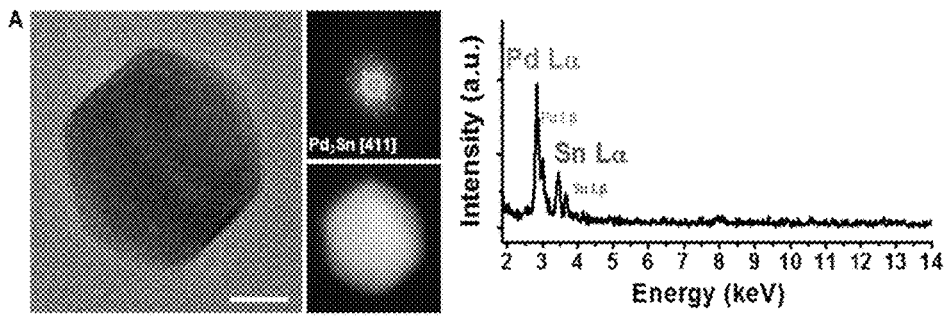
FIG. 39A is HRTEM images, ADF-STEM images, fast Fourier transform (FFT) and EDS spectrum of a single-crystalline PdSn nanoparticle ($Pd_{0.75}Sn_{0.25}$) synthesized in a polymer nanoreactor in accordance with the disclosure (scale bar 5 nm). The arrows across the nanoparticles in the EDS maps show the traces of EDS line scans. The Pearson's correlation coefficients in the EDS maps suggest a colocalization between Pd and Sn in the nanoparticles.
Figure 39B:
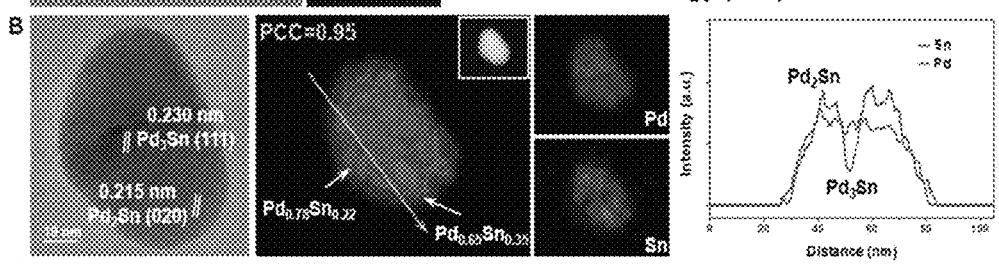
FIGS. 39B-39D HRTEM images, ADF-STEM images, fast Fourier transform (FFT) and EDS spectrum of polycrystalline PdSn nanoparticles synthesized in a polymer nanoreactor in accordance with the disclosure (scale bar 5 nm)
Figure 39C:
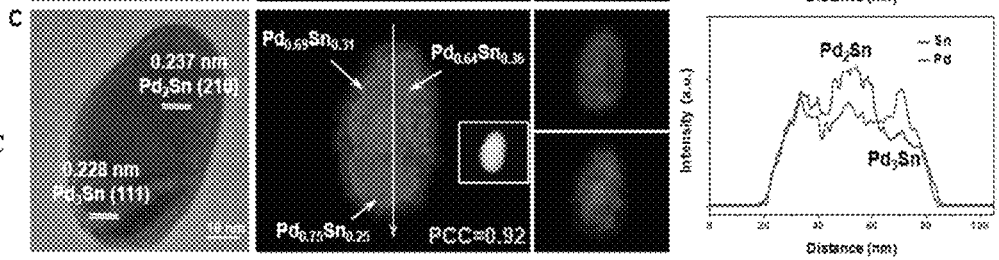
Figure 39D:
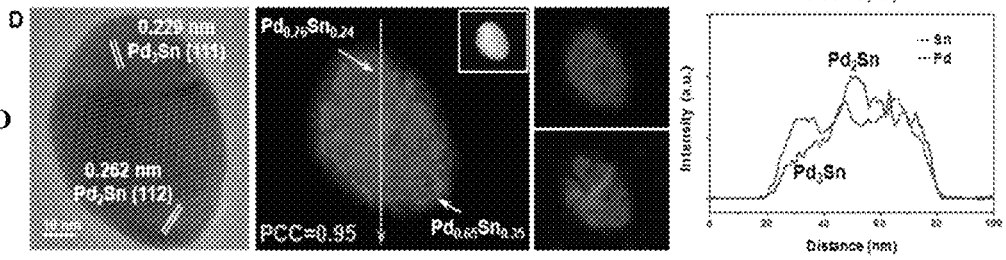

Referring to FIG. 39A, the blotchy appearance in the EDS maps of PdSn indicates non-uniform mixing of the two elements at the atomic scale with some regions being Pd-rich and others being Sn-rich. This is believed to be due primarily to the co-existence of different PdSn phases. The Pd—Sn phase diagram shows many intermetallic phases ($Pd_3Sn$, $Pd_2Sn$, and PdSn), and all of them phase-separate from the metals Au, Ag, Co, Cu, and Ni. As shown in FIG. 39, grains composed of different PdSn intermetallic phases (e.g., $Pd_3Sn$ and $Pd_2Sn$) can be found in one particle, which contributes to the blotchy effect observed in the EDS maps. Additionally, the limit of EDS mapping resolution (~2 nm) and the inherent error of EDS composition measurements (<5%) may also contribute to the blotchy effect in the images.

Figure 40A:
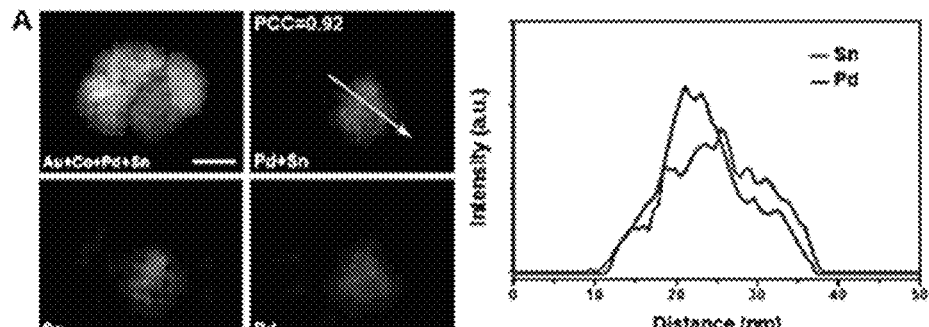
FIGS. 40A-40E are EDS line scans across PdSn domains of nanoparticles synthesized in accordance with methods of the disclosure. The line-scan profiles and the Pearson's correlation coefficients (PCC) show the colocalization of Pd and Sn in the PdSn domains. Scale bars are 15 nm.
Figure 40B:
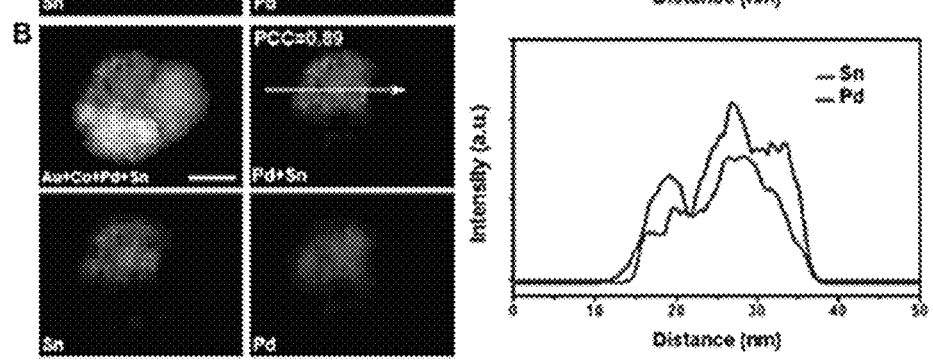
Figure 40C:
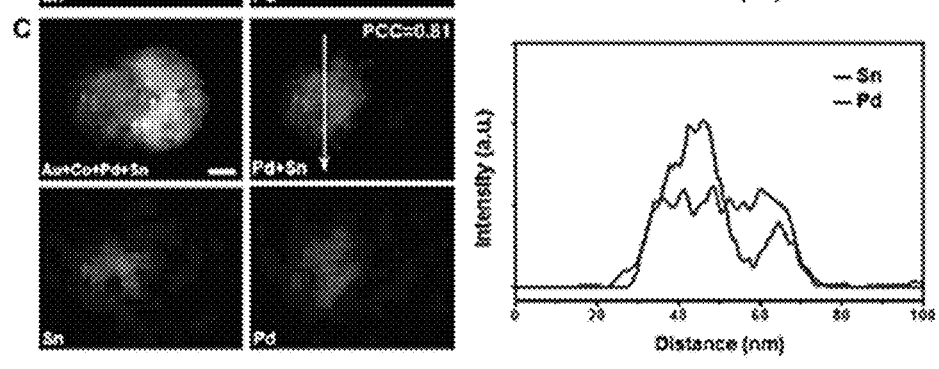
Figure 40D:
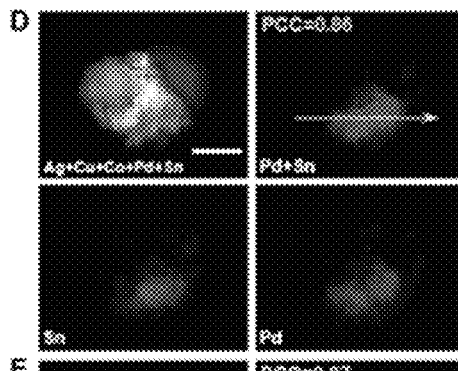
Figure 40D:
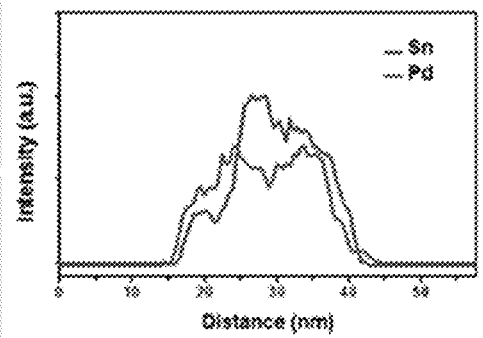
Figure 40E:
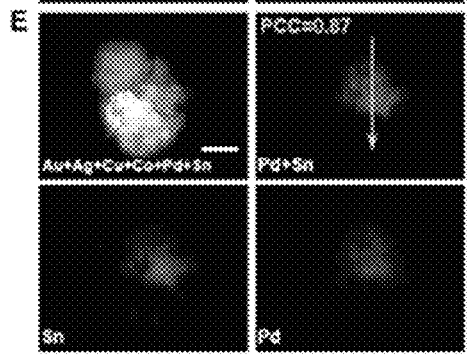
Figure 40E:
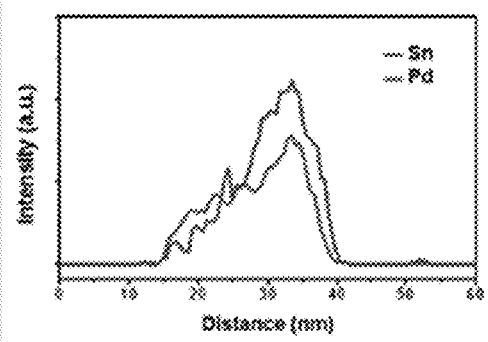
Figure 40F:
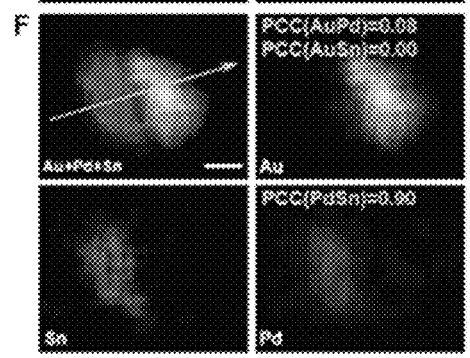
FIG. 40F is an EDS line scan across the AuPdSn nanoparticle of FIG. 8B. The line-scan profiles and the PCC confirm the alloying between Pd and Sn, the separation between Au and PD, and the separation between Au and Sn. Scale bars are 15 nm.
Figure 40F:
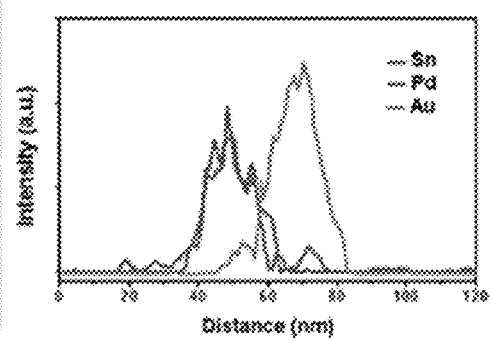
Figure 40F:

Referring to FIGS. 40A-40E, to further confirm that Pd and Sn are not separated in the PdSn domain, line scans were performed across the blotches in the EDS maps. The line scans show the co-existence of both Pd and Sn with a non-uniform distribution of the two elements. Additionally, a Pearson's correlation coefficient (PCC) was calculated to evaluate the colocalizaiton of Pd and Sn. PCC values have a range between −1 and 1, where 1 is for two perfectly and linearly related images, 0 is for uncorrelated images, and −1 is for inversely related images. As shown in FIGS. 39 and 40, despite the blotchy appearance of PdSn element maps, the element maps of PD and Sn always show a PCC value greater than 0.85, suggesting that Pd and Sn are highly colocalized. FIG. 40F illustrates an EDS line scan for an AuPdSn nanoparticle, which was found to have a Pearson's coefficient close to 9, confirming the alloying between Pd and Sn, the separation between Au and Pd, and the separation between Au and Sn.

In accordance with the methods of the disclosure, nanoparticles were synthesized by thermally annealing the polymer ink solutions (containing the polymer and metal precursors) in a sealed tube furnace with continuous flow of pure $H_2$. The step was found to help avoid Sn oxidation when Sn was utilized in the precursors. The avoidance of Sn oxidation was confirmed by the fact that SnOx lattice structures were not observed in HRTEM characterization.

Figures 41A, 41B, 41C, 41D:
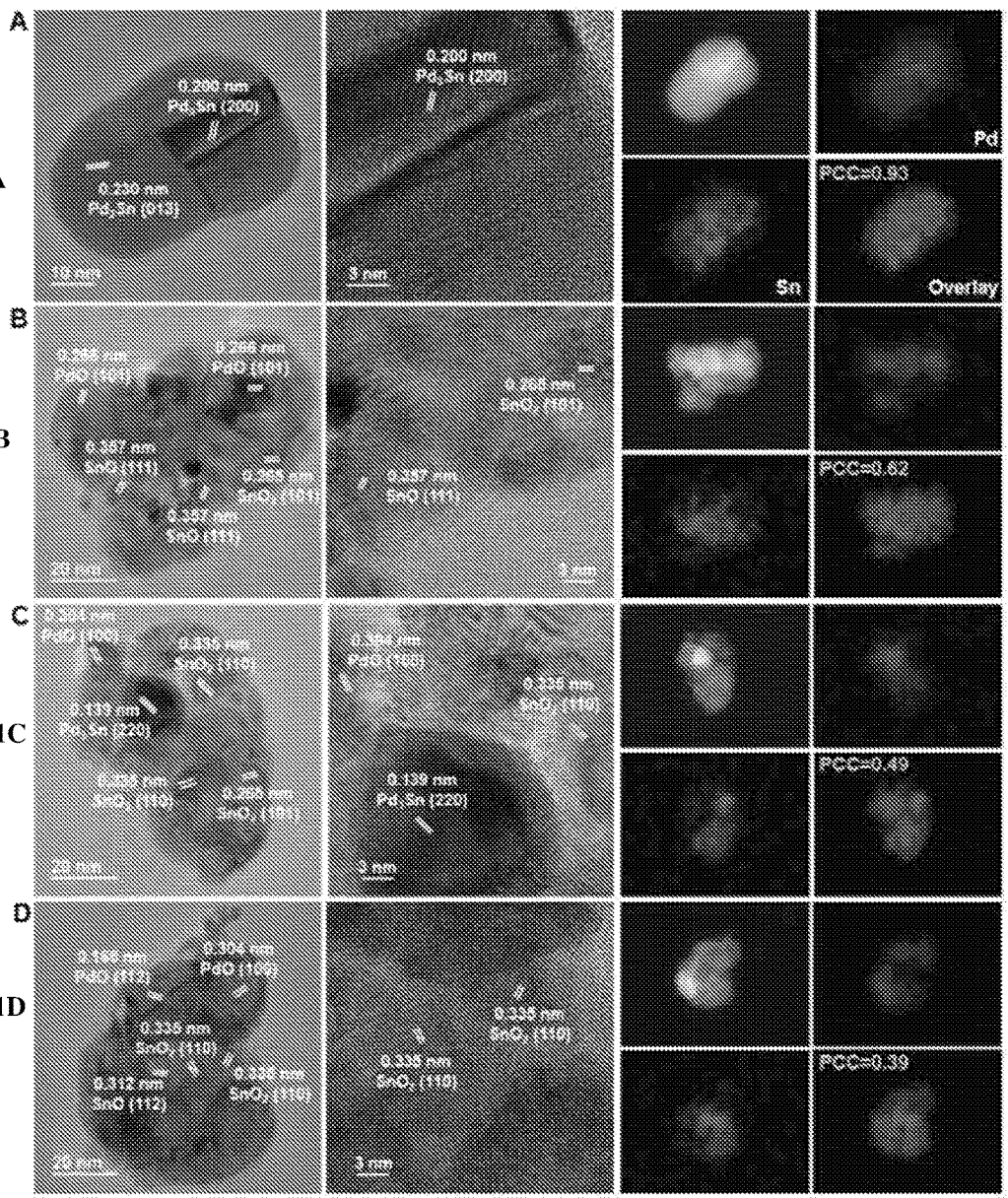
FIG. 41A is HRTEM and ADF-STEM images and EDS elemental mapping of a PdSn nanoparticle synthesized by annealing precursors/polymers in $H_2$ at 500° C. for 12 h. Pd/Sn=73/27.
FIGS. 41B-41D each include, respectively, HRTEM and ADF-STEM images and EDS elemental mapping of PdOx—SnOx nanoparticle synthesized by further annealing PdSn nanoparticles in air at 500° C. for 12 h; in the respective figures B) Pd/Sn=74/26; (C) Pd/Sn=71/29; (D) Pd/Sn=75/25.

To further rule out the possibility of SnOx, samples were intentionally annealed in air to generate SnOx at 500° C. for 12 hours. The oxide particles were observed to be highly polycrystalline with small grain sizes and large lattice spacing of >0.25 nm. Referring to FIG. 41, when comparing the nanoparticles annealed in $H_2$ (PdSn) to those annealed in air (PdOx-SnOx), it was found that the morphology of the particles, the observed lattice structures, and the DS mapping patterns are clearly different. The PCC in the samples annealed in air suggest that PdOx and SnOx are poorly colocalized, whereas Pd and Sn are colocalized in the PdSn alloy nanoparticles annealed in $H_2$. The significant differences observed by comparing to the intentionally oxidized samples confirms that the nanoparticles synthesized under $H_2$ have Sn in the metallic state.

Effect of Substrate on Kinetic Trapping of Heterostructures and Phases

The formation of a single nanoparticle in a polymer reactor was accomplished in SPBCL by aggregation of atoms and small particles. Different metals reduce and aggregate at different rates/sequences, which determines the types of kinetic phases captured. For a AuCoPdSn system, Au and Pd are reduced and aggregated at a much faster rate than Co and Sn. Referring to FIG. 42A, before annealing, no particle is observed in the homogenous polymer reactor. Referring to FIG. 42B, after the reactor is annealed at 160° C. for 6 h, Au, Pd, and AuPd alloy particles were formed. The presence of AuPd alloy confirms that the phase-separation between PdSn and Au is kinetically unfavored, excluding the possibility that the phase-separation between Au—Co—PdSn is a substrate-trapped result. Additionally, nanoparticles were not physically trapped on the substrates when being thermally annealed. Referring to FIG. 43, it was observed that nanoparticles can rotate and move around on the substrates when being annealed at temperatures above 550° C., with the phase separation behavior still remaining for Au, Co, and PdSn. This observation leads to the conclusion that it is unlikely that the structures observed were substrate-trapped.

Construction of Interface Models

Interface models were created using the VNL software package which matched the two lattices of different domains using the Coincidence Site Lattice Method[58]. The models focused on the grain boundaries between (111) facets of the two fcc lattices. When matching the two lattices, it was first searched through the grids with different sizes given by $nv_1+mv_2$, where $v_1$ and $v_2$ is the basis of the lattice of the first domain, and both n and m are integers ranging from −6 to 6. Then the rotation angles between the two lattices from 0 to 180° in increments of 4° were scanned. For each system, all the matched crystal structures were classified using two parameters, the number of atoms and mean absolute strain (shown in FIG. 20 with Co—$Pd_3Sn$ as an example). Among these structure, one optimal structure was selected that presented a good compromise between a small supercell and a low stress. The mean absolute strains for different systems are tabulated in Table 3.

TABLE 3

Mean Absolute Strain for Different Interface Systems

| SYSTEM | LATTICE STRAIN | SYSTEM | LATTICE STRAIN |
|---|---|---|---|
| AU—$PD_3SN$ | 1.02% | AG—CU | 0.12% |
| CO—$PD_3SN$ | 0.17% | CO—AG | 0.77% |
| AU—CO | 0.85% | CO—CU | 0.89% |

Effect of Lattice Mismatch on Interfacial Energy

To study the effect of lattice mismatch on interfactial energies, DFT was used to calculate the interfacial energies in Cu—Co—$Pd_3Sn$, Au—Co—$Pd_3Sn$, and Ag—Co—$Pd_3Sn$ systems, where Cu has a lattice parameter that is different from Au and Ag. As shown in Table 4, interfacial energies were found to be highly dependent on the domains that constitute the interfaces, making it difficult to estimate them based on simple chemical considerations. However, a trend between lattice mismatch and interfacial energy was still observed. Domains with better matched lattices were found to lead to interfaces with lower energies. In the three tri-phase systems, the interfacial energy for Cu—Co was smaller than those for Au—Co and Ag—Co, while the interfacial energies for Au—$Pd_3Sn$ and Ag—$Pd_3Sn$ were smaller than that for Cu—Pd$_3$Sn. This is because Cu has a better lattice match with Co, while Au and Ag have lattices that match well with Pd$_3$Sn. Nanoparticle architecture is determined by the relative energies of all surfaces and interfaces, which cannot be simply predicted based on lattice mismatch. Although interfaces with both matched and mismatched lattices are present in the three tri-phase systems, Au—Co—Pd$_3$Sn and Ag—Co—Pd$_3$Sn prefer a three-interface architecture while Co—Cu—Pd$_3$Sn prefers a two-interface architecture (FIG. 23).

TABLE 4

Comparison of Lattice Mismatch and Interfacial Energies between (111) Planes in Au—Co—Pd$_3$Sn, Ag—Co—Pd$_3$Sn, and Co—Cu—Pd$_3$Sn Tri-phase Systems

| SYSTEM | LATTICE MISMATCH (%) | INTERFACIAL ENERGY (EV/Å$^2$) |
|---|---|---|
| AU—PD$_3$SN | 2.5 | 0.001 |
| AG—PD$_3$SN | 2.8 | 0.012 |
| CU—PD$_3$SN | 10.0 | 0.021 |
| CO—PD$_3$SN | 12.2 | 0.048 |
| CU—CO | 2.0 | 0.013 |
| AG—CO | 15.3 | 0.052 |
| AU—CO | 15.0 | 0.032 |

Total Surface/Interfacial Energy of Spherical Nanoparticles

The total surface/interfacial energy can be calculated by, $$E_{total} = \Sigma \gamma_{ij} A_{ij} + \Sigma \gamma_i S_i$$

where $\gamma_{ij}$ is the interfacial energy between domain Di and Dj, $\gamma_i$ is the surface energy of domain Di. The total energy considers both the interfacial energy between two domains and surface energy of each domain. The structure with the lowest total surface/interfacial energy is expected to be thermodynamically more stable.

Dominant Structure of Multi-Phase Nanoparticles

Tri-phase or tetra-phase nanoparticles composed of the same materials and synthesized by SPBCL can possess different architectures but always have one predominant structure (FIG. 4). Referring to FIG. 24, taking Ag—Cu—PdSn as an example, it was experimentally found that most particles have similar architectures with three interconnected phase boundaries (morphological yield ~65%, sample size: 30), while some particles adopt the architecture with two disconnected phase boundaries. For the library in FIG. 23, the dominant architectures are shown. The number of phases in one particle is highly dependent on particle composition. In FIG. 23, one specific composition for each combination of metals is shown. ADF-STEM images, EDS Spectra, and EDS mapping of the nanoparticles shown in this figure can be found in FIG. 25-28.

Referring to FIG. 44, particles with non-dominate architectures were found to require longer annealing time or high annealing temperatures of the deposited nanoreactors to convert them to nanoparticles. Due to the high vapor pressure of Sn (1.92×10$^{-5}$ Pa at 750° C.), annealing the nanoparticles for very long times or at high temperatures will inevitably cause the evaporative loss of Sn, which can prevent achieving 100% yields of nanoparticles with the expected number of interfaces.

Synthesis of AuPd—Co and Au—Co—PdSn Nanoparticles

AuPd—Co heterodimers and Au—Co—PdSn heterotrimers synthesized on Si TEM grids with SiNx support films or on Cu TEM grids with carbon support films. Synthesis of Au—Co—PdSn heterotrimers was done by preparing a polymer ink solution containing PEO-b-P2VP and HAuCl$_4$.3H$_2$O, Co(NO$_3$)$_2$.6H$_2$O, (NH$_4$)$_2$PdCl$_6$, and SnCl$_4$ as metal precursors in a molar ratio of 1:1:1:1. Nanoreactors were deposited on the SiNx support films or Cu TEM grids by SPBCL using an AFM probe dip-coated in the polymer ink solution. The nanoreactors were then annealed as described above.

Synthesis of Au—Co—PdSn heterotrimers was done by preparing a polymer ink solution containing PEO-b-P2VP and HAuCl$_4$.3H$_2$O, Co(NO$_3$)$_2$.6H$_2$O, and (NH$_4$)$_2$PdCl$_6$ as metal precursors in a molar ratio of 1:1:1. Nanoreactors were deposited on the SiNx support films or Cu TEM grids by SPBCL using an AFM probe dip-coated in the polymer ink solution. The nanoreactors were then annealed as described above.

Referring to FIG. 46, the following heterodimers and heterostructures were synthesized (A) Au0.32Co0.34Pd0.34; (B) Au0.29Co0.33Pd0.38; (C) Au0.31Co0.34Pd0.21Sn0.14; (D) Au0.33Co0.29Pd0.25Sn0.13. The Cu K α signals at 8.0 keV in the EDS spectra of (A) and (C) are from TEM sample holder. The Al K α signals at 1.5 keV in all EDS spectra are from the Al grid cover of the TEM sample holder.

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Aspects

Aspect 1. A method of making a tetra-phase polyelemental nanoparticle using tri-phase nanoparticle architectures, comprising:

selecting two or more tri-phase nanoparticle architectures, wherein the two or more tri-phase nanoparticle architectures are one or more striped tri-phase architectures, one or more pie-shaped tri-phase architectures, or combinations thereof;

identifying from the selected two or more tri-phase nanoparticle architectures groups of metals for generating each of the two or more tri-phase nanoparticle architectures;

contacting a tip coated with an ink to a substrate to form a nanoreactor, the ink comprising block copolymer and the metals from the groups of metals identified for generating each of the two or more tri-phase nanoparticle architectures; and annealing the nanoreactors under conditions sufficient to synthesize a tetra-phase polyelemental nanoparticle.

Aspect 2. The method of aspect 1, wherein the metal compounds are compounds containing metals selected from the group consisting of Au, Ag, Cu, Co, Ni, Pd, Sn, and combinations thereof.

Aspect 3. The method of aspect 2, wherein the group of metals for one of the tri-phase nanoparticle architectures are Au, Co, and PdSn.

Aspect 4. The method of aspect 2 or 3, wherein the group of metals for one of the tri-phase nanoparticle architectures Ag, Co, and Cu.

Aspect 5. The method of any one of the preceding aspects, wherein the ink comprises metal compounds containing Ag, Cu, Co, and PdSn.

Aspect 6. The method of any one of the preceding aspects, wherein the two or more tri-phase nanoparticle architectures comprise two striped tri-phase nanoparticles and two pie-shaped tri-phase nanoparticles.

Aspect 7. The method of aspect 5, wherein the groups of the metals for the two striped tri-phase nanoparticles are Ag—Cu—Co and PdSn—Cu—Co, and the groups of metals for the two pie-shaped tri-phase nanoparticles are Ag—Cu—PdSn and Ag—Co—PdSn.

Aspect 8. The method of aspect 7, wherein the tetra-phase polyelemental nanoparticle comprises four interfaces and one tri-phase junction.

Aspect 9. The method of aspect 1, wherein the selected tri-phase nanoparticle architectures comprises one striped tri-phase architecture with two interfaces and three pie-shaped tri-phase architecture with three interfaces.

Aspect 10. The method of aspect 9, wherein the group of metals for the striped tri-phase architecture with two interfaces is AuAg—AuCu—Co.

Aspect 11. The method of aspect 9 or 10, wherein the group of metals for the pie-shaped tri-phase architecture with three interfaces is selected from the group consisting of AuAg—AuCu—PdSn, AuAg—PdSn—Co, and AuCu—PdSn—Co.

Aspect 12. The method of aspect 11, wherein the tetra-phase polyelemental nanoparticle comprises five interfaces and two tri-phase junctions Aspect 13. The method of any one of the preceding aspects, wherein the ink comprises metal compounds having Au, Ag, Cu, Co, Pd, and Sn.

Aspect 14. The method of any one of the preceding aspects, comprising selecting four tri-phase nanoparticle architectures having the same architecture.

Aspect 15. The method of aspect 14, wherein the tri-phase nanoparticle architecture is a pie-shaped architecture.

Aspect 16. The method of aspect 14, wherein the tetra-phase polyelemental nanoparticle comprises Au, CoNi, NiSn, and PdSn as four phases.

Aspect 17. The method of any one of the preceding aspects, wherein the metal compounds are compounds selected from the group consisting of $HAuCl_4 \cdot 3H_2O$, $AgNO_3$, $Cu(NO_3)_2 \cdot xH_2O$, $Co(NO_3)_2 \cdot 6H_2O$, $Ni(NO_3)_2 \cdot 6H_2O$, $(NH_4)_2PdCl_6$, $SnCl_4$, and combinations thereof.

Aspect 18. The method of any one of the preceding aspects, wherein annealing the nanoreactors comprises heating to a temperature of 500° C. for 12 hours.

Aspect 19. The method of any one of the preceding aspects, wherein the block copolymer is PEO-b-P2VP or PEO-b-P4VP.

Aspect 20. The method of any one of the preceding aspects, wherein the block copolymer is present in the ink in a concentration of about 5 mg/ml.

Aspect 21. The method of any one of the preceding aspects, wherein the molar ratio of pyridyl groups to metal compounds in the ink is between 48:1 and 256:1.

Aspect 22. The method of any one of the preceding aspects, wherein the pH of the ink is acidic.

Aspect 23. The method of any one of the preceding aspects, wherein the pH of the ink is 1.

Aspect 24. The method of any one of the preceding aspects, wherein the substrate is a TEM grid.

Aspect 25. The method of any one of the preceding aspects, wherein the tip is an AFM tip.

Aspect 26. A tetra-phase nanoparticle comprising Au, CoNi, NiSn, and PdSn present a four constituent domain interfaced with each other, the nanoparticle comprising six phase boundaries.

REFERENCES

1. Buck, M. R., Bondi, J. F. & Schaak, R. E. A total-synthesis framework for the construction of high-order colloidal hybrid nanoparticles. *Nat. Chem.* 4, 37-44, (2012).
2. Weng, L., Zhang, H., Govorov, A. O. & Ouyang, M. Hierarchical synthesis of non-centrosymmetric hybrid nanostructures and enabled plasmon-driven photocatalysis. *Nat. Commun.* 5: 4792, (2014).
3. Zhang, Z. C., Xu, B. & Wang, X. Engineering nanointerfaces for nanocatalysis. *Chem. Soc. Rev.* 43, 7870-7886, (2014).
4. Oh, N. R. et al. Double-heterojunction nanorod light-responsive LEDs for display applications. *Science* 355, 616-619, (2017).
5. Campbell, C. T. CATALYST-SUPPORT INTERACTIONS Electronic perturbations. *Nat. Chem.* 4, 597-598, (2012).
6. Schick, I. et al. Multifunctional Two-Photon Active Silica-Coated Au@MnO Janus Particles for Selective Dual Functionalization and Imaging. *J. Am. Chem. Soc.* 136, 2473-2483, (2014).
7. Ye, X. C. et al. Seeded Growth of Metal-Doped Plasmonic Oxide Heterodimer Nanocrystals and Their Chemical Transformation. *J. Am. Chem. Soc.* 136, 5106-5115, (2014).
8. Fu, Q. & Wagner, T. Interaction of nanostructured metal overlayers with oxide surfaces. *Surf. Sci. Rep.* 62, 431-498, (2007).
9. Lu, K. Stabilizing nanostructures in metals using grain and twin boundary architectures. *Nat. Rev. Mater.* 1: 16019, (2016).
10. Ge, H. B. et al. A Tandem Catalyst with Multiple Metal Oxide Interfaces Produced by Atomic Layer Deposition. *Angew. Chem. Int. Ed.* 55, 7081-7085, (2016).
11. Zhao, M. T. et al. Metal-organic frameworks as selectivity regulators for hydrogenation reactions. *Nature* 539, 76-80, (2016).
12. Saavedra, J., Doan, H. A., Pursell, C. J., Grabow, L. C. & Chandler, B. D. The critical role of water at the gold-titania interface in catalytic CO oxidation. *Science* 345, 1599-1602, (2014).
13. Lin, M., Kim, G. H., Kim, J. H., Oh, J. W. & Nam, J. M. Transformative Heterointerface Evolution and Plasmonic Tuning of Anisotropic Trimetallic Nanoparticles. *J. Am. Chem. Soc.* 139, 10180-10183, (2017).
14. Hong, J. W., Wi, D. H., Lee, S. U. & Han, S. W. Metal-Semiconductor Heteronanocrystals with Desired Configurations for Plasmonic Photocatalysis. *J. Am. Chem. Soc.* 138, 15766-15773, (2016).
15. Cortie, M. B. & McDonagh, A. M. Synthesis and Optical Properties of Hybrid and Alloy Plasmonic Nanoparticles. *Chem. Rev.* 111, 3713-3735, (2011).
16. Xu, C. J., Wang, B. D. & Sun, S. H. Dumbbell-like Au—$Fe_3O_4$ Nanoparticles for Target-Specific Platin Delivery. *J. Am. Chem. Soc.* 131, 4216-4217, (2009).

17. Rodriguez-Fernandez, D., Langer, J., Henriksen-Lacey, M. & Liz-Marzán, L. M. Hybrid Au—$SiO_2$ Core-Satellite Colloids as Switchable SERS Tags. *Chem. Mater.* 27, 2540-2545, (2015).
18. George, C. et al. CO Oxidation on Colloidal $Au_{0.80}Pd_{0.20}$—$Fe_xO_y$ Dumbbell Nanocrystals. *Nano Lett.* 13, 752-757, (2013).
19. Li, L. L. et al. Pd—$Cu_2O$ and Ag—$Cu_2O$ Hybrid Concave Nanomaterials for an Effective Synergistic Catalyst. *Angew. Chem. Int. Ed.* 52, 11049-11053, (2013).
20. Wang, H. T. et al. Direct and continuous strain control of catalysts with tunable battery electrode materials. *Science* 354, 1031-1036, (2016).
21. Kattel, S., Liu, P. & Chen, J. G. G. Tuning Selectivity of CO2 Hydrogenation Reactions at the Metal/Oxide Interface. *J. Am. Chem. Soc.* 139, 9739-9754, (2017).
22. Green, I. X., Tang, W. J., Neurock, M. & Yates, J. T. Spectroscopic Observation of Dual Catalytic Sites During Oxidation of CO on a $Au/TiO_2$ Catalyst. *Science* 333, 736-739, (2011).
23. Kattel, S., Ramirez, P. J., Chen, J. G., Rodriguez, J. A. & Liu, P. Active sites for $CO_2$ hydrogenation to methanol on Cu/ZnO catalysts. *Science* 355, 1296-1299, (2017).
24. Li, C. W., Ciston, J. & Kanan, M. W. Electroreduction of carbon monoxide to liquid fuel on oxide-derived nanocrystalline copper. *Nature* 508, 504-507, (2014).
25. Mariano, R. G., McKelvey, K., White, H. S. & Kanan, M. W. Selective increase in $CO_2$ electroreduction activity at grain-boundary surface terminations. *Science* 358, 1187-1191, (2017).
26. Yamada, Y. et al. Nanocrystal bilayer for tandem catalysis. *Nat. Chem.* 3, 372-376, (2011).
27. Xie, C. L. et al. Tandem Catalysis for $CO_2$ Hydrogenation to C2-C4 Hydrocarbons. *Nano Lett.* 17, 3798-3802, (2017).
28. Kamat, P. V. Manipulation of Charge Transfer Across Semiconductor Interface. A Criterion That Cannot Be Ignored in Photocatalyst Design. *J. Phys. Chem. Lett.* 3, 663-672, (2012).
29. Liu, X. N. et al. Inkjet Printing Assisted Synthesis of Multicomponent Mesoporous Metal Oxides for Ultrafast Catalyst Exploration. *Nano Lett.* 12, 5733-5739, (2012).
30. Chen, P. C. et al. Polyelemental nanoparticle libraries. *Science* 352, 1565-1569, (2016).
31. Yao, Y. G. et al. Carbothermal shock synthesis of high-entropy-alloy nanoparticles. *Science* 359, 1489-1494, (2018).
32. Fenton, J. L., Steimle, B. C. & Schaak, R. E. Tunable intraparticle frameworks for creating complex heterostructured nanoparticle libraries. *Science* 360, 513-517, (2018).
33. Zhang, H. T., Ding, J., Chow, G. M. & Dong, Z. L. Engineering Inorganic Hybrid Nanoparticles: Tuning Combination Fashions of Gold, Platinum, and Iron Oxide. *Langmuir* 24, 13197-13202, (2008).
34. Li, X. F. & Schaak, R. E. Reactive AgAuS and Ag3AuS2 Synthons Enable the Sequential Transformation of Spherical Nanocrystals into Asymmetric Multicomponent Hybrid Nanoparticles. *Chem. Mater.* 29, 4153-4160, (2017).
35. Hodges, J. M. & Schaak, R. E. Controlling Configurational Isomerism in Three-Component Colloidal Hybrid Nanoparticles. *Acc. Chem. Res.* 50, 1433-1440, (2017).
36. Costi, R., Saunders, A. E. & Banin, U. Colloidal Hybrid Nanostructures: A New Type of Functional Materials. *Angew. Chem. Int. Ed.* 49, 4878-4897, (2010).
37. Hodges, J. M., Morse, J. R., Williams, M. E. & Schaak, R. E. Microscopic Investigation of Chemoselectivity in Ag—Pt—Fe3O4 Heterotrimer Formation: Mechanistic Insights and Implications for Controlling High-Order Hybrid Nanoparticle Morphology. *J. Am. Chem. Soc.* 137, 15493-15500, (2015).
38. Read, C. G., Gordon, T. R., Hodges, J. M. & Schaak, R. E. Colloidal Hybrid Nanoparticle Insertion Reaction for Transforming Heterodimers into Heterotrimers. *J. Am. Chem. Soc.* 137, 12514-12517, (2015).
39. Min, Y., Kwak, J., Soon, A. & Jeong, U. Nonstoichiometric Nucleation and Growth of Multicomponent Nanocrystals in Solution. *Acc. Chem. Res.* 47, 2887-2893, (2014).
40. Wang, C., Yin, H. F., Dai, S. & Sun, S. H. A General Approach to Noble Metal-Metal Oxide Dumbbell Nanoparticles and Their Catalytic Application for CO Oxidation. *Chem. Mater.* 22, 3277-3282, (2010).
41. Casavola, M. et al. Exchange-Coupled Bimagnetic Cobalt/Iron Oxide Branched Nanocrystal Heterostructures. *Nano Lett.* 9, 366-376, (2009).
42. Chen, P. C. et al. Tip-Directed Synthesis of Multimetallic Nanoparticles. *J. Am. Chem. Soc.* 137, 9167-9173, (2015).
43. Wu, H. M. et al. Formation of Heterodimer Nanocrystals: UO2/In2O3 and $FePt/In_2O_3$. *J. Am. Chem. Soc.* 133, 14327-14337, (2011).
44. Peng, S., Lei, C. H., Ren, Y., Cook, R. E. & Sun, Y. G. Plasmonic/Magnetic Bifunctional Nanoparticles. *Angew. Chem. Int. Ed.* 50, 3158-3163, (2011).
45. Chen, P. C. et al. Structural Evolution of Three-Component Nanoparticles in Polymer Nanoreactors. *J. Am. Chem. Soc.* 139, 9876-9884, (2017).
46. Villars, P., Okamoto, H., Cenzual, K., Eds., ASM Alloy Phase Diagrams Database, http://www1.asminternational.org/AsmEnterprise/APD (ASM International, Materials Park, OH, 2006).
47. Saal, J. E., Kirklin, S., Aykol, M., Meredig, B. & Wolverton, C. Materials Design and Discovery with High-Throughput Density Functional Theory: The Open Quantum Materials Database (OQMD), *JOM* 65, 1501-1509, (2013).
48. Kirklin, S. et al. The Open Quantum Materials Database (OQMD): assessing the accuracy of DFT formation energies, *npj Comput. Mater.* 1, 15010, (2015).
49. Kirklin, S., Meredig, B. & Wolverton, C. High-Throughput Computational Screening of New Li-Ion Battery Anode Materials. *Adv. Energy Mater.* 3, 252-262, (2013).
50. Zhang, Y. L., Cattrall, R. W., McKelvie, I. D. & Kolev, S. D. Gold, an alternative to platinum group metals in automobile catalytic converters. *Gold Bull.* 44, 145-153, (2011).
51. Kresse, G. & Furthmuller, J. Efficiency of ab-initio total energy calculations for metals and semiconductors using a plane-wave basis set. *Comput. Mater. Sci.* 6, 15-50, (1996).
52. Kresse, G. & Furthmuller, J. Efficient iterative schemes for ab initio total-energy calculations using a plane-wave basis set. *Phys. Rev. B* 54, 11169-11186, (1996).
53. Kresse, G. & Joubert, D. From ultrasoft pseudopotentials to the projector augmented-wave method. *Phys. Rev. B* 59, 1758-1775, (1999).
54. Akbarzadeh, A. R., Ozolins, V. & Wolverton, C. First-principles determination of multicomponent hydride phase diagrams: application to the Li—Mg—N—H system. *Adv. Mater.* 19, 3233-3239, (2007).

55. Kirklin, S., Meredig, B. & Wolverton, C. High-Throughput Computational Screening of New Li-Ion Battery Anode Materials. *Adv. Energy Mater.* 3, 252-262, (2013).
56. Aidhy, D. S., Zhang, Y. S. & Wolverton, C. Prediction of a Ca(BH4)(NH2) quaternary hydrogen storage compound from first-principles calculations. *Phys. Rev. B* 84, 134103, (2011).
57. Ma, J. H. et al. Computational investigation of half-Heusler compounds for spintronics applications. *Phys. Rev. B* 95, 024411, (2017).
58. Balluffi, R. W., Brokman, A. & King, A. H. CSL/DSC LATTICE MODEL FOR GENERAL CRYSTAL-CRYSTAL BOUNDARIES AND THEIR LINE DEFECTS. *Acta Metall.* 30, 1453-1470, (1982).

What is claimed:

1. A method of making a polyelemental nanoparticle, comprising:
    depositing a polymer ink solution on a substrate to form a printed indicia of the polymer ink solution, thereby forming a nanoreactor on the substrate, wherein the polymer ink solution comprises a block copolymer, Sn and/or a Sn-precursor, and two or more additional metals and/or additional metal precursors; and
    performing a multistage annealing comprising:
        a first stage annealing to aggregate metal atoms in the nanoreactor, the first stage annealing comprising exposing the nanoreactor to at least a first, first stage annealing step at a first temperature and a second, first stage annealing step at a second temperature, the first temperature being lower than the second temperature; and
        a second stage annealing to reduce the aggregated metal atoms to form the polyelemental nanoparticles, the second stage annealing comprising exposing the nanoreactors to a second stage annealing temperature for a second stage annealing time, wherein the second stage annealing temperature is higher than the second temperature.

2. The method of claim 1, wherein the two or more additional metals are selected from Au, Ag, Cu, Co, Ni, and Pd.

3. The method of claim 1 or 2, further comprising making the polymer ink solution by admixing the block copolymer, the Sn and/or the Sn precursor, and the two or more additional metals and/or additional metal precursors in water; and adjusting the pH of the polymer ink solution to a pH of 1.

4. The method of claim 1, wherein the polymer ink solution comprises the Sn-precursor, the Sn-precursor being selected from one or more of $SnCl_4$, $SnCl_2$, $Na_2SnO_3$, and $K_2SnO_3$.

5. The method of claim 1, wherein the first temperature is about 100° C. to about 200° C., and the second temperature is about 200° C. to about 300° C.

6. The method of claim 1, wherein the first, first stage annealing step comprises exposing the nanoreactor to the first temperature for about 2 hours to about 12 hours.

7. The method of claim 1, wherein the second first stage annealing step comprises exposing the nanoreactor to the second temperature for about 2 hours to about 12 hours.

8. The method of claim 1, wherein the second stage annealing temperature is about 500° C. to about 800° C.

9. The method of claim 1, wherein in the second stage annealing comprises exposing the nanoreactor to the second stage annealing temperature for about 6 hours to about 20 hours.

10. The method of claim 1, wherein the two or more additional metal precursors are selected from $HAuCl_4 \cdot 3H_2O$, $AgNO_3$, $Cu(NO_3)_2 \cdot xH_2O$, $Co(NO_3)_2 \cdot 6H_2O$, $Ni(NO_3)_2 \cdot 6H_2O$, and $(NH_4)_2PdCl_6$.

11. The method of claim 1, wherein the block copolymer is present in the polymer ink solution in a concentration of about 1 to about 50 mg/ml.

12. The method of claim 1, wherein the block copolymer is PEO-b-P2VP or PEO-b-P4VP.

13. The method of claim 12, wherein the molar ratio of pyridyl groups to the total amount of the Sn and/or a Sn-precursor, and the two or more additional metals and/or additional metal precursors in the ink is between 4:1 and 512:1.

14. The method of claim 1, wherein the pH of the polymer ink solution is acidic.

15. The method of claim 1, wherein the pH of the polymer ink solution is 1.

16. The method of claim 1, wherein the substrate is a TEM grid and/or the polymer ink solution is deposited with a tip, the tip is an AFM tip.

17. The method of claim 1, wherein the first stage annealing comprises a third, first stage annealing step at a third temperature, the third temperature being higher than the first and second temperatures.

18. The method of claim 17, wherein the third first stage annealing step comprises exposing the nanoreactors to the third temperature for about 2 hours to about 12 hours.

19. The method of claim 1, wherein the polymer ink solution is deposited by one or more of scanning probe block copolymer lithography, dip-pen nanolithography, microcontact printing, spin-coating, dip-coating, spray-coating, and drop-casting.

20. The method of claim 1, wherein 1 to 100 attoliters of the polymer ink solution are deposited per printed indicia.

* * * * *